(12) United States Patent
Li et al.

(10) Patent No.: US 12,476,274 B2
(45) Date of Patent: *Nov. 18, 2025

(54) POLYMERIC-INORGANIC HYBRID LAYER FOR A LITHIUM ANODE

(71) Applicant: LytEn, Inc., San Jose, CA (US)

(72) Inventors: You Li, Sunnyvale, CA (US); Jesse Baucom, Sunnyvale, CA (US); Elena Rogojina, San Jose, CA (US); Chandra B. Kc, San Jose, CA (US); Jingning Shan, San Jose, CA (US); Jerzy Gazda, Austin, TX (US); Ratnakumar Bugga, Arcadia, CA (US)

(73) Assignee: Lyten, Inc., San Jose, CA (US)

( * ) Notice: Subject to any disclaimer, the term of this patent is extended or adjusted under 35 U.S.C. 154(b) by 947 days.

This patent is subject to a terminal disclaimer.

(21) Appl. No.: 17/666,753

(22) Filed: Feb. 8, 2022

(65) Prior Publication Data

US 2022/0263111 A1    Aug. 18, 2022

Related U.S. Application Data

(63) Continuation-in-part of application No. 17/584,666, filed on Jan. 26, 2022, now Pat. No. 11,367,895, (Continued)

(51) Int. Cl.
  *H01M 4/62*   (2006.01)
  *H01M 4/04*   (2006.01)
  (Continued)

(52) U.S. Cl.
  CPC ....... *H01M 10/052* (2013.01); *H01M 4/0407* (2013.01); *H01M 4/382* (2013.01); *H01M 4/625* (2013.01); *H01M 10/0562* (2013.01)

(58) Field of Classification Search
None
See application file for complete search history.

(56) References Cited

U.S. PATENT DOCUMENTS

| 5,595,837 | A | 1/1997 | Olsen et al. |
| 6,060,184 | A | 5/2000 | Gan et al. |
| (Continued) | | | |

FOREIGN PATENT DOCUMENTS

| CA | 2032137 A | 11/1990 |
| CN | 100541870 A | 9/2009 |
| (Continued) | | |

OTHER PUBLICATIONS

Wang, Y. et al., "High-capacity lithium sulfur battery and beyond: a review of metal anode protection layers and perspective of solid-state electrolytes", Journal of Material Science; vol. 54, No. 5; Nov. 5, 2018; pp. 3671-3693.

(Continued)

*Primary Examiner* — Yoshitoshi Takeuchi
(74) *Attorney, Agent, or Firm* — Paradice & Li LLP

(57) ABSTRACT

An lithium-sulfur battery including an anode structure, a cathode, a separator, and an electrolyte is provided. The electrolyte may be dispersed throughout the cathode and in contact with the anode. An artificial solid-electrolyte interphase (A-SEI) may form on the anode, and a protective layer (e.g., that may be pinhole free) may form within and/or on the A-SEI to face the cathode. The protective layer may be formed from carbonaceous materials, which may provide exposed carbon atoms grafted with one or more ions, such as fluorine anions (F−), uniformly dispersed throughout the protective layer. In addition, the protective layer may include polymeric chains positioned generally opposite to each other. The polymeric chains may cross-link upon exposure to ultraviolet (UV) energetic radiation to form a three-dimensional (3D) lattice having a defined cross-link- (Continued)

ing density suitable to trap one or more anions during discharge-charge operational cycling of the lithium-sulfur battery.

34 Claims, 41 Drawing Sheets

Related U.S. Application Data which is a continuation-in-part of application No. 17/578,240, filed on Jan. 18, 2022, now Pat. No. 12,249,690, which is a continuation-in-part of application No. 17/563,183, filed on Dec. 28, 2021, now Pat. No. 11,404,692, which is a continuation-in-part of application No. 17/383,803, filed on Jul. 23, 2021, now Pat. No. 11,309,545.

(60) Provisional application No. 63/149,894, filed on Feb. 16, 2021.

(51) Int. Cl.
  *H01M 4/38* (2006.01)
  *H01M 10/052* (2010.01)
  *H01M 10/0562* (2010.01)

(56) References Cited

U.S. PATENT DOCUMENTS

| | | | |
|---|---|---|---|
| 6,136,477 A | 10/2000 | Gan et al. | |
| 6,210,839 B1 | 4/2001 | Gan et al. | |
| 6,955,866 B2 | 10/2005 | Nimon et al. | |
| 7,354,680 B2 | 4/2008 | Mikhaylik | |
| 7,745,047 B2 | 6/2010 | Zhamu et al. | |
| 7,842,421 B2 | 11/2010 | Mikhaylik | |
| 8,119,288 B2 | 2/2012 | Zhamu et al. | |
| 8,241,793 B2 | 8/2012 | Zhamu et al. | |
| 8,415,054 B2 | 4/2013 | Skotheim et al. | |
| 8,617,748 B2 | 12/2013 | Mikhaylik et al. | |
| 8,748,043 B2 | 6/2014 | Mikhaylik | |
| 8,936,870 B2 | 1/2015 | Affinito et al. | |
| 8,968,924 B2 | 3/2015 | Bosnyak et al. | |
| 9,005,809 B2 | 4/2015 | Wilkening et al. | |
| 9,034,421 B2 | 5/2015 | Mikhaylik et al. | |
| 9,040,201 B2 | 5/2015 | Affinito et al. | |
| 9,171,679 B2 | 10/2015 | Gogotsi et al. | |
| 9,190,667 B2 | 11/2015 | Zhamu et al. | |
| 9,419,274 B2 | 8/2016 | Wilkening et al. | |
| 9,437,344 B2 | 9/2016 | Zhamu et al. | |
| 9,577,243 B2 | 2/2017 | Schmidt et al. | |
| 9,666,899 B2 | 5/2017 | He et al. | |
| 9,994,960 B2 | 6/2018 | Laramie et al. | |
| 10,530,011 B1 | 1/2020 | MacKenzie et al. | |
| 10,734,653 B2 | 8/2020 | Lanning et al. | |
| 10,862,129 B2 | 12/2020 | Pan et al. | |
| 10,998,552 B2 | 5/2021 | Lanning et al. | |
| 2005/0042515 A1* | 2/2005 | Hwang | H01M 10/0565 429/231.95 |
| 2013/0141050 A1 | 6/2013 | Visco et al. | |
| 2014/0057179 A1 | 2/2014 | Yushin et al. | |
| 2015/0155549 A1* | 6/2015 | Moganty | H01M 4/38 429/213 |
| 2015/0349380 A1 | 12/2015 | Manthiram et al. | |
| 2016/0028063 A1* | 1/2016 | Visco | H01M 4/366 429/145 |
| 2016/0093916 A1 | 3/2016 | Moon et al. | |
| 2016/0164102 A1* | 6/2016 | Moganty | H01M 4/134 429/231.95 |
| 2016/0248084 A1 | 8/2016 | Cairns et al. | |
| 2016/0294000 A1 | 10/2016 | He et al. | |
| 2016/0336615 A1* | 11/2016 | Thillaiyan | H01M 10/446 |
| 2016/0336625 A1* | 11/2016 | Jeong | H01M 50/494 |
| 2016/0380314 A1* | 12/2016 | Yang | H01M 4/623 429/231.95 |
| 2017/0033406 A1 | 2/2017 | Zhang et al. | |
| 2017/0077490 A1 | 3/2017 | Zhang et al. | |
| 2017/0092950 A1 | 3/2017 | Xiao et al. | |
| 2017/0207484 A1 | 7/2017 | Zhamu et al. | |
| 2017/0324097 A1* | 11/2017 | Lee | H01M 10/4235 |
| 2018/0251681 A1* | 9/2018 | Zhang | H01M 10/0567 |
| 2019/0097270 A1 | 3/2019 | Park et al. | |
| 2019/0123390 A1* | 4/2019 | Xu | H01M 4/382 |
| 2019/0348672 A1* | 11/2019 | Wang | H01M 4/405 |
| 2019/0355982 A1 | 11/2019 | Lin et al. | |
| 2019/0393486 A1 | 12/2019 | He et al. | |
| 2020/0052325 A1 | 2/2020 | Zhamu et al. | |
| 2020/0161706 A1* | 5/2020 | Cao | H01M 10/0568 |
| 2020/0287245 A1* | 9/2020 | Ryu | H01M 10/0562 |
| 2021/0057751 A1 | 2/2021 | Lanning et al. | |
| 2021/0057753 A1 | 2/2021 | Viner et al. | |
| 2021/0210753 A1 | 7/2021 | Gazda et al. | |
| 2021/0320328 A1* | 10/2021 | Visco | G01N 21/8914 |
| 2021/0359305 A1* | 11/2021 | Rogojina | H01M 10/4235 |

FOREIGN PATENT DOCUMENTS

| | | |
|---|---|---|
| CN | 101997120 A | 3/2011 |
| EP | 3340346 A1 | 6/2018 |
| JP | 2010095390 A | 4/2010 |
| JP | 2016532566 A | 10/2016 |
| JP | 2020194792 A | 12/2020 |
| KR | 101785064 B1 | 10/2017 |
| WO | 1994/014754 A1 | 7/1994 |
| WO | 2014/048390 A1 | 4/2014 |
| WO | 2015/058057 A1 | 4/2015 |
| WO | 2015/084945 A1 | 6/2015 |
| WO | 2016/027583 A1 | 2/2016 |
| WO | 2016/061216 A1 | 4/2016 |
| WO | 2016/201101 A1 | 12/2016 |
| WO | 2017/127674 A1 | 7/2017 |
| WO | 2019/093851 A1 | 5/2019 |

OTHER PUBLICATIONS

International Search Report and Written Opinion dated May 24, 2022, for PCT Application Serial No. PCT/US2022/015773;13 pages.

Song, Y. et al., "Macro-Sized All-Graphene 3D Structures via Layer-by-Layer Covalent Growth for Micro-to-Macro Inheritable Electrical Performances", Advanced Functional Materials, No. 202305191; Jun. 19, 2023; Abstract.

Sun, K. et al., "Metal Nanoclusters as a Superior Polysulfides Immobilizer toward Highly Stable Lithium-Sulfur Batteries", Small, No. 2304210, Published by Wiley-VCH GmbH; Aug. 25, 2023; 11 pages.

Choudhury et al.; "Carbon onion-sulfur hybrid cathodes for lithium-sulfur batteries", Sustainable Energy Fuels; vol. 1; pp. 84-94; Jan. 2017.

Final Report Summary—LISSEN (Lithium Sulfur Superbattery Exploitating Nanotechnology), CORDIS, Record No. 181634; Apr. 4, 2016.

Gao, Y. et al., "Polymer-inorganic solid-electrolyte interphase for stable lithium metal batteries under lean electrolyte conditions", Nature Materials; vol. 18, No. 4; Mar. 11, 2019; pp. 384-389.

International Search Report and Written Opinion dated May 28, 2018 for PCT Patent Application Serial No. PCT/US2018/019772.

International Search Report and Written Opinion dated Aug. 7, 2019, for PCT Patent Application Serial No. PCT/US2019/029445; 10 pages.

Kang, H. et al., "Thirty-minute synthesis of hierarchically ordered sulfur particles enables high-energy, flexible lithium-sulfur batteries", Nano Energy, vol. 89; Aug. 25, 2021; 10 pages.

Lu, H. et al., "Application of Partially Fluorinated Ether for Improving Performance of Lithium/Sulfur Batteries", Journal of the Electrochemical Society; vol. 162, No. 8; May 12, 2015; pp. A1460-A1465.

Lu, Z. et al.; "Improving Li anode performance by a porous 3D carbon paper host with plasma assisted sponge carbon coating"; Energy Storage Materials; vol. 11; pp. 47-56; 2018.

(56) References Cited

OTHER PUBLICATIONS

Meini et al., "The Use of Redox Mediators for Enhancing Utilization of Li2S Cathodes for Advanced Li—S Battery Systems", J. Phys. Chem. Lett.; vol. 5; pp. 915-918; Feb. 2014.
Park, J. et al., "Formation of Stable Solid-Electrolyte Interphase Layter on Few-Layer Graphene-Coated Silicon Nanoparticles for High-Capacity Li-Ion Battery Anodes", The Journal of Physical Chemistry C, vol. 121; pp. 26155-26162; 2017.
Son, I. et al., "Graphene balls for lithium rechargeable batteries with fast charging and high volumetric energy densities", Nature Communications; 8(1); pp. 1-11; Nov. 16, 2017.
Zeng, F. et al., "Enhanced Li—S batteries using cation-functionalized pigment nanocarbon in core-shell structured composite cathodes", J. Mater. Chem. A, vol. 5, 2017; pp. 5559-5567.
Zhang, S.; "Liquid electrolyte lithium/sulfur battery: Fundamental chemistry, problems, and solutions"; Science Direct. Journal of Power Sources; vol. 231; pp. 153-162; Jun. 1, 2013.
Zhou, H. et al., "Protective coatings for lithium metal anodes: Recent progress and future perspectives", Journal of Power Sources; vol. 450; Jan. 2020; 18 pages.
International Search Report and Written Opinion dated Mar. 14, 2023, for PCT Appl. No. PCT/US2022/037905; 17 pages.

\* cited by examiner

3400

3500

Diphenyliodonium salt

Triphenylsulfonium salt

3700

| | |
|---|---|
|  | Diglycidyl 1,2-cyclohexanedicarboxylate (DG-CHDC) |
|  | 3,4-Epoxycyclohexylmethyl-3',4'-epoxycyclohexane carboxylate (ECC) |
|  | Triphenylsulfonium triflate (TPS-TF) |
|  | Diphenyliodonium triflate (DPI-TF) |
|  | Diphenyliodonium hexafluorophosphate (DPI-HFP) |
|  | Poly[(phenyl glycidyl ether)-co-formaldehyde] (PPGEF) |
|  | Glycidyl 2,2,3,3-tetrafluoropropyl ether (GTFEP) |

3800

|  | 1,2-Dimethoxyethane (DME) |
| --- | --- |
| CH₃(OCH₂CH₂)₃OCH₃ | Triethylene glycol dimethyl ether (TEGDME) |

3900

|  |  |
| --- | --- |
| 1,3-Dioxolane (DOL) | 3,3-Dimethyloxetane (DMO) |
|  | |
| 2-Ethyl-2-oxazoline (EOZ) | ε-Caprolactone (CL) |

… within and on the artificial solid-electrolyte interphase and face the cathode. The protective layer may include carbonaceous materials including one or more of flat graphene, wrinkled graphene, carbon nano-tubes (CNTs), carbon nano-onions (CNOs), or non-hollow carbon spherical particles (NHCS). The protective layer may be coated or deposited onto the anode structure by a roll-to-roll apparatus. In addition, or the alternative, the protective layer may be spray coated, gravure coated, micro gravure coated, slot-die coated, doctor-blade coated, Mayer's rod spiral-coated onto the anode structure.

POLYMERIC-INORGANIC HYBRID LAYER FOR A LITHIUM ANODE

CROSS-REFERENCE TO RELATED APPLICATIONS

This Patent Application is a continuation-in-part application and claims priority to U.S. patent application Ser. No. 17/584,666 entitled "SOLID-STATE ELECTROLYTE FOR LITHIUM-SULFUR BATTERIES" filed on Jan. 26, 2022, which is a continuation-in-part application and claims priority to U.S. patent application Ser. No. 17/578,240 entitled "LITHIUM-SULFUR BATTERY ELECTROLYTE COMPOSITIONS" filed on Jan. 18, 2022, which is a continuation-in-part application and claims priority to U.S. patent application Ser. No. 17/563,183 entitled "LITHIUM-SULFUR BATTERY CATHODE FORMED FROM MULTIPLE CARBONACEOUS REGIONS" filed on Dec. 28, 2021, which is a continuation-in-part of and claims priority to U.S. patent application Ser. No. 17/383,803 entitled "CARBONACEOUS MATERIALS FOR LITHIUM-SULFUR BATTERIES" filed on Jul. 23, 2021. This Patent Application also claims priority to Provisional Patent Application No. 63/149,894 entitled "CATHODE FOR A LITHIUM SULFUR BATTERY" filed on Feb. 16, 2021. The disclosures of all prior Applications are assigned to the assignee hereof, and are considered part of and are incorporated by reference in this Patent Application in their respective entireties.

TECHNICAL FIELD

This disclosure relates generally to a lithium-sulfur battery, and, more particularly, to a protective layer, disposed on an anode of the lithium-sulfur battery, configured to prevent polysulfide species from contacting the anode.

DESCRIPTION OF RELATED ART

Recent developments in batteries allow consumers to use electronic devices in many new applications. However, further improvements in battery technology are desirable.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter.

One innovative aspect of the subject matter described in this disclosure may be implemented as a lithium-sulfur battery including a cathode, an anode structure, a separator positioned between the anode structure and the cathode, and an electrolyte dispersed throughout the cathode and in contact with the anode structure. In one implementation, the anode structure may include a foil of lithium. At least some lithium cations (Li+) are involved in one or more of a dissociation reaction or a combination reaction during operational discharge cycling of the lithium-sulfur battery. An artificial solid-electrolyte interphase may form on the foil of lithium. In some aspects, the artificial solid-electrolyte interphase forms one or more compounds on the anode structure based on one or more oxidation-reduction reactions involving lithium cations (Li+) output by the foil of lithium and one or more solvents of the electrolyte. A protective layer (e.g., devoid of pinholes) may form at least partially within and on the artificial solid-electrolyte interphase and face the cathode. The protective layer may include carbonaceous materials including one or more of flat graphene, wrinkled graphene, carbon nano-tubes (CNTs), carbon nano-onions (CNOs), or non-hollow carbon spherical particles (NHCS). The protective layer may be coated or deposited onto the anode structure by a roll-to-roll apparatus. In addition, or the alternative, the protective layer may be spray coated, gravure coated, micro gravure coated, slot-die coated, doctor-blade coated, Mayer's rod spiral-coated onto the anode structure.

In addition, in some aspects, the protective layer may include a first polymeric chain and a second polymeric chain positioned opposite one another. For example, the first polymeric chain may be formed from first interconnected monomer units, and the second polymeric chain may be formed from second interconnected monomer units. In some aspects, the first interconnected monomer units and the second interconnected monomer units may be identical to one another. In other aspects, the first interconnected monomer units and the second interconnected monomer units may be distinct or different from each other. Each of the first and second polymeric chains may include exposed carbon atoms grafted to one or more of oxide anions ($O^{2-}$), fluorine anions ($F^-$), and nitrate anions ($NO^3$) uniformly dispersed throughout the protective layer. In addition, the first polymeric chain and the second polymeric chain may cross-link with each other based on exposure to one or more nitrogen-containing groups (e.g., including an amine-containing group), which may be cured in an epoxy. In some aspects, one or both of the first and second polymeric chains includes one or more of liquid bisphenol A epichlorohydrin-based epoxy resin, polyoxyethylene bis(glycidyl ether) having an average $M_n$ of 500 (PEG-DEG-500), or polyoxypropylenediamine.

One or more lithium-containing salts including at least lithium bis(trifluoromethanesulfonyl)imide (LiTFSI) may be uniformly dispersed throughout the protective layer to dissociate into lithium ($Li^+$) cations and $TFSI^-$ anions. The first and second polymeric chains may form carbon-carbon bonds by at least partially cross-linking with each other upon exposure to an ultraviolet (UV) energy. In this way, the cross-linked first and second polymeric chains may form the protective layer as a three-dimensional (3D) lattice having a cross-linking density defined by a number of cross-link points per-unit volume to at least partially trap $TFSI^-$ anions produced upon dissociation of LiTFSI. The number of cross-link points per-unit volume may restrict re-dissolution of lithium-containing additives in the protective layer toward the electrolyte. In addition, in some aspects, the cross-linking density of the protective layer may inhibit swelling above 10% of an initial volume of the protective layer by preventing absorption of one or more solvents (e.g., dimethoxyethane (DME)) contained in the electrolyte. In some other aspects, the cross-linking density of the protective layer may control swelling between 10%-50% of an original volume of the protective layer by controlling absorption of at least some solvents, including DME, contained in the electrolyte. In one implementation, the protective layer has a modulus of elasticity between 3 gigapascals (GPa) and 100 GPa, a glass transition temperature above 60° Celsius (C), and is cured at less than 81° Celsius (C).

In some implementations, the protective layer may include lithium fluoride (LiF), which may be formed responsive to a combination of fluorine anions (F−) and lithium cations ($Li^+$). The combination is associated with generation of lithium oxide ($Li_2O$), lithium nitrate ($LiNO_3$) or nitrogen-oxygen containing compounds. For example, lithium fluoride (LiF) may be based on a combination of lithium cations (Li$^+$) output from the anode structure and fluorine anions (F$^-$) grafted onto the first polymeric chain and/or the second polymeric chain. In this way, the combination may reduce lithium-containing dendritic growth from the anode structure. In addition, one or more of lithium fluoride (LiF), lithium oxide (Li$_2$O), lithium nitrate (LiNO$_3$), or nitrogen-oxygen containing additives may form one or more regions extending across one or more of the anode structure or the artificial solid-electrolyte interphase.

The protective layer may include additives including one or more of lithium salts including lithium nitrate (LiNO$_3$), inorganic ionically conductive ceramics including one or more of lithium lanthanum zirconium oxide (LLZO), NASICON-type oxide Li$_{1+x}$Al$_x$Ti$_{2-x}$(PO$_4$)$_3$ (LATP) or lithium tin phosphorus sulfide (LSPS), or nitrogen-oxygen containing additives. In some aspects, at least some additives may be dispersed throughout the protective layer to dissociate and produce lithium cations (Li$^+$). In addition, presence of at least some of additives within the protective layer increases one or more of a charging rate, a discharging rate, or an energy density of the lithium-sulfur battery.

In some aspects, the protective layer may include between 2 wt. %-5 wt. % of difunctional bisphenol A/epichlorohydrin derived liquid epoxy resin, between 15 wt. %-25 wt. % of polyoxyethylene bis(glycidyl ether) (PEG-DEG-500) having an average M$_n$ of 500, between 20 wt. %-25 wt. % of diaminopolypropylene glycol, between 5 wt. %-15 wt. % of poly(propylene glycol) bis(2-aminopropyl ether), between 5 wt. %-15 wt. % of lithium bis(trifluoromethanesulfonyl) imide (LiTFSI), and between 40 wt. %-60 wt. % of lithium lanthanum zirconium oxide (LLZO). In some other aspects, the protective layer may include between 2 wt. %-5 wt. % of difunctional bisphenol A/epichlorohydrin derived liquid epoxy resin, between 15 wt. %-25 wt. % of polyoxyethylene bis(glycidyl ether) having an average M$_n$ of 500, between 5 wt. %-15 wt. % of 3,4-epoxy cyclohexyl methyl-3,4-epoxy cyclohexane carboxylate (ECC), between 15 wt. %-20 wt. % of lithium bis(trifluoromethanesulfonyl)imide (LiTFSI), between 40 wt. %-60 wt. % of lithium lanthanum zirconium oxide (LLZO), and between 1 wt. %-5 wt. % of diphenyliodonium hexafluorophosphate (DPIHFP).

In some implementations, the first polymeric chain and the second polymeric chain may form the protective layer by participating in one or more cross-linking polymerization reactions with each other responsive to exposure to one or more cationic photo initiators (e.g., ultraviolet (UV) curing accelerators). For example, the one or more cross-linking polymerization reactions may include ring-opening polymerization (ROP). In some aspects, the one or more ultraviolet (UV) curing accelerators includes onium salts (e.g., one or more triphenylsulfonium salts), one or more diazonium salts, one or more diaryliodonium salts, one or more ferrocenium salts, one or more metallocene compounds, one or more antimony salts, and/or one or more polyols that may serve as reactive diluents.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

Like reference numbers and designations in the various drawings indicate like elements.

DETAILED DESCRIPTION

Figure 1:
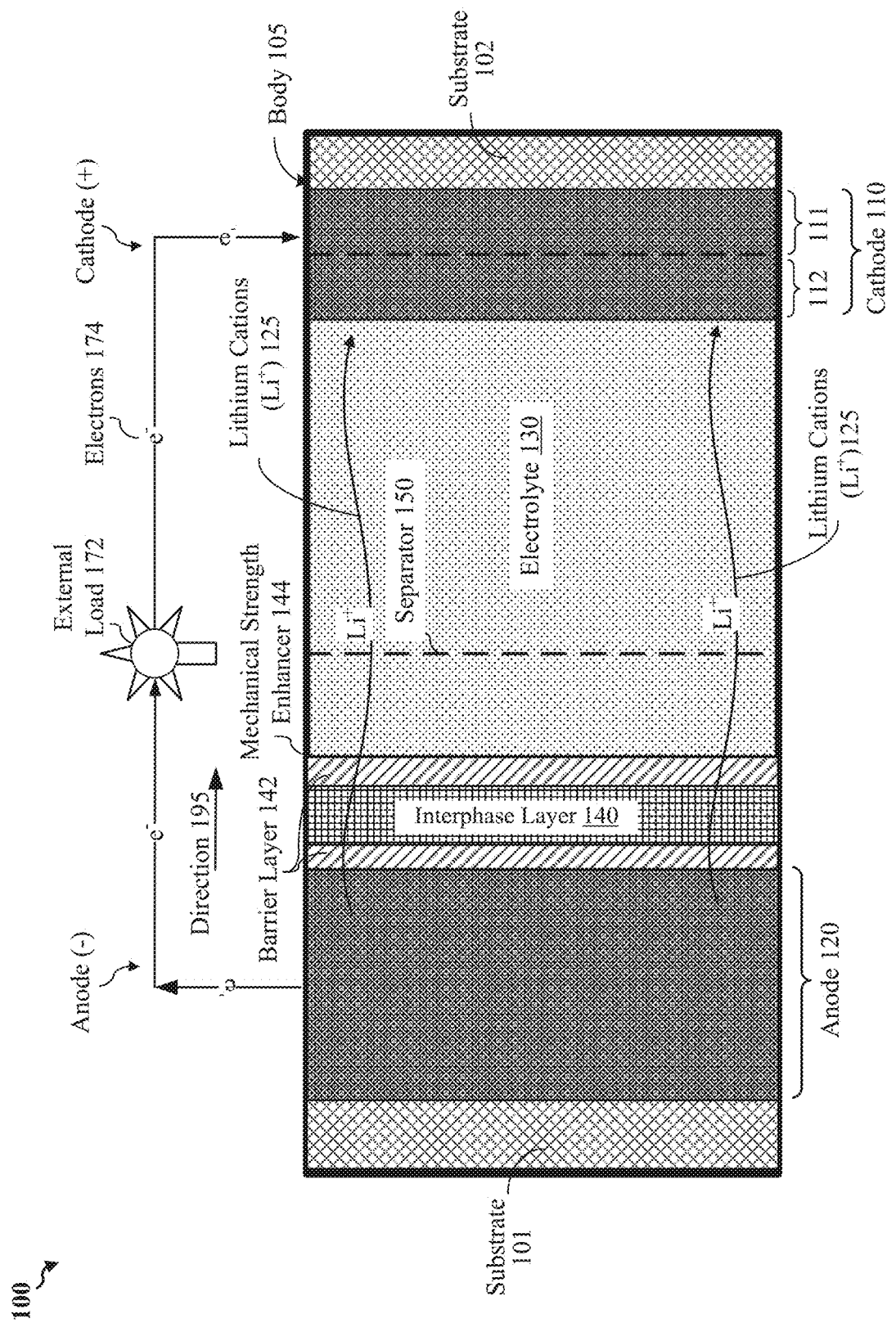
FIG. 1 shows a diagram depicting an example battery, according to some implementations.

The following description is directed to some example implementations for the purposes of describing innovative aspects of this disclosure. However, a person having ordinary skill in the art will readily recognize that the teachings herein can be applied in a multitude of different ways. The described implementations can be implemented in any type of electrochemical cell, battery, or battery pack, and can be used to compensate for various performance related deficiencies. As such, the disclosed implementations are not to be limited by the examples provided herein, but rather encompass all implementations contemplated by the attached claims. Additionally, well-known elements of the disclosure will not be described in detail or will be omitted so as not to obscure the relevant details of the disclosure.

Batteries typically include several electrochemical cells that can be connected to each other to provide electric power to a wide variety of devices such as (but not limited to) mobile phones, laptops, electric vehicles (EVs), factories, and buildings. Certain types of batteries, such as lithium-ion or lithium-sulfur batteries, may be limited in performance by the type of electrolyte used or by uncontrolled battery side reactions. As a result, optimization of the electrolyte may improve the cyclability, the specific discharge capacity, the discharge capacity retention, the safety, and the lifespan of a respective battery. For example, in an unused or "fresh" battery, lithium cations ($Li^+$) are transported freely from the anode to the cathode upon activation and later during initial and subsequent discharge cycles. Then, during battery charge cycles, lithium cations ($Li^+$) may be forced to migrate back from their electrochemically favored positions in the cathode to the anode, where they are stored for subsequent use. This cyclical discharge-charge process associated with rechargeable batteries can result in the generation of undesirable chemical species that can interfere with the transport of lithium cations ($Li^+$) to and from the cathode during respective discharge and charge of the battery. Specifically, lithium-containing polysulfide intermediate species (referred to herein as "polysulfides") are generated when lithium cations ($Li^+$) interact with elemental sulfur (or, in some configurations, lithium sulfide, $Li_2S$) present in the cathode. These polysulfides are soluble in the electrolyte and, as a result, diffuse throughout the battery during operational cycling, thereby resulting in loss of active material from cathode. Generation of excessive concentration levels of polysulfides can result in unwanted battery capacity decay and cell failure during operational cycling, potentially reducing the driving range for electric vehicles (EVs) and increasing the frequency with which such EVs need recharging.

In some cases, polysulfides participate in the formation of inorganic layers in a solid electrolyte interphase (SEI) provided in the battery. In one example, the anode may be protected by a stable inorganic layer formed in the electrolyte and containing 0.020 M $Li_2S_5$ (0.10 M sulfur) and 5.0 wt. % $LiNO_3$. The anode with a lithium fluoride and polysulfides ($LiF-Li_2S_x$) may enrich the SEI and result in a stable Coulombic efficiency of 95% after 233 cycles for Li—Cu half cells, while preventing formation of lithium dendrites or other uncontrolled lithium growths that can extend from the anode to the cathode and result in a failed or ruptured cell. However, when polysulfides are generated at certain concentrations (such as greater than 0.50 M sulfur), formation of the SEI may be hindered. As a result, lithium metal from the anode may be undesirably etched, creating a rough and imperfect surface exposed to the electrolyte. This unwanted deterioration (etching) of the anode due to a relatively high concentration of polysulfides may indicate that polysulfide dissolution and diffusion may be limiting battery performance.

In some implementations, the porosity of a carbonaceous cathode may be adjusted to achieve a desired balance between maximizing energy density and inhibiting the migration of polysulfides into and/or throughout the battery's electrolyte. As used herein, carbonaceous may refer to materials containing or formed of one or more types or configuration of carbon. For example, cathode porosity may be higher in sulfur and carbon composite cathodes than in conventional lithium-ion battery electrodes. Denser electrodes with relatively low porosity may minimize electrolyte intake, parasitic weight, and cost. Sulfur utilization may be limited by the solubility of polysulfides and conversion from those polysulfides into lithium sulfide ($Li_2S$). The conversion of polysulfides into lithium sulfide may be based on the accessible surface area of the cathode. Aspects of the present disclosure recognize that cathode porosity may be adjusted based on electrolyte compositions to maximize battery volumetric energy density. In addition, or in the alternative, one or more protective layers or regions can be added to surfaces of the cathode and/or the anode exposed to the electrolyte to adjust cathode porosity levels. In some aspects, these protective layers or regions can inhibit the undesirable migration of polysulfides throughout the battery.

Various aspects of the subject matter disclosed herein relate to a lithium-sulfur battery including a liquid-phase electrolyte, which may include a ternary solvent package and one or more additives. In some implementations, the lithium-sulfur battery may include a cathode, an anode positioned opposite to the cathode, and an electrolyte. The cathode may include several regions, where each region may be defined by two or more carbonaceous structures adjacent to and in contact with each other. In some instances, the electrolyte may be interspersed throughout the cathode and in contact with the anode. In some aspects, the electrolyte may include a ternary solvent package and 4,4'-thiobisbenzenethiol (TBT). In other instances, the electrolyte may include the ternary solvent package and 2-mercaptobenzothiazole (MBT).

In various implementations, the ternary solvent package may include 1,2-Dimethoxyethane (DME), 1,3-Dioxolane (DOL), tetraethylene glycol dimethyl ether (TEGDME) and one or more additives, which may include a lithium nitrate ($LiNO_3$), all which may be in a liquid-phase. In some implementations, the ternary solvent package may be prepared by mixing approximately 5,800 microliters (µL) of DME, 2,900 microliters (µL) of DOL, and 1,300 microliters (µL) of TEGDME with one another to create a mixture. Approximately 0.01 mol of lithium bis(trifluoromethanesulfonyl)imide (LiTFSI) may be dissolved into the ternary solvent package to produce an approximate dilution level of 1 M LiTFSI in DME:DOL:TEGDME at a volume ratio of 2:1:1 including approximately 2 weight percent (wt. %) lithium nitrate. In other implementations, the ternary solvent package may be prepared with 2,000 microliters (µL) of DME, 8,000 microliters (µL) of DOL, and 2,000 microliters (µL) of TEGDME and include approximately 0.01 mol of dissolved lithium bis(trifluoromethanesulfonyl)imide (LiTFSI). In some aspects, the ternary solvent package may be prepared at a first approximate dilution level of 1 molar (M) LiTFSI in a mixture of DME:DOL:TEGDME. In other instances, the ternary solvent package may be prepared at a second approximate dilution level of approximately 1 M LiTFSI in DME:DOL:TEGDME at an approximate volume ratio of 1:4:1 and include either an addition of 5M TBT solution or an addition of 5M MBT solution, or an addition of other additives and/or chemical substances.

In various implementations, each carbonaceous structure may include a relatively high-density outer shell region and a relatively low-density core region. In some aspects, the core region may be formed within an interior portion of the outer shell region. The outer shell region may have a carbon density between approximately 1.0 grams per cubic centimeter (g/cc) and 3.5 g/cc. The core region may have a carbon density of between approximately 0.0 g/cc and 1.0 g/cc or some other range lower than the first carbon density. In other implementations, each carbonaceous structure may include an outer shell region and core region having the same or similar densities, for example, such that the carbonaceous structure does not include a graded porosity.

Various regions of the cathode may include microporous channels, mesoporous channels, and macroporous channels interconnected to each other to form a porous network extending from the outer shell region to the core region. For example, in some aspects, the porous network may include pores that each have a principal dimension of approximately 1.5 nm.

In some implementations, one or more portions of the porous network may temporarily micro-confine electroactive materials such as (but not limited to) elemental sulfur within the cathode, which may increase battery specific capacity by complexing with lithium cations ($Li^+$). In some aspects, the ternary solvent package may have a tunable polarity, a tunable solubility, and be capable of transporting lithium cations ($Li^+$). In addition, the ternary solvent package may at least temporarily suspend polysulfides (PS) during charge-discharge cycles of the battery.

Particular implementations of the subject matter described in this disclosure can be implemented to realize one or more potential advantages. In some implementations, the porous network formed by the interconnection of microporous, mesoporous, and macroporous channels within the cathode may include a plurality of pores having a multitude of different pore sizes. In some implementations, the plurality of pores may include micropores having a pore size less than approximately 2 nm, may include mesopores having a pore size between approximately 5 and 50 nm, and may include macropores having a pore size greater than approximately 50 nm. The micropores, mesopores, and macropores may collectively mitigate the undesirable migration or diffusion of polysulfides throughout the electrolyte. Since the poly sulfide shuttle effect may result in the loss of active material from the cathode, the ability to mitigate or reduce the polysulfide shuttle effect can increase battery performance.

In one implementation, the micropores may have a pore size of approximately 1.5 nm selected to micro-confine elemental sulfur ($S_8$, or smaller chains/fragments of sulfur, for example in the form of $S_2$, $S_4$ or $S_6$) pre-loaded into the cathode. The micro-confinement of elemental sulfur within the cathode may allow TBT or MBT complexes generated during battery cycling to inhibit the migration of long-chain polysulfides within the mesopores of the cathode. Accumulation of these long-chain polysulfides within the mesopores of the cathode may cause the cathode to volumetrically expand to retain the polysulfides and thereby reduce the polysulfide shuttle effect. Accordingly, lithium cations ($Li^+$) may continue to transport freely between the anode and the cathode via the electrolyte without being blocked or impeded by the polysulfides. The free movement of lithium cations ($Li^+$) throughout the electrolyte without interference by polysulfides can increase battery performance.

In addition, or the alternative, one or more protective layers, sheaths, films, and/or regions (collectively referred to herein as "protective layers") may be disposed on the anode and/or the cathode and/or the separator and in contact with the electrolyte. The protective layers may include materials capable of binding with polysulfides to impede polysulfide migration and prevent lithium dendrite formation. In some aspects, the protective layers may be arranged in different configurations and used with any of the electrolyte chemistries and/or compositions disclosed herein, which in turn may result in complete tunability of the battery.

In one implementation, carbonaceous materials may be grafted with fluorinated polymer chains and deposited on one or more exposed surfaces of the anode. The fluorinated polymer chains can be cross-linked into a polymeric network on contact with Lithium metal from the anode surface via the Wurtz reaction. The cross-linked polymeric network formation may, in turn, suppress Lithium metal dendrite formation associated with the anode, and may also generate Lithium fluoride. Fluorinated polymers within the polymeric network may participate in chemical reactions during battery operational cycling to yield Lithium fluoride. Formation of the lithium fluoride may involve the chemical binding of lithium cations ($Li^+$) from the electrolyte with fluorine ions.

In addition, or the alternative, the polymeric network may be combined with any of the electrolyte chemistries and/or compositions disclosed herein and/or a protective sheath disposed on the cathode. In one implementation, the protective sheath can be formed by combining compounds containing di-functional, or higher functionality Epoxy and Amine or Amide compounds. Their intermolecular cross-linking would result in formation of 3D network with high chemical resistance to dissolution in electrolyte. Composition, for example, may include a tri-functional epoxy compound and a di-amine oligomer-based compound, which may react with each other to produce a protective lattice that can bind to polysulfides generated in the cathode and prevent their migration or diffusion into the electrolyte. In addition, the protective lattice may diffuse through one or more cracks that may form in the cathode due to battery cycling. The protective lattice, when diffused throughout such cracks formed in the cathode, may increase the structural integrity of the cathode, and reduce potential rupture of the cathode associated with volumetric expansion.

In various implementations, one or more of the disclosed battery components may be combined with a conformal coating disposed on edges or surfaces of the anode exposed to the electrolyte. In some implementations, the conformal coating may include a graded interface layer that may replace the polymeric network. In some aspects, the graded interface layer may include a tin fluoride layer and a tin-lithium alloy region formed between the tin fluoride layer and the anode. The tin-lithium alloy region may form a layer of lithium fluoride uniformly dispersed between the anode and the tin-fluoride layer in response to operational cycling of the battery.

In various implementations, a lithium-sulfur battery employing various aspects of the present disclosure may include an electroactive material extracted from an external source, e.g., a subterranean source and/or an extraterrestrial subterranean source. In such implementations, the cathode may be prepared as a sulfur-free cathode including functional pores that may micro-confine the electroactive material within the cathode. In some aspects, the cathode may include aggregates including a multitude of carbonaceous particles joined together, and may include agglomerates including a multitude of the aggregates joined together. In one implementation, the carbonaceous materials used to form the cathode (and/or the anode) may be tuned to define unique pore sizes, size ranges, and volumes. In some implementations, the carbonaceous particles may include non-tri-zone particles with and without tri-zone particles. In other implementations, the carbonaceous particles may not include tri-zone particles. Each tri-zone particle may include micropores, mesopores, and macropores, and both the non-tri-zone and tri-zone particles may each have a principal dimension in an approximate range of 20 nm to 300 nm. Each of the carbonaceous particles may include carbonaceous fragments nested within each other and separated from immediate adjacent carbonaceous fragments by mesopores. In some aspects, each of the carbonaceous particles may have a deformable perimeter that changes in shape and coalesces with adjacent materials.

Some of the pores may be distributed throughout the plurality of carbonaceous fragments and/or the deformable perimeters of the carbonaceous particles. In various implementations, mesopores may be interspersed throughout the aggregates, and macropores may be interspersed throughout the plurality of agglomerates. In one implementation, each mesopore may have a principal dimension between 3.3 nanometers (nm) and 19.3 nm, each aggregate may have a principal dimension in an approximate range between 10 nm and 10 micrometers (μm), and each agglomerate may have a principal dimension in an approximate range between 0.1 μm and 1,000 μm. As further described below, specific combinations of pore sizes matched with unique electrolyte formulations and protective layers can be used to reduce or mitigate the harmful effects of unwanted polysulfide diffusion, which may further increase battery performance.

FIG. 1 shows an example battery 100, according to some implementations. The battery 100 may be a lithium-sulfur electrochemical cell, a lithium-ion battery, or a lithium-sulfur battery. The battery 100 may have a body 105 that includes a first substrate 101, a second substrate 102, a cathode 110, an anode 120 positioned opposite to the cathode 110, and an electrolyte 130. In some aspects, the first substrate 101 may function as a current collector for the anode 120, and the second substrate 102 may function as a current collector for the cathode 110. The cathode 110 may include a first thin film 111 deposited onto the second substrate 102, and may include a second thin film 112 deposited onto the first thin film 111. In some implementations, the electrolyte 130 may be a liquid-phase electrolyte including one or more additives such as lithium nitrate, tin fluoride, lithium iodide, lithium bis(oxalate)borate (LiBOB), cesium nitrate, cesium fluoride, ionic liquids, lithium fluoride, fluorinated ether, TBT, MBT, DPT and/or the like. Suitable solvent packages for these example additives may include various dilution ratios, including 1:1:1 of 1,3-dioxolane (DOL), 1,2-dimethoxyethane, (DME), tetraethylene glycol dimethyl ether (TEGDME), and/or the like.

Although not shown for simplicity, in one implementation, a lithium layer may be electrodeposited on one or more exposed carbon surfaces of the anode 120. In some instances, the lithium layer may include elemental lithium provided by the ex-situ electrodeposition of lithium onto exposed surfaces of the anode 120. In some aspects, the lithium layer may include lithium, calcium, potassium, magnesium, sodium, and/or cesium, where each metal may be ex-situ deposited onto exposed carbon surfaces of the anode 120. The lithium layer may provide lithium cations ($Li^+$) available for transport to-and-from the cathode 110 during operational cycling of the battery 100. As a result, the battery 100 may not need an additional lithium source for operation. Instead of using lithium sulfide, elemental sulfur ($S_8$) may be pre-loaded in various pores or porous networks formed in the cathode 110. During operational cycling of the battery, the elemental sulfur may form lithium-sulfur complexes that can micro-confine (at least temporarily) greater amounts of lithium than conventional cathode designs. As a result, the battery 100 may outperform batteries that rely on such conventional cathode designs.

In various implementations, the lithium layer may dissociate and/or separate into lithium cations (Li$^+$) 125 and electrons 174 during a discharge cycle of the battery 100. The lithium cations (Li$^+$) 125 may migrate from the anode 120 towards the cathode 110 through the electrolyte 130 to their electrochemically favored positions within the cathode 110, as depicted in the example of FIG. 1. As the lithium cations (Li$^+$) 125 move through the electrolyte 130, electrons 174 are released from lithium cations (Li$^+$) 125 and become available to carry charge, and therefore conduct an electric current, between the anode 120 and cathode 110. As a result, the electrons 174 may travel from the anode 120 to the cathode 110 through an external circuit to power an external load 172. The external load 172 may be any suitable circuit, device, or system such as (but not limited to) a lightbulb, consumer electronics, or an electric vehicle (EV).

In some implementations, the battery 100 may include a solid-electrolyte interphase layer 140. The solid-electrolyte interphase layer 140 may, in some instances, be formed artificially on the anode 120 during operational cycling of the battery 100. In such instances, the solid-electrolyte interphase layer 140 may also be referred to as an artificial solid-electrolyte interphase, or A-SEI. The solid-electrolyte interphase layer 140, when formed as an A-SEI, may include tin, manganese, molybdenum, and/or fluorine compounds. Specifically, the molybdenum may provide cations, and the fluorine compounds may provide anions. The cations and anions may interact with each other to produce salts such as tin fluoride, manganese fluoride, silicon nitride, lithium nitride, lithium nitrate, lithium phosphate, manganese oxide, lithium lanthanum zirconium oxide (LLZO, $Li_7La_3Zr_2O_{12}$), etc. In some instances, the A-SEI may be formed in response to exposure of lithium cations (Li$^+$) 125 to the electrolyte 130, which may include solvent-based solutions including tin and/or fluorine.

In various implementations, the solid-electrolyte interphase layer 140 may be artificially provided on the anode 120 prior to activation of the battery 100. Alternatively, in one implementation, the solid-electrolyte interphase layer 140 may form naturally, e.g., during operational cycling of the battery 100, on the anode 120. In some instances, the solid-electrolyte interphase layer 140 may include an outer layer of shielding material that can be applied to the anode 120 as a micro-coating. In this way, formation of the solid-electrolyte interphase layer 140 on portions of the anode 120 facing the electrolyte 130 may result from electrochemical reduction of the electrolyte 130, which in turn may reduce uncontrolled decomposition of the anode 120.

In some implementations, the battery 100 may include a barrier layer 142 that flanks the solid-electrolyte interphase layer 140, for example, as shown in FIG. 1. The barrier layer 142 may include a mechanical strength enhancer 144 coated and/or deposited on the anode 120. In some aspects, the mechanical strength enhancer 144 may provide structural support for the battery 100, may prevent lithium dendrite formation from the anode 120, and/or may prevent protrusion of lithium dendrite throughout the battery 100. In some implementations, the mechanical strength enhancer 144 may be formed as a protective coating over the anode 120, and may include one or more carbon allotropes, carbon nano-onions (CNOs), nanotubes (CNTs), reduced graphene oxide, graphene oxide (GO), and/or carbon nano-diamonds. In some instances, the solid-electrolyte interphase layer 140 may be formed within the mechanical strength enhancer 144.

In some implementations, the first substrate 101 and/or the second substrate 102 may be a solid copper metal foil and may influence the energy capacity, rate capability, lifespan, and long-term stability of the battery 100. For example, to control energy capacity and other performance attributes of the battery 100, the first substrate 101 and/or the second substrate 102 may be subject to etching, carbon coating, or other suitable treatment to increase electrochemical stability and/or electrical conductivity of the battery 100. In other implementations, the first substrate 101 and/or the second substrate 102 may include or may be formed from a selection of aluminum, copper, nickel, titanium, stainless steel and/or carbonaceous materials depending on end-use applications and/or performance requirements of the battery 100. For example, the first substrate 101 and/or the second substrate 102 may be individually tuned or tailored such that the battery 100 meets one or more performance requirements or metrics.

In some aspects, the first substrate 101 and/or the second substrate 102 may be at least partially foam-based or foam-derived, and can be selected from any one or more of metal foam, metal web, metal screen, perforated metal, or sheet-based three-dimensional (3D) structures. In other aspects, the first substrate 101 and/or the second substrate 102 may be a metal fiber mat, metal nanowire mat, conductive polymer nanofiber mat, conductive polymer foam, conductive polymer-coated fiber foam, carbon foam, graphite foam, or carbon aerogel. In some other aspects, the first substrate 101 and/or second substrate 102 may be carbon xerogel, graphene foam, graphene oxide foam, reduced graphene oxide foam, carbon fiber foam, graphite fiber foam, exfoliated graphite foam, or any combination thereof.

Figure 2:
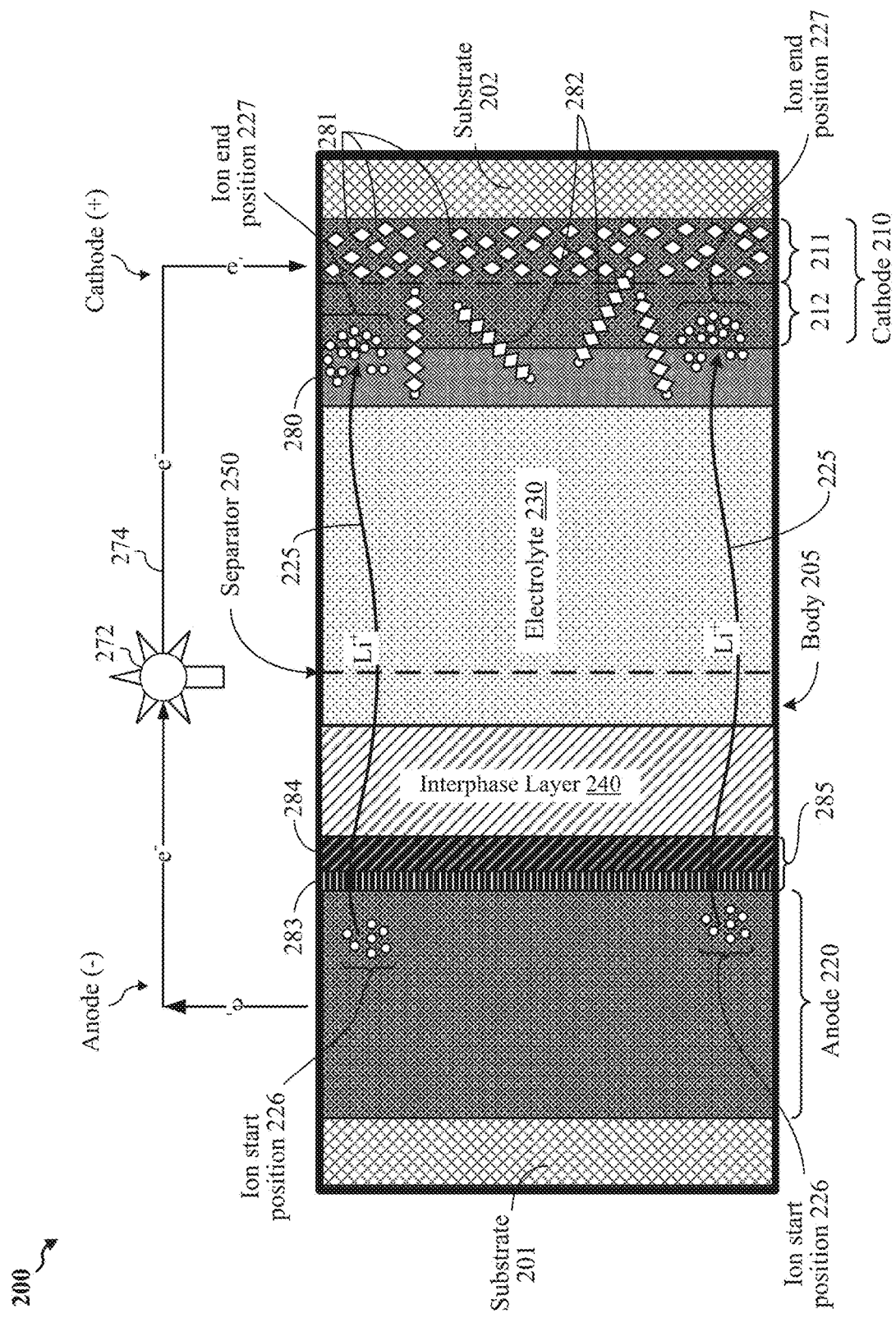
FIG. 2 shows a diagram depicting another example battery, according to some implementations.

FIG. 2 shows another example battery 200, according to some implementations. The battery 200 may be similar to the battery 100 of FIG. 1 in many respects, such that description of like elements is not repeated herein. In some implementations, the battery 200 may be a next-generation battery, such as a lithium-metal battery and/or a solid-state battery featuring a solid-state electrolyte. In other implementations, the battery 200 may include an electrolyte 230 and may therefore include any of the protective layers and/or electrolyte chemistries or compositions disclosed herein.

In some other implementations, the electrolyte 230 may be solid or substantially solid. For example, in some instances, the electrolyte 230 may begin in a gel phase and then later solidify upon activation of the battery 200. The battery 200 may reduce specific capacity or energy losses associated with the polysulfide shuttle effect by replacing conventional carbon scaffolded anodes with a single solid metal layer of lithium deposited in an initially empty cavity. For example, while the anode 120 of the battery 100 of FIG. 1 may include carbon scaffolds, the anode 220 of the battery 200 of FIG. 2 may be a lithium-metal anode devoid of any carbon material. In one implementation, the lithium-metal anode may be formed as a single solid lithium metal layer and referred to as a "lithium metal anode."

Energy density gains associated with various cathode materials may be based on whether lithium metal is preloaded into the cathode 210 and/or is prevalent in the electrolyte 230. Either the cathode 210 and/or the electrolyte 230 may provide lithium available for lithiation of the anode 220. For example, batteries having high-capacity cathodes may need thicker or energetically denser anodes in order to supply the increased quantities of lithium needed for usage by the high-capacity cathodes. In some implementations, the anode 220 may include scaffolded carbonaceous structures capable of being incrementally filled with lithium deposited therein. These carbonaceous structures may be capable of retaining greater amounts of lithium within the anode 220 as compared to conventional graphitic anodes, which may be limited to solely hosting lithium intercalated between alternating graphene layers or may be electroplated with lithium. For example, conventional graphitic anodes may use six carbon atoms to hold a single lithium atom. In contrast, by using a pure lithium metal anode, such as the anode 220, batteries disclosed herein may reduce or even eliminate carbon use in the anode 220, which may allow the anode 220 to store greater amounts of lithium in a relatively smaller volume than conventional graphitic anodes. In this way, the energy density of the battery 200 may be greater than conventional batteries of a similar size.

Lithium metal anodes, such as the anode 220, may be prepared to function with a solid-state electrolyte designed to inhibit the formation and growth of lithium dendrites from the anode. In some aspects, a separator 250 may further limit dendrite formation and growth. The separator 250 may have a similar ionic conductivity as the electrolyte 130 of FIG. 1 yet still reduce lithium dendrite formation. In some aspects, the separator 250 may be formed from a ceramic containing material and may, as a result, fail to chemically react with metallic lithium. As a result, the separator 250 may be used to control lithium ion transport through pores dispersed across the separator 250 while concurrently preventing a short-circuit by impeding the flow or passage of electrons through the electrolyte 230.

In one implementation, a void space (not shown for simplicity) may be formed within the battery 200 at or near the anode 220. Operational cycling of the battery 200 in this implementation may result in the deposition of lithium into the void space. As a result, the void space may become or transform into a lithium-containing region (such as a solid lithium metal layer) and function as the anode 220. In some aspects, the void space may be created in response to chemical reactions between a metal-containing electrically inactive component and a graphene-containing component of the battery 200. Specifically, the graphene-containing component may chemically react with lithium deposited into the void space during operational cycling and produce lithiated graphite ($LiC_6$) or a patterned lithium metal. The lithiated graphite produced by the chemical reactions may generate or lead to the generation and/or liberation of lithium cations ($Li^+$) and/or electrons that can be used to carry electric charge or a "current" between the anode 220 and the cathode 210 during discharge cycles of the battery 200.

And, in implementations for which the anode 220 is a solid lithium metal layer, the battery 200 may be able to hold more electroactive material and/or lithium per unit volume (as compared to batteries with scaffolded carbon and/or intercalated lithiated graphite anodes). In some aspects, the anode 220, when prepared as a solid lithium metal layer, may result in the battery 200 having a higher energy density and/or specific capacity than batteries with scaffolded carbon and/or intercalated lithiated graphite anodes, thereby resulting in longer discharge cycle times and additional power output per unit time. In instances for which use of a solid-state electrolyte is not desired or not optimal, the electrolyte 230 of the battery 200 of FIG. 2 may be prepared with any of the liquid-phase electrolyte chemistries and/or compositions disclosed herein. In addition, or in the alternative, the electrolyte 230 may include lithium and/or lithium cations ($Li^+$) available for cyclical transport from the anode 220 to the cathode 210 and vice-versa during discharge and charge cycles, respectively.

To reduce the migration of polysulfides 282 generated from elemental sulfur 281 pre-loaded in the cathode 210 into the electrolyte 230, the battery 200 may include one or more unique polysulfide retention features. For example, given that polysulfides are soluble in the electrolyte 230, some polysulfides may be expected to drift or migrate from the cathode 210 towards the anode 220 due to differences in electrochemical potential, chemical gradients, and/or other phenomena. The migration of polysulfides 282, especially long-chain form polysulfides, may impede the transport of lithium cations ($Li^+$) from the anode 220 to the cathode 210, which in turn may reduce the number of electrons available to generate an electric current that can power a load 272, such as an electric vehicle (EV). In some aspects, lithium cations ($Li^+$) 225 may be transported from one or more start positions 226 in or near the anode 220 along transport pathways to one or more end positions 227 in or near the cathode 210, as depicted in the example of FIG. 2.

In some implementations, a polymeric network 285 may be disposed on the anode 220 to reduce the uncontrolled migration of polysulfides 282 from the anode 220 to the cathode 210. The polymeric network 285 may include one or more layers of carbonaceous materials grafted with fluorinated polymer chains cross-linked with each other via the Wurtz reaction upon exposure to Lithium anode surface. The carbonaceous materials in the polymeric network 285, which may include (but are not limited to graphene, few layer graphene, FLG, many layer graphene, and MLG), may be chemically grafted with fluorinated polymer chains containing carbon-fluorine (C—F) bonds. These C—F bonds may chemically react with lithium metal from the surface of the anode 220 to produce highly ionic Carbon-Lithium bonds (C—Li). These formed C—Li bonds, in turn, may react with C—F bonds of polymer chains to form new Carbon-Carbon bonds that can also cross-link the polymer chains into (and thereby form) the polymeric network and generate lithium fluoride (LiF).

The resulting lithium fluoride may be uniformly distributed along the entire perimeter of the polymeric network 285, such that lithium cations ($Li^+$) are uniformly consumed to produce an interface layer 283 that may form or otherwise include lithium fluoride during battery cycling. The interface layer 283 may extend along a surface or portion of the anode 220 facing the cathode 210, as shown in FIG. 2. As a result, the lithium cations ($Li^+$) 225 are less likely to combine and/or react with each other and are more likely to combine and/or react with fluorine atoms made available by the fluorinated polymer chains in the polymeric network 285. The resulting reduction of lithium-lithium chemical reactions decreases lithium-lithium bonding responsible for undesirable lithium-metal dendrite formation. In addition, in some implementations, the polymeric network 285 may replace the interphase layer 240 that either naturally or artificially develops between the anode 220 and the electrolyte 230.

In one implementation, the interface layer 283 of the polymeric network 285 is in contact with the anode 220, and a protective layer 284 is disposed on top of the interface layer 283 (such as between the interface layer 283 and the interphase layer 240). In some aspects, the interface layer 283 and the protective layer 284 may collectively define a gradient of cross-linked fluoropolymer chains of varying degrees of density, for example, as described with reference to FIG. 7.

In some other implementations, the battery 200 may include a protective lattice 280 disposed on the cathode 210. The protective lattice 280 may include a tri-functional epoxy compound and a di-amine oligomer-based compound that may chemically react with each other to produce nitrogen and oxygen atoms. The nitrogen and oxygen atoms made available by the protective lattice 280 can bind with the polysulfides 282, thereby confining the polysulfides 282 within the cathode 210 and/or the protective lattice 280. Either of the cathode 210 and/or the protective lattice 280 may include carbon-carbon bonds and/or regions capable of flexing and/or volumetrically expanding during operational cycling of the battery 200, which may confine polysulfides 282 generated during the operational cycling to the cathode 210.

The electrolyte 130 of FIG. 1 and the electrolyte 230 of FIG. 2 may be prepared according to one or more recipes disclosed herein. For example, a ternary solvent package used in the electrolyte 130 and/or the electrolyte 230 may include DME, DOL and TEGDME. In one implementation, a solvent mixture may be prepared by mixing 5800 μL DME, 2900 μL DOL and 1300 μL TEGDME and stirring at room temperature (77° F. or 25° C.). Next, 0.01 mol (2,850.75 mg) of LiTFSI may be weighed. Afterwards, the 0.01 mol of LiTFSI may be dissolved in solvent mixture by stirring at room temperature to prepare approximately 10 mL 1 M LiTFSI in DME:DOL:TEGDME (volume:volume:volume 1:4:1). Finally, approximately 223 mg $LiNO_3$ may be added to 10 mL solution to produce 10 mL 1 M LiTFSI in DME:DOL:TEGDME (volume:volume:volume=58:29:13) with approximately 2 wt. % $LiNO_3$.

In addition, or the alternative, a ternary solvent package used in the electrolyte 130 and/or the electrolyte 230 may include DME, DOL, TEGDME, and TBT or MBT. A solvent mixture may be prepared by mixing 2,000 μL DME, 8,000 μL DOL and 2,000 μL TEGDME and stirring at room temperature (68° F. or 25° C.). Next, 0.01 mol (2,850.75 mg) of LiTFSI may be weighed and dissolved in approximately 3 mL of the solvent mixture by stirring at room temperature. Next, the dissolved LiTFSI and an additional solvent mixture (~8,056 mg) may be mixed in a 10 mL volumetric flask to produce approximately 1 M LiTFSI in DME:DOL:TEGDME (volume:volume:volume 1:4:1). Finally, approximately 0.05 mmol (~12.5 mg) TBT or MBT may be added to the 10 mL solution to produce 10 mL of 5M TBT or MBT solution.

Figure 3:
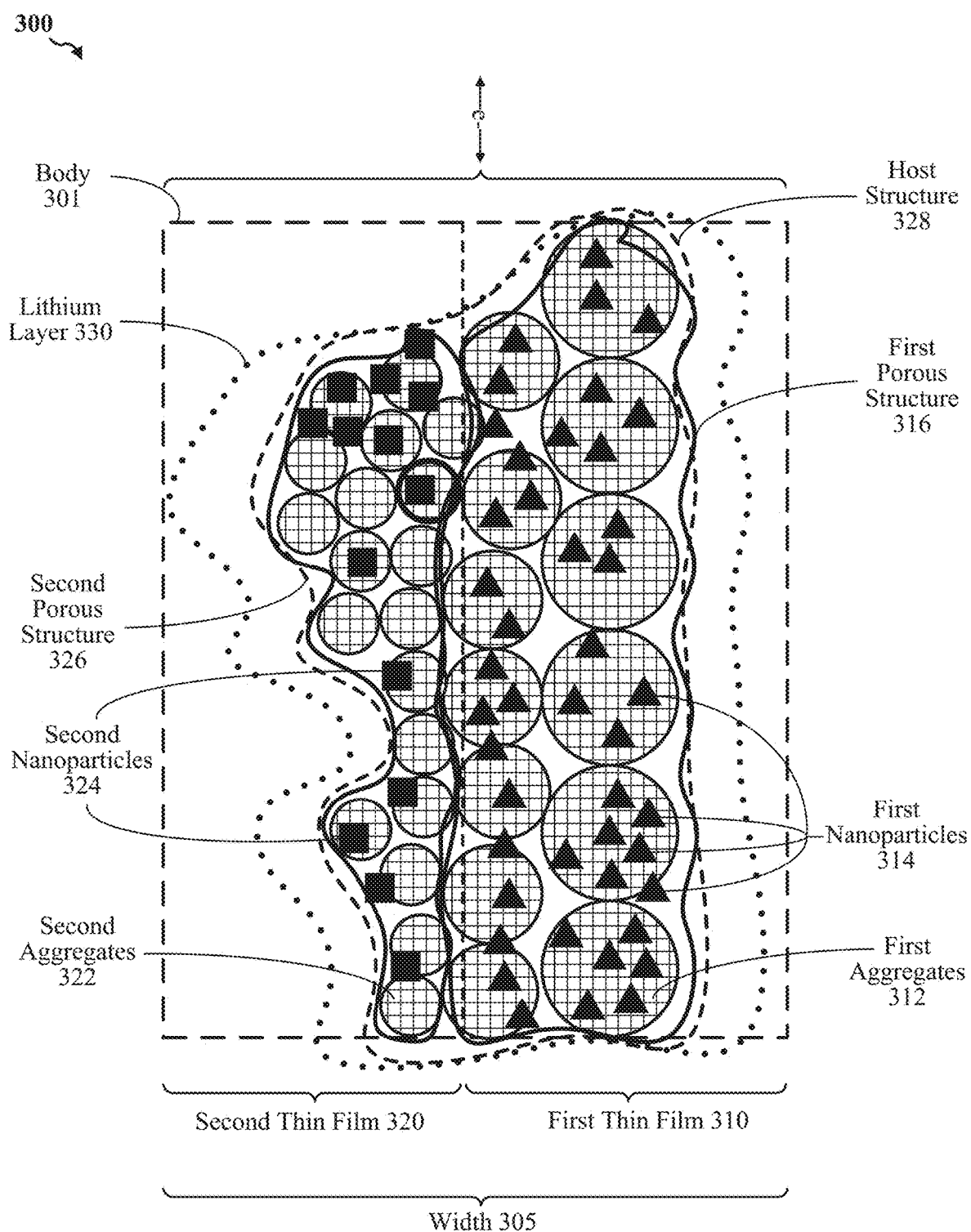
FIG. 3 shows a diagram of an example electrode of a battery, according to some implementations.

FIG. 3 shows an example electrode 300, according to some implementations. In various implementations, the electrode 300 may be one example of the cathode 110 and/or the anode 120 of the battery 100 of FIG. 1. In some other implementations, the electrode 300 may be one example of the cathode 210 of the battery 200 of FIG. 2. When the electrode 300 is implemented as a cathode (such as the cathode 110 of the battery 100 of FIG. 1), the electrode 300 may temporarily micro-confine an electroactive material, such as elemental sulfur, which may decrease the amount of sulfur available for reacting with lithium to produce polysulfides. In some aspects, the electrode 300 may provide an excess supply of lithium and/or lithium cations ($Li^+$) that can compensate for first-cycle operational losses associated with lithium-based batteries.

In some implementations, the electrode 300 may be porous and receptive of a liquid-phase electrolyte, such as the electrolyte 130 of FIG. 1. Electroactive species, such as lithium cations ($Li^+$) 125 suspended in the electrolyte 130, may chemically react with elemental sulfur pre-loaded into pores of the electrode 300 to produce polysulfides, which in turn may be trapped in the electrode 300 during battery cycling. In some aspects, the electrode 300 may expand in volume along one or more flexure points to retain additional quantities of polysulfides created during battery cycling. By confining the polysulfides within the electrode 300, aspects of the subject matter disclosed herein may allow the lithium cations ($Li^+$) 125 to flow freely through the electrolyte 130 from the anode 120 to the cathode 110 during discharge cycles of the battery 100 (e.g., without being impeded by the polysulfides). For example, when lithium cations ($Li^+$) 125 reach the cathode 110 and react with elemental sulfur contained in or associated with the cathode 110, sulfur is reduced to lithium polysulfides ($Li_2S_x$) at decreasing chain lengths according to the order $Li_2S_8 \rightarrow Li_2S_6 \rightarrow Li_2S_2 \rightarrow Li_2S$, where $2 \leq x \leq 8$). Higher order polysulfides may be soluble in various types of solvents and/or electrolytes, thereby interfering with the lithium ion transport necessary for healthy battery operation. Retention of such higher order polysulfides by the electrode 300 thereby allows the lithium cations ($Li^+$) 125 to flow more freely through the electrolyte 130, which in turn may increase the number of electrons available to carry charge from the anode 120 to the cathode 110.

The electrode 300 may include a body 301 defined by a width 305, and may include a first thin film 310 and a second thin film 320. The first thin film 310 may include a plurality of first aggregates 312 that join together to form a first porous structure 316 of the electrode 300. In some instances, the first porous structure 316 may have an electrical conductivity between approximately 0 and 500 S/m. In other instances, the first electrical conductivity may be between approximately 500 and 1,000 S/m. In some other instances, the first electrical conductivity may be greater than 1,000 S/m. In some aspects, the first aggregates 312 may include carbon nano-tubes (CNTs), carbon nano-onions (CNOs), flaky graphene, crinkled graphene, graphene grown on carbonaceous materials, and/or graphene grown on graphene.

In some implementations, the first aggregates 312 may be decorated with a plurality of first nanoparticles 314. In some instances, the first nanoparticles 314 may include tin, lithium alloy, iron, silver, cobalt, semiconducting materials and/or metals such as silicon and/or the like. In some aspects, CNTs, due to their ability to provide high exposed surface areas per unit volume and stability at relatively high temperatures (such as above 77° F. or 25° C.), may be used as a support material for the first nanoparticles 314. For example, the first nanoparticles 314 may be immobilized (such as by decoration, deposition, surface modification or the like) onto exposed surfaces of CNTs and/or other carbonaceous materials. The first nanoparticles 314 may react with chemically available carbon on exposed surfaces of the CNTs and/or other carbonaceous materials.

The second thin film 320 may include a plurality of second aggregates 322 that join together to form a second porous structure 326. In some instances, the electrical conductivities of the first porous structure 316 and/or the second porous structure 326 may be between approximately 0 S/m and 250 S/m. In instances for which the first porous structure 316 includes a higher concentration of aggregates than the second porous structure 326, the first porous structure 316 may have a higher electrical conductivity than the second porous structure 326. In one implementation, the first electrical conductivity may be between approximately 250 S/m and 500 S/m, while the second electrical conductivity may be between approximately 100 S/m and 250 S/m. In another implementation, the second electrical conductivity may be between approximately 250 S/m and 500 S/m. In yet another implementation, the second electrical conductivity may be greater than 500 S/m. In some aspects, the second aggregates 322 may include CNTs, CNOs, flaky graphene, crinkled graphene, graphene grown on carbonaceous materials, and/or graphene grown on graphene.

The second aggregates 322 may be decorated with a plurality of second nanoparticles 324. In some implementations, the second nanoparticles 324 may include iron, silver, cobalt, semiconducting materials and/or metals such as silicon and/or the like. In some instances, CNTs may also be used as a support material for the second nanoparticles 324. For example, the second nanoparticles 324 may be immobilized (such as by decoration, deposition, surface modification or the like) onto exposed surfaces of CNTs and/or other carbonaceous materials. The second nanoparticles 324 may react with chemically available carbon on exposed surfaces of the CNTs and/or other carbonaceous materials.

In some aspects, the first thin film 310 and/or the second thin film 320 (as well as any additional thin films disposed on their respective immediately preceding thin film) may be created as a layer or region of material and/or aggregates. The layer or region may range from fractions of a nanometer to several microns in thickness, such as between approximately 0 and 5 microns, between approximately 5 and 10 microns, between approximately 10 and 15 microns, or greater than 15 microns. Any of the materials and/or aggregates disclosed herein, such as CNOs, may be incorporated into the first thin film 310 and/or the second thin film 320 to result in the described thickness levels.

In some implementations, the first thin film 310 may be deposited onto the second substrate 102 of FIG. 1 by chemical deposition, physical deposition, or grown layer-by-layer through techniques such as Frank-van der Merwe growth, Stranski-Krastonov growth, Volmer-Weber growth and/or the like. In other implementations, the first thin film 310 may be deposited onto the second substrate 102 by epitaxy or other suitable thin-film deposition process involving the epitaxial growth of materials. The second thin film 320 and/or subsequent thin films may be deposited onto their respective immediately preceding thin film in a manner similar to that described with reference to the first thin film 310.

In various implementations, each of the first aggregates 312 and/or the second aggregates 322 may be a relatively large particle formed by many relatively small particles bonded or fused together. As a result, the external surface area of the relatively large particle may be significantly smaller than combined surface areas of the many relatively small particles. The forces holding an aggregate together may be, for example, covalent, ionic bonds, or other types of chemical bonds resulting from the sintering or complex physical entanglement of former primary particles.

As discussed above, the first aggregates 312 may join together to form the first porous structure 316, and the second aggregates 322 may join together to form the second porous structure 326. The electrical conductivity of the first porous structure 316 may be based on the concentration level of the first aggregates 312 within the first porous structure 316, and the electrical conductivity of the second porous structure 326 may be based on the concentration level of the second aggregates 322 within the second porous structure 326. In some aspects, the concentration level of the first aggregates 312 may cause the first porous structure 316 to have a relatively high electrical conductivity, and the concentration level of the second aggregates 322 may cause the second porous structure 326 to have a relatively low electrical conductivity (such that the first porous structure 316 has a greater electrical conductivity than the second porous structure 326). The resulting differences in electrical conductivities of the first porous structure 316 and the second porous structure 326 may create an electrical conductivity gradient across the electrode 300. In some implementations, the electrical conductivity gradient may be used to control or adjust electrical conduction throughout the electrode 300 and/or one or more operations of the battery 100 of FIG. 1.

As used herein, the relatively small source particles may be referred to as "primary particles," and the relatively large aggregates formed by the primary particles may be referred to as "secondary particles." As shown in FIG. 1, FIGS. 8 to 10, and elsewhere throughout the present disclosure, the primary particles may be or include multiple graphene sheets, layers, regions, and/or nanoplatelets fused and/or joined together. Thus, in some instances, carbon nano-onions (CNOs), carbon nano-tubes (CNTs), and/or other tunable carbon materials may be used to form the primary particles. In some aspects, some aggregates may have a principal dimension (such as a length, a width, and/or a diameter) between approximately 500 nm and 25 µm. Also, some aggregates may include innately-formed smaller collections of primary particles, referred to as "innate particles," of graphene sheets, layers, regions, and/or nanoplatelets joined together at orthogonal angles. In some instances, these innate particles may each have a respective dimension between approximately 50 nm and 250 nm.

The surface area and/or porosity of these innate particles may be imparted by secondary processes, such as carbon-activation by a thermal, plasma, or combined thermal-plasma process using one or more of steam, hydrogen gas, carbon dioxide, oxygen, ozone, KOH, ZnCl2, H3PO4, or other similar chemical agents alone or in combination. In some implementations, the first porous structure 316 and/or the second porous structure 326 may be produced from a carbonaceous gaseous species that can be controlled by gas-solid reactions under non-equilibrium conditions. Producing the first porous structure 316 and/or the second porous structure 326 in this manner may involve recombination of carbon-containing radicals formed from the controlled cooling of carbon-containing plasma species (which can be generated by excitement or compaction of feedstock carbon-containing gaseous and/or plasma species in a suitable chemical reactor).

In some implementations, the first aggregates 312 and/or the second aggregates 322 may have a percentage of carbon to other elements, except hydrogen, within each respective aggregate of greater than 99%. In some instances, a median size of each aggregate may be between approximately 0.1 microns and 50 microns. The first aggregates 312 and/or the second aggregates 322 may also include metal organic frameworks (MOFs).

In some implementations, the first porous structure 316 and second porous structure 326 may collectively define a host structure 328, for example, as shown in FIG. 3. In some instances, the host structure 328 may be based on a carbon scaffold and/or may include decorated carbons, for example, as shown in FIG. 8. The host structure 328 may provide structural definition to the electrode 300. In some instances, the host structure 328 may be fabricated as a positive electrode and used in the cathode 110 of FIG. 1. In other implementations, the host structure 328 may be fabricated as a negative electrode and used in the anode 120 of FIG. 1. In some other implementations, the host structure 328 may include pores having different sizes, such as micropores, mesopores, and/or macropores defined by the IUPAC. In some instances, at least some of the micropores may have a width of approximately 1.5 nm, which may be large enough to allow sulfur to be pre-loaded into the electrode 300 and yet small enough to confine polysulfides within the electrode 300.

The host structure 328, when provided within the electrode 300 as shown in FIG. 3, may include microporous, mesoporous, and/or macroporous pathways created by exposed surfaces and/or contours of the first porous structure 316 and/or the second porous structure 326. These pathways may allow the host structure 328 to receive an electrolyte, for example, by transporting lithium cations ($Li^+$) towards the cathode 110 of the battery 100. Specifically, the electrolyte 130 may infiltrate the various porous pathways of the host structure 328 and uniformly disperse throughout the electrode 300 and/or other portions of the battery 100. Infiltration of the electrolyte 130 into such regions of the host structure 328 may allow the lithium cations ($Li^+$) 125 migrating from the anode 120 towards the cathode 110 to react with elemental sulfur associated with the cathode 110 to form lithium-sulfur complexes. As a result, the elemental sulfur may retain additional quantities of lithium cations ($Li^+$) that would otherwise be achievable using non-sulfur chemistries such as lithium cobalt oxide (LiCoO) or other lithium-ion cells.

In some aspects, each of the first porous structure 316 and/or the second porous structure 326 may have a porosity based on one or more of a thermal, plasma, or combined thermal-plasma process using one or more of steam, hydrogen gas, carbon dioxide, oxygen, ozone, KOH, ZnCl2, H3PO4, or other similar chemical agents alone or in combination. For example, in one implementation, the macroporous pathways may have a principal dimension greater than 50 nm, the mesoporous pathways may have a principal dimension between approximately 20 nm and 50 nm, and the microporous pathways may have a principal dimension less than 4 nm. As such, the macroporous pathways and mesoporous pathways can provide tunable conduits for transporting lithium cations ($Li^+$) 125, and the microporous pathways may confine active materials within the electrode 300.

In some implementations, the electrode 300 may include one or more additional thin films (not shown for simplicity). Each of the one or more additional thin films may include individual aggregates interconnected with each other across different thin films, with at least some of the thin films having different concentration levels of aggregates. As a result, the concentration levels of any thin film may be varied (such as by gradation) to achieve particular electrical resistance (or conductance) values. For example, in some implementations, the concentration levels of aggregates may progressively decline between the first thin film 310 and the last thin film (such as in a direction 195 depicted in FIG. 1), and/or the individual thin films may have an average thickness between approximately 10 microns and approximately 200 microns. In addition, or in the alternative, the first thin film 310 may have a relatively high concentration of carbonaceous aggregates, and the second thin film 320 may have a relatively low concentration of carbonaceous aggregates. In some aspects, the relatively high concentration of aggregates corresponds to a relatively low electrical resistance, and the relatively low concentration of aggregates corresponds to a relatively high electrical resistance.

The host structure 328 may be prepared with multiple active sites on exposed surfaces of the first aggregates 312 and/or the second aggregates 322. These active sites, as well as the exposed surfaces of the first aggregates 312 and/or the second aggregates 322, may facilitate ex-situ electrodeposition prior to incorporation of the electrode 300 into the battery 100. Electroplating is a process that can create a lithium layer 330 (including lithium on exposed surfaces of the host structure 328) through chemical reduction of metal cations by application and/or modulation of an electric current. In implementations for which the electrode 300 serves as the anode 120 of the battery 100 in FIG. 1, the host structure 328 may be electroplated such that the lithium layer 330 has a thickness between approximately 1 and 5 micrometers (μm), 5 μm and 20 μm, or greater than 20 μm. In some instances, ex-situ electrodeposition may be performed at a location separate from the battery 100 prior to the assembly of the battery 100.

In various implementations, excess lithium provided by the lithium layer 330 may increase the number of lithium cations ($Li^+$) 125 available for transport in the battery 100, thereby increasing the storage capacity, longevity, and performance of the battery 100 (as compared with traditional lithium-ion and/or lithium-sulfur batteries).

In some aspects, the lithium layer 330 may produce lithium-intercalated graphite ($LiC_6$) and/or lithiated graphite based on chemical reactions with the first aggregates 312 and/or the second aggregates 322. Lithium intercalated between alternating graphene layers may migrate or be transported within the electrode 300 due to differences in electrochemical gradients during operational cycling of the battery 100, which in turn may increase the energy storage and power delivery of the battery 100.

Figure 4:
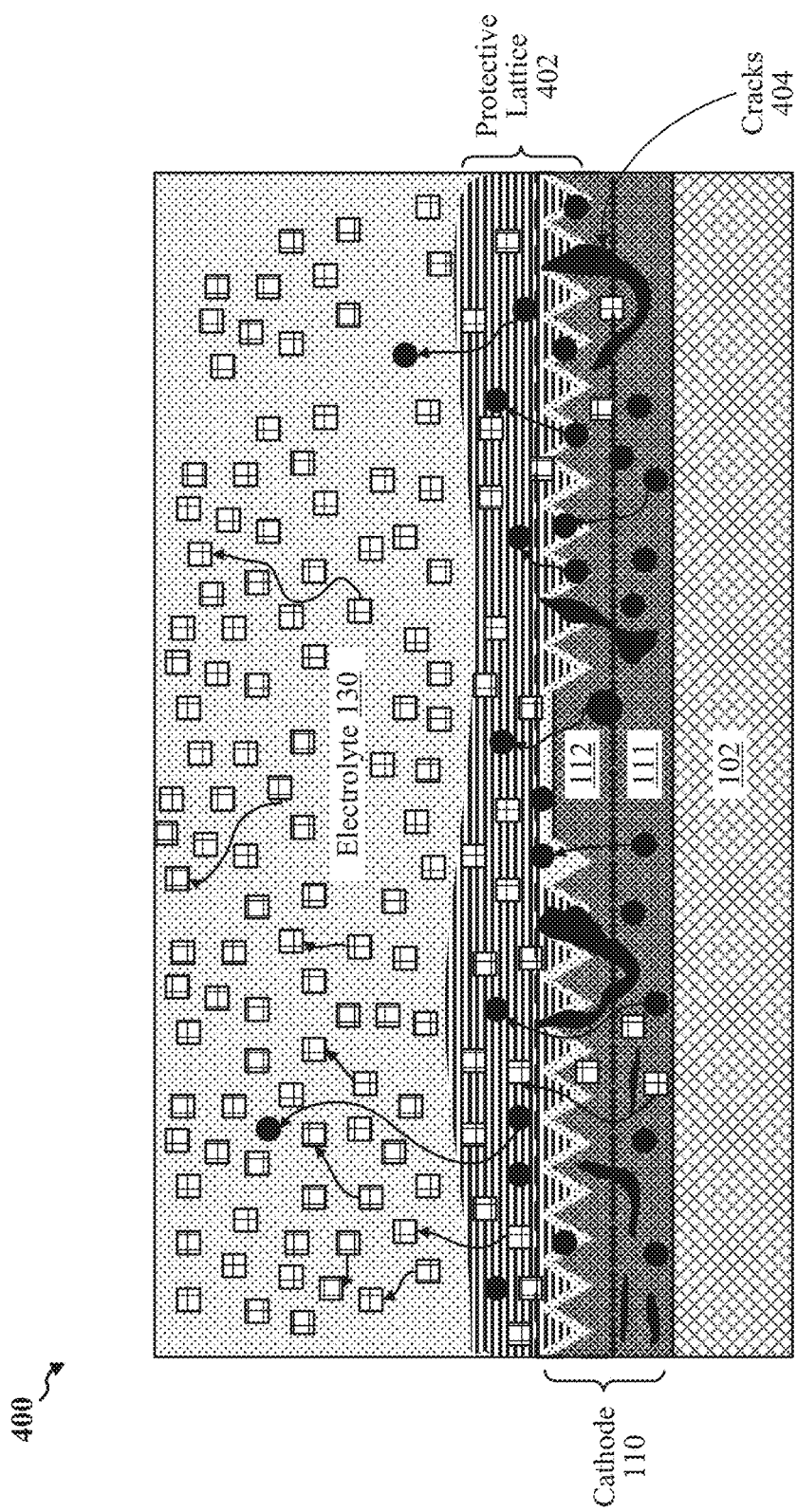
FIG. 4 shows a diagram a diagram of a portion of an example battery that includes a protective lattice, according to some implementations.

FIG. 4 shows a diagram of a portion of an example battery 400 that includes a protective lattice 402, according to some implementations. In some implementations, the protective lattice 402 may be disposed on the anode 220 of the battery 200. In other implementations, the protective lattice 402 may be disposed on the cathode 210 of the battery 200 (or other suitable batteries). In some aspects, the protective lattice 402 may be one example of the protective lattice 280 of FIG. 2. The protective lattice 402 may function with many components (e.g., anode, cathode, current collectors associated, carbonaceous materials, electrolyte, and separator) in a manner similar to the battery 100 of FIG. 1 and/or the battery 200 of FIG. 2.

Figure 6:
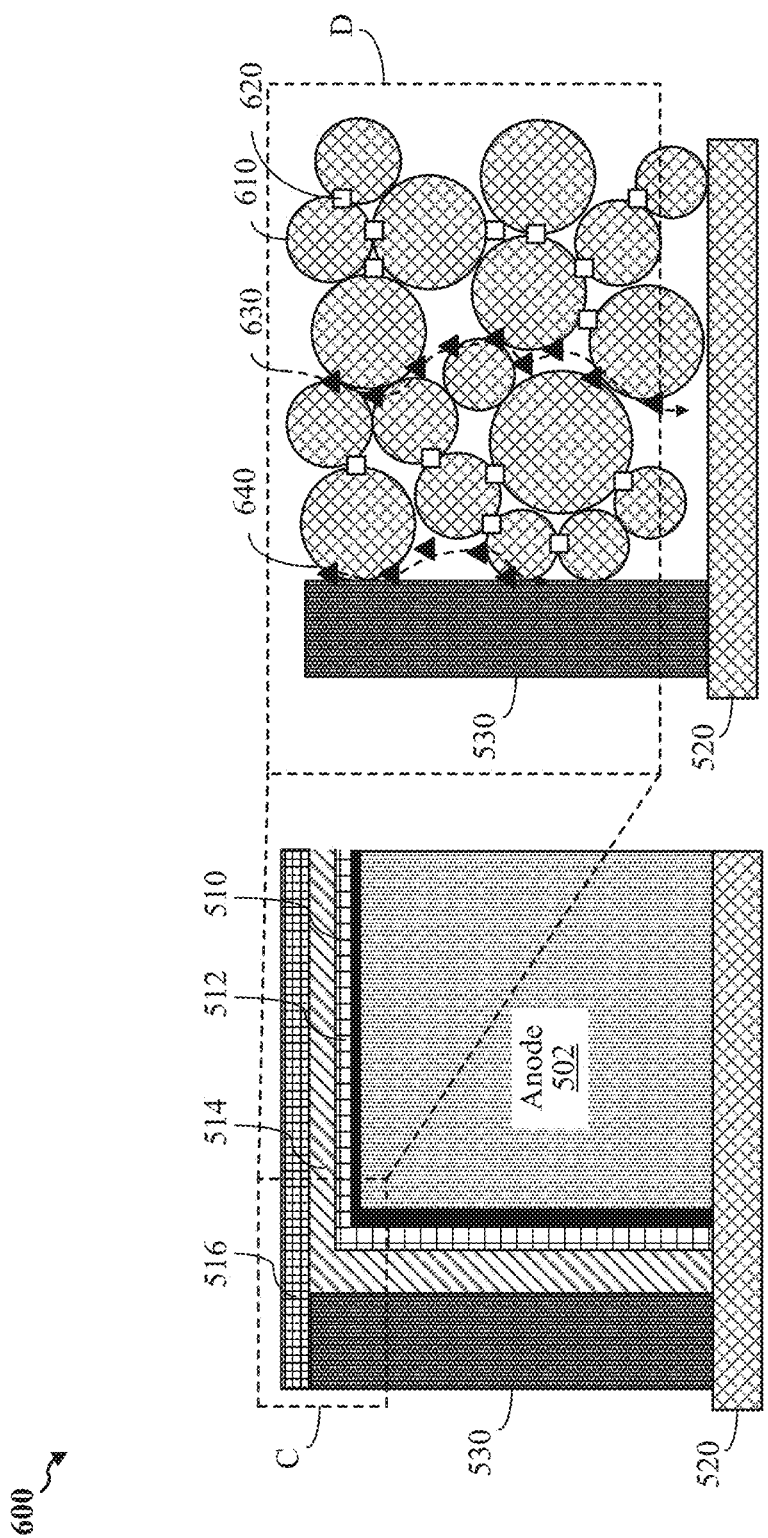
FIG. 6 shows a diagram of an enlarged portion of the anode structure of FIG. 5, according to some implementations.

The protective lattice 402 may include a tri-functional epoxy compound and a di-amine oligomer-based compound that can chemically react with each other to produce a 3D lattice structure (e.g., as shown in FIG. 6 and FIG. 8). In some aspects, the protective lattice 402 may prevent polysulfide migration within the battery 400 by providing nitrogen and oxygen atoms that can chemically bind with lithium present in the polysulfides, thereby impeding the migration of polysulfides through the electrolyte 130. As a result, lithium cations ($Li^+$) 125 can be more freely transported from the anode 120 and the cathode 110 of FIG. 1, thereby increasing battery performance metrics.

Cyclical usage of the cathode 110 may cause the formation of cracks 404 that at least partially extend into the cathode 110. In one implementation, the protective lattice 402 may disperse throughout the cracks 404, thereby reducing susceptibility of the cathode 110 to rupture during volumetric expansion of the cathode 110 caused by the retention of polysulfides within the cathode 110 during cyclical usage. In one implementation, the protective lattice 402 of FIG. 4 may have a cross-linked, 3D structure based on chemical reactions between di-functional, or higher functionality Epoxy and Amine or Amide compounds. For example, the di-functional, or higher functionality Epoxy compound may be trimethylolpropane triglycidyl ether (TMPTE), tris(4-hydroxyphenyl)methane triglycidyl ether, or tris(2,3-epoxypropyl) isocyanurate, and di-functional, or higher functionality Amine compound may be dihydrazide sulfoxide (DHSO) or one of polyetheramines, for example JEFFAMINE® D-230 characterized by repeating oxypropylene units in the backbone.

In various implementations, the chemical compounds may be combined and reacted with each other in any number of quantities, amounts, ratios and/or compositions to achieve different performance capabilities relating to binding with polysulfides generated during operation of the battery 400. For example, in one implementation, 113 mg of TMPTE and 134 mg of JEFFAMINE® D-230 polyetheramine may be mixed together and diluted with 1 mL to 10 mL of tetrahydrofuran (THF), or any other solvent. Additional amounts of TMPTE and/or JEFFAMINE may be mixed together and diluted in THF, or any other solvent, at an example ratio of 113 mg of TMPTE for every 134 mg of JEFFAMINE® D-230 polyetheramine. For this implementation, proof-of-concept (POC) data shows that the protective lattice 402 of FIG. 4 has a defined weight of approximately 2.6 wt. % of the cathode 110 of FIG. 1 or the cathode 210 of FIG. 2. In other implementations, the protective lattice 402 may have a weight of approximately 2 wt. % to 21 wt. % of the cathode 110 and/or the cathode 210, where an impedance increases of the cathode 110 and/or the cathode 210 may be expected at a weight level of approximately 10 wt. % or more for the protective lattice 402.

In various implementations, the protective lattice 402 may be fabricated based on a mole and/or molar ratio of —$NH_2$ group and epoxy groups and may further accommodate various forms of cross-linking between di-functional, or higher functionality Epoxy and Amine or Amide compound. In some aspects, such forms of cross-linking may include a fully cross-linked stage, e.g., where one —$NH_2$ group is chemically bonded with two epoxy groups and may further extend to configurations including one $NH_2$ group chemically bonded with only one epoxy group. Still further, in one or more implementations, mixtures including excess quantities (above the ratios presented here) of —$NH_2$ groups may be prepared to provide additional polysulfide binding capability for the protective lattice 402.

In some other implementations, the protective lattice 402 may be prepared by mixing 201 g of TMPTE with between 109 g and 283 g of JEFFAMINE® D-230 polyetheramine. The resulting mixture may be then diluted with 1 L to 20 L of a selected solvent (such as THF). The resultant diluted solution may be deposited and/or otherwise disposed on the cathode 110 to achieve a crosslinker content between 1 wt. % to 10 wt. %. Additional TMPTE and/or JEFFAMINE may be mixed together and diluted in THF, or another suitable solvent, at an example ratio of 201 g of TMPTE for every 109 g to 283 g of JEFFAMINE® D-230 polyetheramine.

In still other implementations, the protective lattice 402 may be prepared by mixing 201 g of TMPTE with between 74 g and 278 g DHSO. The resulting mixture may be then diluted with 1 L to 20 L of a selected solvent (such as THF). The resultant diluted solution may be deposited and/or otherwise disposed on the cathode 110 to achieve a crosslinker content between 1 wt. % to 10 wt. %. Additional TMPTE and/or JEFFAMINE may be mixed together and diluted in THF, or another suitable solvent, at an example ratio of 201 g of TMPTE for every 201 g to 278 g of JEFFAMINE® D-230 polyetheramine.

In one implementation, di-functional, or higher functionality Epoxy compound may chemically react with di-functional, or higher functionality amine compound to produce the protective lattice 402 in a 3D cross-linked form, which may include both functional epoxy compounds and amine containing molecules. In some aspects, the protective lattice 402, when deposited on the cathode 110 of FIG. 1 or the cathode 210 of FIG. 2, may have a thickness between approximately 1 nm and 5 μm.

In some implementations, the protective lattice 402 may increase the structural integrity of the cathode 110 or the cathode 210, may reduce surface roughness, and may retain polysulfides in the cathode. For example, in one implementation, the protective lattice 402 may serve as sheath on exposed surfaces of the cathode and bind with polysulfides to prevent their migration and diffusion into the electrolyte 130. In this way, aspects of the subject matter disclosed herein may prevent (or at least reduce) battery capacity decay by suppressing the polysulfide shuttle effect. In some aspects, the protective lattice 402 may also fill the cracks 404 formed in the cathode of FIG. 4 to improve cathode coating integrity. In various implementations, the protective lattice 402 may be prepared by drop casting processes in the presence of a solvent, where the resultant solution can penetrate in cracks 404 of the cathode 110 and bind with polysulfides in the cathode 110 to prevent their migration and/or diffusion throughout the electrolyte 130.

In various implementations, the protective lattice 402 may provide nitrogen atoms and/or oxygen atoms that can chemically bond with lithium in the polysulfides generated during operational battery cycling. In one example, the polysulfides may bond with available nitrogen atoms provided by, for example, DHSO. In another example, the polysulfides may bond with available oxygen atoms provided by, for example, DHSO. In yet another example, the polysulfides may bond with other available oxygen atoms.

In some other implementations, the recipes described above may be altered by replacing TMPTE with a tris(4-hydroxyphenyl)methane triglycidyl ether 910 and/or a tris(2,3-epoxypropyl) isocyanurate. In various implementations, the di-amine oligomer-based compound may be (or may include) a JEFFAMINE® D-230, or other polyetheramines containing polyether backbone normally based on either propylene oxide (PO), ethylene oxide (EO), or mixed PO/EO structure, for example JEFFAMINE® D-400, JEFFAMINE® T-403. The protective lattice 402 may also include various concentration levels of inert molecules, e.g., polyethylene glycol chains of various lengths, which may allow to fine-tune mechanical properties of protective lattice and the chemical bonding of various atoms to lithium present in the polysulfides.

Figure 5:
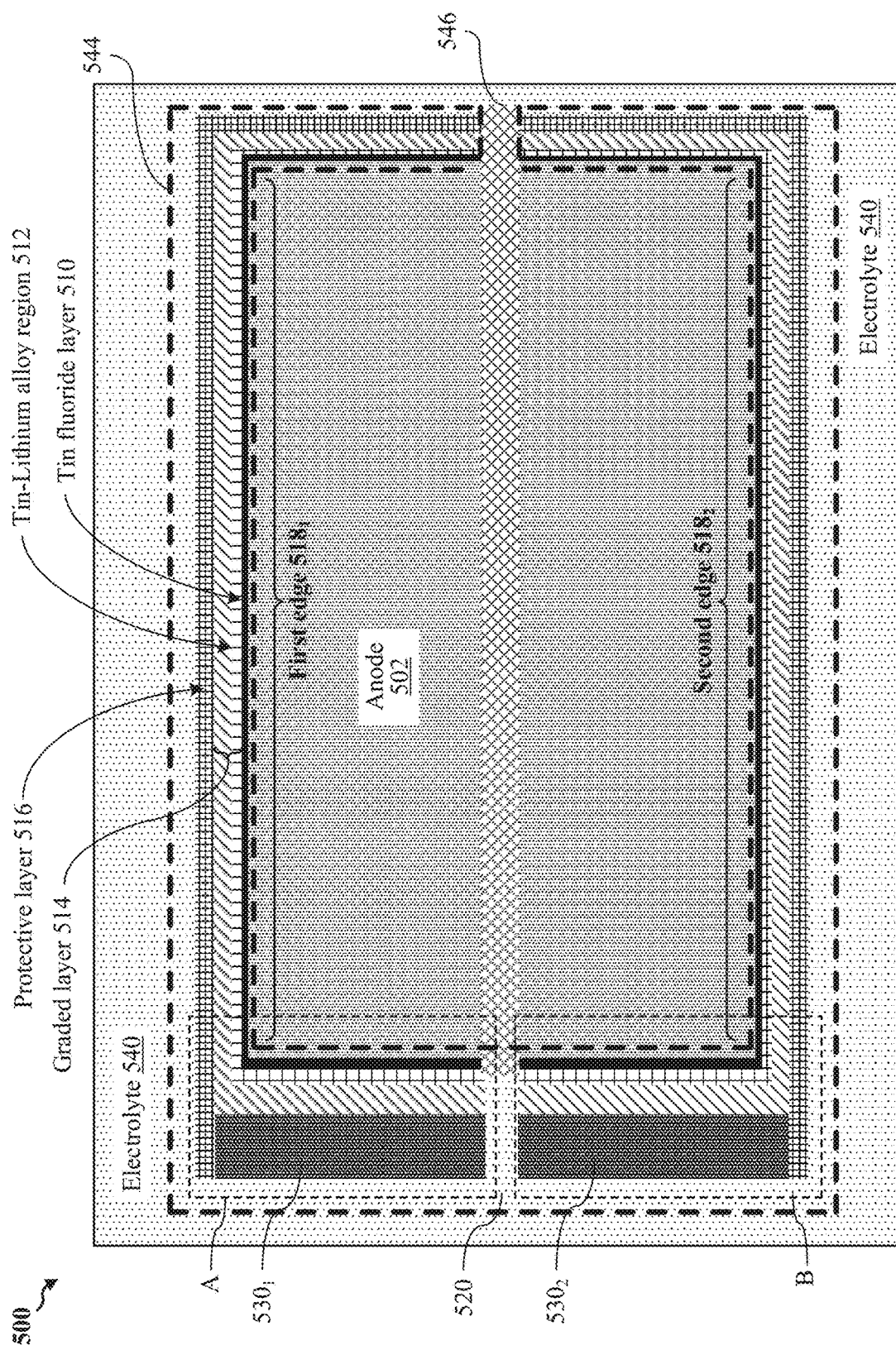
FIG. 5 shows a diagram of an anode structure including a tin fluoride (SnF$_2$) layer, according to some implementations.

FIG. 5 shows a diagram of an anode structure 500 that includes a tin fluoride ($SnF_2$) layer, according to some implementations. Specifically, the diagram depicts a cut-away schematic view of the anode structure 500 in which all of the components associated with a first region A have identical counterparts in a second region B, where the first and second regions A and B have opposite orientations around a current collector 520. As such, the description below with reference to the components of first region A is equally applicable to the components of second region B. In some aspects, the anode 502 may be one example of the anode 120 of FIG. 1 and/or the anode 220 of FIG. 2.

As discussed, lithium-sulfur batteries, such as the battery 100 of FIG. 1 and the battery 200 of FIG. 2, operate as conversion-chemistry type electrochemical cells in that sulfur pre-loaded into the cathode may dissolve rapidly into the electrolyte prior to and during operation. Lithium, which may be provided by lithiated anodes and/or may be prevalent in the electrolyte, dissociates into lithium cations ($Li^+$)

suitable for transport from the anode to the cathode through the electrolyte. The production of lithium cations (Li$^+$) is associated with a corresponding release of electrons, which may flow through an external circuit to power a load, as described with reference to FIG. 1. However, when lithium dissociates into lithium cations (Li$^+$) and electrons (e$^-$), some of the lithium cations (Li$^+$) may undesirably react with polysulfides produced in the cathode, and therefore may no longer be available to generate an output current or voltage. This consumption of lithium cations (Li$^+$) by polysulfides reduces the overall capacity of the host cell or battery, and may also facilitate corrosion of the anode, which can result in cell failure.

In some implementations, the protective layer 516 may be provided as passivation coating that can reduce the chemical reactivity of the anode 502 during cell assembly or formation. In some aspects, the protective layer 516 may be permeable to lithium cations (Li$^+$) while concurrently protecting the anode 502 from corrosion caused by chemical reactions between lithium cations (Li$^+$) and polysulfides. In other implementations, the protective layer 516 may be an artificial solid-electrolyte interphase (A-SEI) that can replace naturally occurring SEIs and/or other types of conventional A-SEIs. In various implementations, the protective layer 516 may be deposited as a liner on top of one or more films disposed on the anode 502. In some aspects, the protective layer 516 may be a self-generating layer that forms during electrochemical reactions associated with operational cycling of the battery. In some aspects, the protective layer 516 may have a thickness that is less than 5 microns. In other aspects, the protective layer 516 may have a thickness between 0.1 and 1.0 microns.

In various implementations, one or more engineered additives that may facilitate the formation and/or deposition of the protective layer 516 on the anode 502 may be provided within the electrolyte of the battery. In other implementations, the engineered additives may be an active ingredient of the protective layer 516. In some aspects, the protective layer 516 may provide tin ions and/or fluoride anions that can prevent undesirable lithium growths from a first edge $518_1$ and a second edge $518_2$ of the anode.

A graded layer 514 may be formed and/or deposited onto the anode 502 beneath the protective layer 516. In various implementations, the graded layer 514 may prevent lithium contained in or associated with the anode 502 from participating in undesirable chemical interactions and/or reactions with the electrolyte 540 that can lead to the growth of lithium-containing dendrites from the anode 502. The graded layer 514 may also facilitate the production of lithium fluoride based on chemical reactions between dissociated lithium cations (Li$^+$) and fluoride ions. As discussed, the presence of lithium fluoride in or near the anode 502 can decrease the polysulfide shuttle effect. For example, formation of lithium fluoride (e.g., form available lithium cations (Li$^+$) and fluorine ions) may occur uniformly across the entirety of the first edge $518_1$ and/or the second edge $518_2$ of the anode. In this way, localized regions of high lithium concentration in the electrolyte 540 near the anode 502 are substantially inhibited. As a result, lithium-lithium bonds contributing to the formation of lithium containing dendritic structures extending length-wise from the anode are correspondingly inhibited, thereby yielding free passage of lithium cations (Li$^+$) from the anode 502 into the electrolyte (e.g., as encountered during battery operational cycling). In some aspects, the uniform distribution of lithium throughout the graded layer 514 can increase a uniformity of a lithium-ion flux during battery operational cycling. In some aspects, the graded layer 514 may be approximately 5 nanometers (nm) in thickness.

In one or more implementations, the graded layer 514 may structurally reinforce the host battery in a manner that not only decreases or prevents lithium-containing dendritic growth from the anode 502 but also increases the ability of the anode 502 to expand and contract during operational cycling of the host battery without rupturing. In some aspects, the graded layer 514 has a 3D architecture with a graded concentration gradient (e.g., of one or more formative materials and/or ingredients including carbon, tin, and/or fluorine), which facilitates rapid lithium-ion transport. As a result, the graded layer 514 markedly improves overall battery efficiency and performance.

In some implementations, the graded layer 514 may provide an electrochemically desirable surface upon which the protective layer 516 may be grown or deposited. For example, in some aspects, the graded layer 514 may include compounds and/or organometallic compounds including (but not limited to) aluminum, gallium, indium, nickel, zinc, chromium, vanadium, titanium, and/or other metals. In other aspects, the graded layer 514 may include oxides, carbides and/or nitrides of aluminum, gallium, indium, nickel, zinc, chromium, vanadium, titanium, and/or other metals.

In some implementations, the graded layer 514 may include carbonaceous materials including (but not limited to) flaky graphene, few layer graphene (FLG), carbon nano onions (CNOs), graphene nanoplatelets, or carbon nanotubes (CNTs). In other implementations, the graded layer 514 may include carbon, oxygen, hydrogen, tin, fluorine and/or other suitable chemical compounds and/or molecules derived from tin fluoride and one or more carbonaceous materials. The graded layer 514 may be prepared and/or deposited either directly or indirectly on the anode 502 at a different concentration levels. For example, the graded layer 514 may include 5 wt. % carbonaceous materials with a balance of 95 wt. % tin fluoride, which may result in a relatively uniform disassociation of fluorine atoms and/or fluoride anions from the tin fluoride.

Other suitable ratios include: 5% carbonaceous materials with 95% tin fluoride; 10% carbonaceous materials with 90% tin fluoride, 15% carbonaceous materials with 85% tin fluoride, 20% carbonaceous materials with 80% tin fluoride, 25% carbonaceous materials with 75% tin fluoride, 30% carbonaceous materials with 70% tin fluoride, 35% carbonaceous materials with 65% tin fluoride, 40% carbonaceous materials with 60% tin fluoride, 45% carbonaceous materials with 55% tin fluoride, 50% carbonaceous materials with 50% tin fluoride, 55% carbonaceous materials with 45% tin fluoride, 55% carbonaceous materials with 45% tin fluoride, 60% carbonaceous materials with 40% tin fluoride, 65% carbonaceous materials with 35% tin fluoride, 70% carbonaceous materials with 30% tin fluoride, 75% carbonaceous materials with 25% tin fluoride, 80% carbonaceous materials with 20% tin fluoride, 85% carbonaceous materials with 15% tin fluoride, 90% carbonaceous materials with 10% tin fluoride, 95% carbonaceous materials with 5% tin fluoride. The fluorine atoms and/or fluoride anions may then uniformly react and combine with lithium cations (Li$^+$) to form lithium fluoride, as further discussed below.

In some implementations, lithium cations (Li$^+$) cycling between the anode 502 and the cathode (not shown in FIG. 5) may produce a tin-lithium alloy region 512 within the graded layer 514. In some aspects, operational cycling of the host battery may result in a uniform dispersion of lithium fluoride within the tin-lithium alloy region 512. The uniform dispersion of lithium fluoride may facilitate a defluorination reaction of at least some of tin (II) fluoride ($SnF_2$) within the tin fluoride layer 510 (and additional tin fluoride which may have dispersed into the graded layer 514 and/or the protective layer). The fluorine atoms and/or fluoride anions made available by the defluorination reaction may chemically bond with at least some of the lithium cations ($Li^+$) present in or near the anode 502, to create lithium fluoride (LiF) and correspondingly thereby prevent at least some of the lithium cations ($Li^+$) from bonding with each other and creating a lithium dendritic growth from the anode 502.

For example, at least a portion of the fluorine atoms and/or fluoride anions present in the tin fluoride may dissociate from the protective layer 516 and produce tin cations ($Sn^{2+}$) and fluorine anions ($2F^-$) via one or more chemical reactions. The fluorine atoms and/or fluoride anions dissociated from the protective layer 516 may chemically bond to at least some of the lithium cations ($Li^+$) present in the electrolyte 540 and/or dispersed throughout the protective layer 516 or the graded layer 514. In some aspects, the dissociated fluorine atoms may form Li—F bonds or Li—F compounds in the tin-lithium alloy region 512. In other aspects, the dissociated fluorine atoms may form a tin fluoride layer 510 within the graded layer 514.

In addition, in one implementation, at least some of the defluorinated tin fluoride may disperse uniformly throughout the graded layer 514 to produce lithium fluoride (LiF) crystals. The lithium fluoride crystals may act as an electrical insulator and prevent the flow of electrons from the anode 502 into the electrolyte 540 through the first edge $518_1$ and/or the second edge $518_2$ of the anode 502.

In various implementations, the graded layer 514 may be deposited on the anode 502 by one or more of atomic layer deposition (ALD), chemical vapor deposition (CVD), or physical vapor deposition (PVD). For example, ALD may be used to deposit protective films on the anode 502 such as, for example, an ALD film that at least partially reacts with the electrolyte 540 during high-pressure bonding processes. Accordingly, the ALD film may be used to produce the protective layer 516 or the graded layer 514 using an atomic plane available for lithium transfer. Such lithium transfer may be similar in principle to that observed for few layer graphene (FLG) or graphite, where alternating graphene layers in FLG or graphite intercalate lithium cations ($Li^+$) in various forms including as lithium titanium oxide (LTO), lithium iron phosphate ($PO_3$) (LFP). The described forms of intercalated lithium, e.g., LTO and/or LFP, may be oriented to facilitate rapid lithium atom and/or lithium ion transport and/or diffusion, which may be conducive for the formation and/or synthesis of lithium fluoride (e.g., in the tin fluoride layer 510 and/or elsewhere), as described earlier. Additional forms of intercalated lithium, e.g., perovskite lithium lanthanum titanate (LLTO), may also function to store lithium within the anode 502.

In some implementations, the graded layer 514 may include various distinct types and/or forms of carbon and/or carbonaceous materials, each having one or more physical attributes that can be selected or configured to adjust the reactivity of carbon with contaminants (such as polysulfides) present in the electrolyte 540 and/or the anode 502. In some aspects, the selectable physical attributes may include (but are not limited to) porosity, surface area, surface functionalization, or electric conductivity. In addition, the graded layer 514 may include binders or other additives that can be used to adjust one or more physical attributes of the carbonaceous materials to achieve a desired reactivity of carbon supplied by the carbonaceous materials with polysulfides present in the electrolyte 540 and/or the anode 502.

In one implementation, carbonaceous materials within the graded layer 514 may capture unwanted contaminants and thereby prevent the contaminants from chemically reacting with lithium available at exposed surfaces of the anode 502. Instead, the unwanted contaminants (e.g., polysulfides) may chemically react with various exposed surfaces of the carbonaceous materials within the graded layer 514 (e.g., through carbon-lithium interactions). In some implementations, the carbonaceous materials within the graded layer 514 may cohere to the available lithium. The degree of cohesion between the carbonaceous materials and the lithium cations ($Li^+$) may be selected or modified via chemical reactions induced during preparation of the graded layer 514.

In some implementations, various carbon allotropes may be incorporated within the graded layer 514 (such as in one or more portions of the tin-lithium alloy region 512 and/or the tin fluoride layer 510). These carbon allotropes may be functionalized with one or more reactants and used to form a sealant layer and/or region at an interface of carbon nanodiamonds within the graded layer 514 and the electrolyte 540. In some aspects, the carbon nanodiamonds may increase the mechanical robustness of the anode 502 and/or the graded layer 514. In other aspects, the carbon nanodiamonds may also provide exposed carbonaceous surfaces that may be used to decrease the polysulfide shuttle effect by micro-confining and/or bonding with polysulfides present in the electrolyte 540 in a manner that retains the polysulfides within defined regions of the battery external to the anode 502.

Alternatively, in other implementations, the carbon nanodiamonds within the graded layer 514 may be replaced with carbons and/or carbonaceous materials including surfaces and/or regions having a specific $L_A$ dimensions (e.g., $sp^2$ hybridized carbon), reduced graphene oxide (rGO), and/or graphene. In some aspects, employing the carbonaceous materials disclosed herein within a battery may increase carbon stacking and layer formation within the graded layer 514. Exfoliated and oxidized carbonaceous materials may also yield more uniform layered structures within the graded layer 514 (as compared to carbonaceous materials that have not been exfoliated and oxidized). In some aspects, solvents such as tetrabutylammonium hydroxide (TBA) and/or dimethyl formamide (DMF) treatments may be applied to the carbonaceous materials disclosed herein to increase the wetting of exposed carbonaceous surfaces within the graded layer 514.

In some implementations, slurries used to form the graded layer 514 may be doped to improve or otherwise influence the crystalline structure of carbonaceous materials within the graded layer 514. For example, addition of certain dopants may influence the crystalline structure of the carbonaceous materials in a certain corresponding way, and functional groups may be added (e.g., via grafting onto exposed carbon atoms within the carbonaceous materials) within the graded layer 514.

In some implementations, carbonaceous materials having exposed surfaces functionalized with one or more of fluorine-containing or silicon-containing functional groups may be included within the graded layer 514. In other implementations, carbonaceous materials having exposed surfaces functionalized with one or more of fluorine-containing or silicon-containing functional groups may be deposited beneath the graded layer 514 to form a stable SEI on at an interface between the graded layer 514 and the anode 502. In one implementation, the stable SEI may replace the protective layer 516. In some implementations, the graded layer 514 may be slurry cast and/or deposited using other techniques onto the anode 502 with lithium and carbon interphases, any of which may be functionalized with silicon and/or nitrogen to inhibit the diffusion and migration of polysulfides towards exposed surfaces of the anode 502. In addition, specific polymers and/or crosslinkers may be incorporated within the graded layer 514 to mechanically strengthen the graded layer 514, to improve lithium ion transport across the graded layer 514, or to increase the uniformity of lithium ion flux across the graded layer 514. Example polymers and/or polymeric materials suitable for incorporation within the graded layer 514 may include poly(ethylene oxide) and poly(ethyleneimine). Example crosslinkers suitable for incorporation within the graded layer 514 may include inorganic linkers (e.g., borate, aluminate, silicate), multifunctional organic molecules (e.g., diamines, diols), polyurea, or high molecular weight (MW) (e.g., >10,000 daltons) carboxymethyl cellulose (CMC).

Various fabrication methods may be employed to produce the graded layer 514. In one implementation, direct coating of the interface between the anode 502 and the electrolyte 540 prior to the deposition and/or formation of the graded layer 514 may be performed with a dispersion of carbonaceous materials and other chemicals dissolved in a carrier (e.g., a solvent, binder, polymer). In another implementation, deposition of the graded layer 514 may be performed as a separate operation, or may be added to various other active ingredients (e.g., metals, carbonaceous materials, tin fluoride and/or the like) into a slurry that can be cast onto the anode 502. Alternatively, in another implementation, the protective layer 516 may be transferred directly onto the anode 502 by a calendar roll lamination processes. The protective layer 516 and/or the graded layer 514 may also incorporate partially-cured lithium ion conductive epoxies to, for example, increase adhesion with lithium better during the calendar roll lamination processes.

In one implementation, a carbon-inclusive layered structure (not shown in FIG. 5) may be disposed on the anode 502 as a replacement for the graded layer 514. The carbon-inclusive layered structure may include an atomic plane available for lithium transfer, and may uniformly transport lithium cations ($Li^+$) provided by the electrolyte 540 throughout the protective layer 516 in a manner that can guide the formation of lithium fluoride in various portions of the battery. In various implementations, the carbon-inclusive layered structure may include one or more arrangements of few layer graphene (FLG) or graphite and/or may intercalate with lithium and produce one or more reaction products including lithium tin oxide (LTO), lithium iron phosphate (LFP), or perovskite lithium lanthanum titanate (LLTO).

In some implementations, the tin fluoride layer 510 may function as a protection layer against corrosion, including corrosion of copper-inclusive surfaces and/or regions of the protective layer 516, the graded layer 514, or the anode 502. In some aspects, the tin fluoride layer 510 may also provide a uniform seed layer suitable for lithium deposition, and thereby inhibiting dendrite formation. In addition, in some implementations, the tin fluoride layer 510 may include one or more lithium ion intercalating compounds, any one or more having a low voltage penalty. Suitable lithium ion intercalating compounds may include graphitic carbon (e.g., graphite, graphene, reduced graphene oxide, rGO). In one implementation, during fabrication of the anode 502, lithium cations ($Li^+$) may tend to intercalate prior to plating onto exposed carbonaceous surfaces within the tin fluoride layer 510. In this way, the tin fluoride layer 510 will have a uniform Li distribution ready to act as a seed layer prior to initiation of lithium plating and/or electroplating operations.

In one implementation, one or more conformal coatings may be applied over portions of the anode 502 such that the resulting conformal coating contacts and conforms to the first edge $518_1$ and/or the second edge $518_2$ of the anode 502. In some aspects, the conformal coating may begin as a first spacer edge protection region $530_1$ and a second spacer edge protection region $530_2$ that react or otherwise combine with one or more of the protective layer 516, the tin-lithium alloy region 512, and/or the tin fluoride layer 510 to form a conformal coating 544 that at least partially seals and protects surfaces and/or interfaces between lithium in the anode 502 and various substances suspended in the electrolyte, e.g., copper (Cu). In some aspects, the dissociation of fluorine atoms from tin fluoride present in the conformal coating 544 may react with lithium in the anode 502 to form lithium fluoride, rather than form or grow into lithium dendrites. In this way, the conformal coating 544 may decrease lithium dendrite formation or growth from the anode 502.

The conformal coating 544 may be deposited or disposed over the anode 502 at any number of different thicknesses. In some aspects, the conformal coating 544 may be less than 5 µm thick. In other aspects, the conformal coating 544 may be less than 2 µm thick. In some other aspects, the conformal coating 544 may be less than 1 µm thick. These thickness levels may impede the migration of polysulfides towards the anode 502 during battery cycling, thereby preventing at least some of the lithium cations ($Li^+$) from reacting with the polysulfides. Lithium cations ($Li^+$) that do not react with the polysulfides are available for transport from the anode to the cathode during discharge cycles of the battery.

The conformal coating 544 (as well as the protective layer 516 and the graded layer 514) can uniquely regulate lithium ion flux toward the first edge $518_1$ and/or the second edge $518_2$ of the anode 502, and thereby prevent corrosion of the anode 502. Such regulation may function in a similar manner to gate spacers used during the fabrication of polysilicon (poly-Si) gates. Specifically, gate spacer or gate sidewall constructs may be used to protect and mechanically support polysilicon gates during the fabrication of integrated circuits (Ics). Similarly, edge protection provided by the conformal coating 544 for the anode 502 of FIG. 5 regulates lithium ion flux toward the first edge $518_1$ and/or the second edge $518_2$ of the anode 502, and thereby prevents corrosion of the anode 502. This type of edge protection provided by the conformal coating 544 for the anode 502 may equally apply to other battery and/or electrical cell formats and/or configurations such as (but not limited to) cylindrical cells, stacked cells, and/or the like, with various constructs engineered specifically to fit within the parameters of each of these designs.

In some implementations, fabrication and/or deposition of the conformal coating 544, the protective layer 516, and/or the graded layer 514 on the anode 502 may depend on the type of battery or cell construct in which the anode 502 is incorporated, e.g., cylindrical cells compared to pouch cells and/or prismatic cells. In one implementation, for cylindrical cells, metal anodes may be constructed from an electroactive material, typically metallic lithium, and/or lithium-containing alloys, such as graphitic and/or other carbonaceous composited including lithium, as well as any plenary uniform or multi-layer sheet of material. In one example, a solid metal lithium foil used as the anode 502 may be attached to a copper substrate used as the current collector 520 to facilitate electron transfer through a tab 546 to an external load, as depicted in the example of FIG. 5. In other implementations, the anode structure 500 may include the anode 502 without the current collector 520, where carbonaceous materials contained within the anode 502 may provide an electrically conductive medium coupled to a circuit.

In some implementations, the anode structure 500 may be incorporated into electrochemical cells and/or batteries by winding around a mandrel. Cylindrical cell layouts typically use double-sided anodes, such as the anode structure 500. In some implementations, cylindrical cell constructions employing the anode structure 500 may use the conformal coating 544 to protect the first edge $518_1$ and/or the second edge $518_2$ of the anode 502. The uniform protection provided by the conformal coating 544 may be referred to herein as "edge protection." In one implementation, edge protection can be incorporated into a cell employing the anode structure 500 by extending the size and/or area of the protective layer 516 to overlap beyond any geometrically induced edge effects, e.g., surface roughness, of the anode.

In other implementations, the anode structure 500 may be incorporated into pouch cells and/or prismatic cells. Generally, two constructs of pouch and/or prismatic cells may be manufactured, including (1): jelly-roll type cells (e.g., seen in industry as lithium-polymer batteries), two mandrel wound electrodes may be produced in a manner similar to cylindrical cells as discussed earlier; and (2): stacked plate type cells, which may be cut from a sheet of a pre-cast and/or pre-laminated prepared anode, leaving an unprotected edge of, for example, the anode 502 (when prepared in a stacked-plate type configuration) exposed and vulnerable to corrosion, fast ion fluxes and exposure within the cells. The conformal coating 544, in a stacked-plate type configuration, may protect the anode 502 and prevent lithium over-saturation in the electrolyte 540. In this way, the conformal coating 544 can control lithium plating on the anode 502 during operational cycling of the battery.

In some implementations, one or more chemical reactions may occur between the electrolyte 540 and the anode 502 (involving solvent decomposition and/or additive reactions) during cell assembly or cell rest period. These chemical reactions may assist in the production of the conformal coating 544. In some aspects, elevated and/or reduced temperatures (e.g., relative to room temperature and/or 20° C.) may be used as a stimulus for lithium-induced polymerization of the conformal coating 544. For example, the lithium-induced polymerization may occur in the presence of one or more catalysts and/or by using lithium metal, and its associated chemical reactivity, as an inducing agent to initiate free-radical based polymerization of component species within any one or more layers of the anode structure 500 and/or the conformal coating 544. In addition, electrochemical reactions under electrical bias in either the forward or reverse direction may be used to fabricate and/or deposit the conformal coating 544 onto the anode 502, as well as usage of secondary metals and/or salts as additives that may decompose to form an alloy on the first edge $518_1$ and/or the second edge $518_2$ of metallic lithium in the anode 502 exposed to the electrolyte 540. For example, suitable additives may contain one or more metallic species, e.g., desired for co-alloying with lithium or to be used as a blocking layer to reduce lithium transfer to the first edge $518_1$ and/or the second edge $518_2$ of the anode 502.

FIG. 6 shows a schematic diagram of an enlarged portion 600 of the anode structure 500 of FIG. 5, according to some implementations. The enlarged portion 600 illustrates placement of the first spacer edge protection region $530_1$ and the second spacer edge protection region $530_2$ (collectively referred to as the edge protection region 530 in FIG. 6) in a direction orthogonal to the first edge $518_1$ and/or the second edge $518_2$, as shown in FIG. 5. As a result, the edge protection region 530, which may include the carbonaceous materials 610 organized into structures and/or lattices, may block lithium cations ($Li^+$) from undesirably escaping the anode 502 across the edge protection region 530. In this way, lithium ion dissociation, flux, transport, and/or other movement may be channeled effectively throughout the enlarged portion 600 of FIG. 6 (as well as the anode structure 500 of FIG. 5), thereby yielding optimal battery operational cycling. In some implementations, carbonaceous materials 610 used to produce the edge protection region may include few layer graphene (FLG), multi-layer graphene (MLG), graphite, carbon nano-tubes (CNTs), carbon nano-onions (CNOs) and/or the like. The carbonaceous materials 610 (e.g., shown in FIG. 8A, FIG. 8B, FIG. 9A, FIG. 9B, FIG. 10A and/or FIG. 10B) may be synthesized, self-nucleated, or otherwise joined together at varying concentration levels to provide for complete tunability of the edge protection region 530. For example, the density, thickness, and/or compositions of may be designed to reduce lithium ion permeation more than the protective layer 516 or the graded layer 514 to direct lithium ion permeation accordingly. In some implementations, the edge protection region 530 may be less than 5 µm thick. In other aspects, the edge protection region 530 may be less than 2 µm thick. In some other aspects, the edge protection region 530 may be less than 1 µm thick. In some implementations, a conductive additive 640 may be added to the carbonaceous materials 610, as well as a binder 620.

Figure 7:
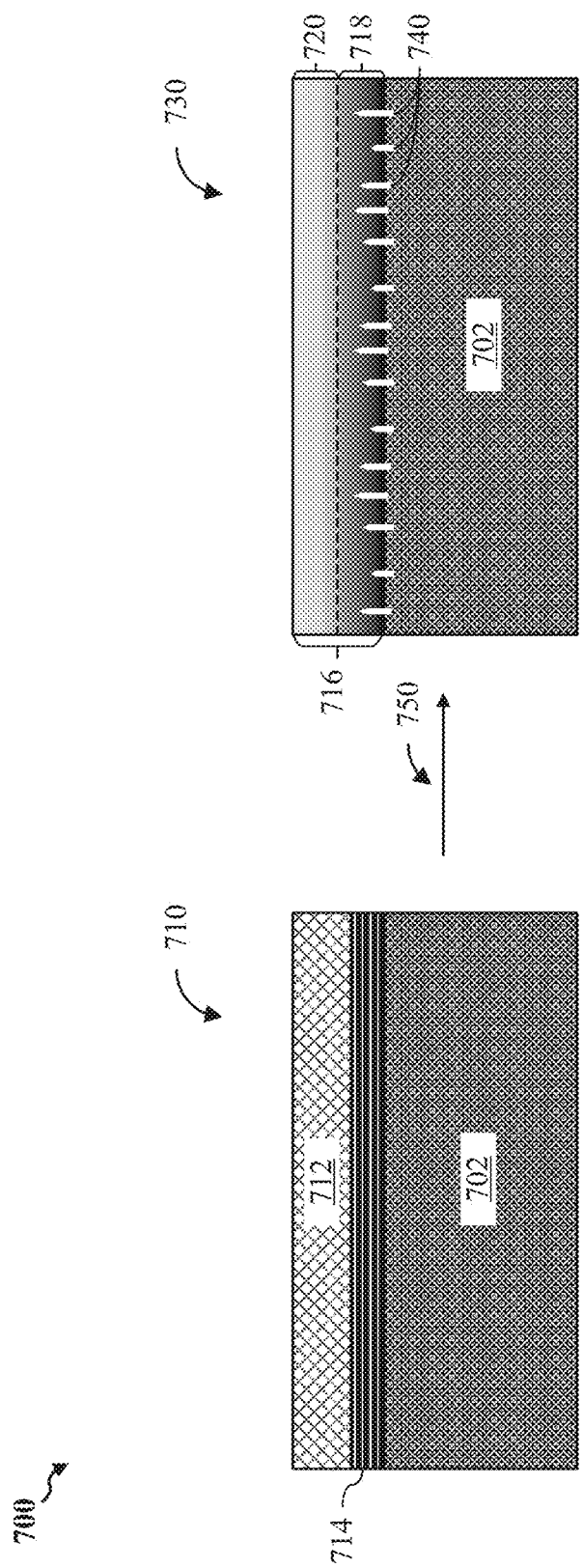
FIG. 7 shows a diagram of a polymeric network of a battery, according to some implementations.

FIG. 7 shows a diagram of a polymeric network 710, according to some implementations. In some aspects, the polymeric network 710 may be one example of the polymeric network 285 of FIG. 2. The polymeric network 710 may be disposed on an anode 702. The anode 702 may be formed as an alkali metal layer having one or more exposed surfaces that include any number of alkali metal-containing nanostructures or microstructures. The alkali metal may include (but is not limited to) lithium, sodium, zinc, indium and/or gallium. The anode 702 may release alkali cations during operational cycling of the battery.

A layer 714 of carbonaceous materials may be grafted with fluorinated polymer chains and deposited over one or more exposed surfaces of the anode 702. The grafting may be based on (e.g., initiated by) activation of carbonaceous material with one or more radical initiators, for example, benzoyl peroxide (BPO) or azobisisobutyronitrile (AIBN), followed by reaction with monomer molecules. The polymeric network 710 may be based on the fluorinated polymer chains cross-linked with one another and carbonaceous materials of the layer 714 such that the layer 714 is consumed during generation of the polymeric network 710. In some implementations, the polymeric network 710 may have a thickness approximately between 0.001 µm and 5 µm and include between approximately 0.001 wt. % to 2 wt. % of the fluorinated polymer chains. In some other implementations, the polymeric network 710 may include between approximately 5 wt. % to 100 wt. % of the plurality of carbonaceous materials grafted with fluorinated polymer chains and a balance of fluorinated polymers, or one or more non-fluorinated polymers, or one or more cross-linkable monomers, or combinations thereof. In one implementation, carbonaceous materials grafted with fluorinated polymer chains may include 5 wt. % to 50 wt. % of fluorinated polymer chains and a balance of carbonaceous material.

During battery cycling, carbon-fluorine bonds within the polymeric network 710 may chemically react with newly forming Lithium metal and convert into carbon-Lithium bonds (C—Li). These C—Li bonds may, in turn, react with carbon-fluorine bonds within the polymeric network 710 via a Wurtz reaction 750, to further cross-link polymeric network by newly formed C—C bonds and to form an alkalimetal containing fluoride (such as lithium fluoride (LiF)). Additional polymeric network cross-linking leading to uniform formation of the alkali-metal containing fluoride may thereby suppress alkali metal dendrite formation 740 associated with the anode 702, thereby improving battery performance and longevity. In one implementation, grafting of fluorinated m/acrylate (FMA) to one or more exposed graphene surfaces of carbonaceous materials in the layer 714 may be performed in an organic solution, e.g., leading to the formation of graphene-graft-poly-FMA and/or the like. Incorporation of carbon-fluorine bonds on exposed graphene surfaces may enable the Wurtz reaction 750 to occur between carbon-fluorine bonds and metallic surface of an alkali metal (e.g., lithium) provided by the anode 702. In this way, completion of the Wurtz reaction 750 may result in the formation of the polymeric network 710. In some aspects, the polymeric network 710 may include a density gradient 716 pursuant to completion of the Wurtz reaction 750. The density gradient 716 may include interconnected graphene flakes and may be infused with one or more metal-fluoride salts formed in-situ. In addition, layer porosity and/or mechanical properties may be tuned by carbon loading and/or a combination of functionalized carbons, each having a unique and/or distinct physical structure.

Figure 8A:
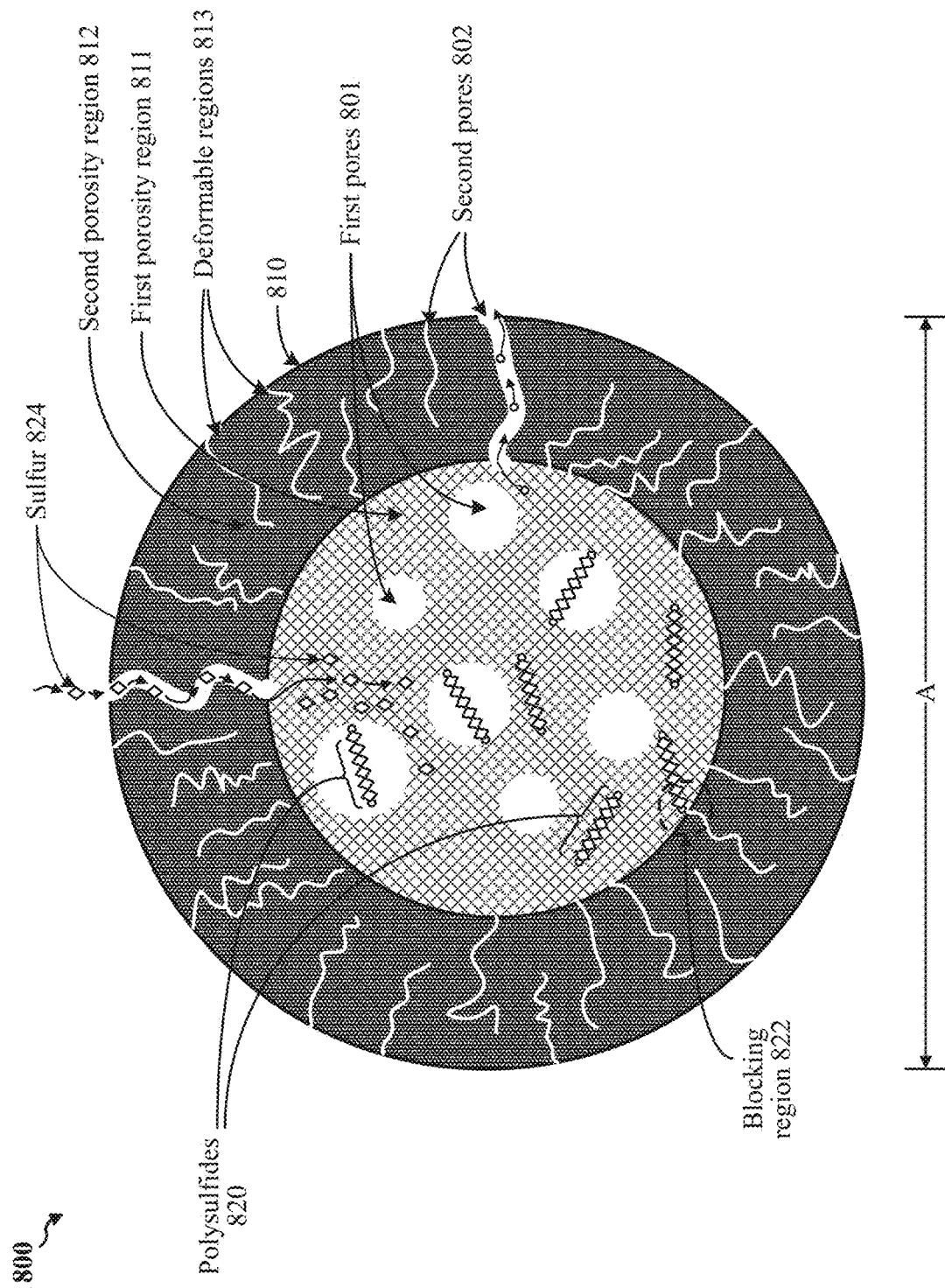
FIG. 8A shows a diagram of an example carbonaceous particle with graded porosity, according to some implementations.
Figure 8B:
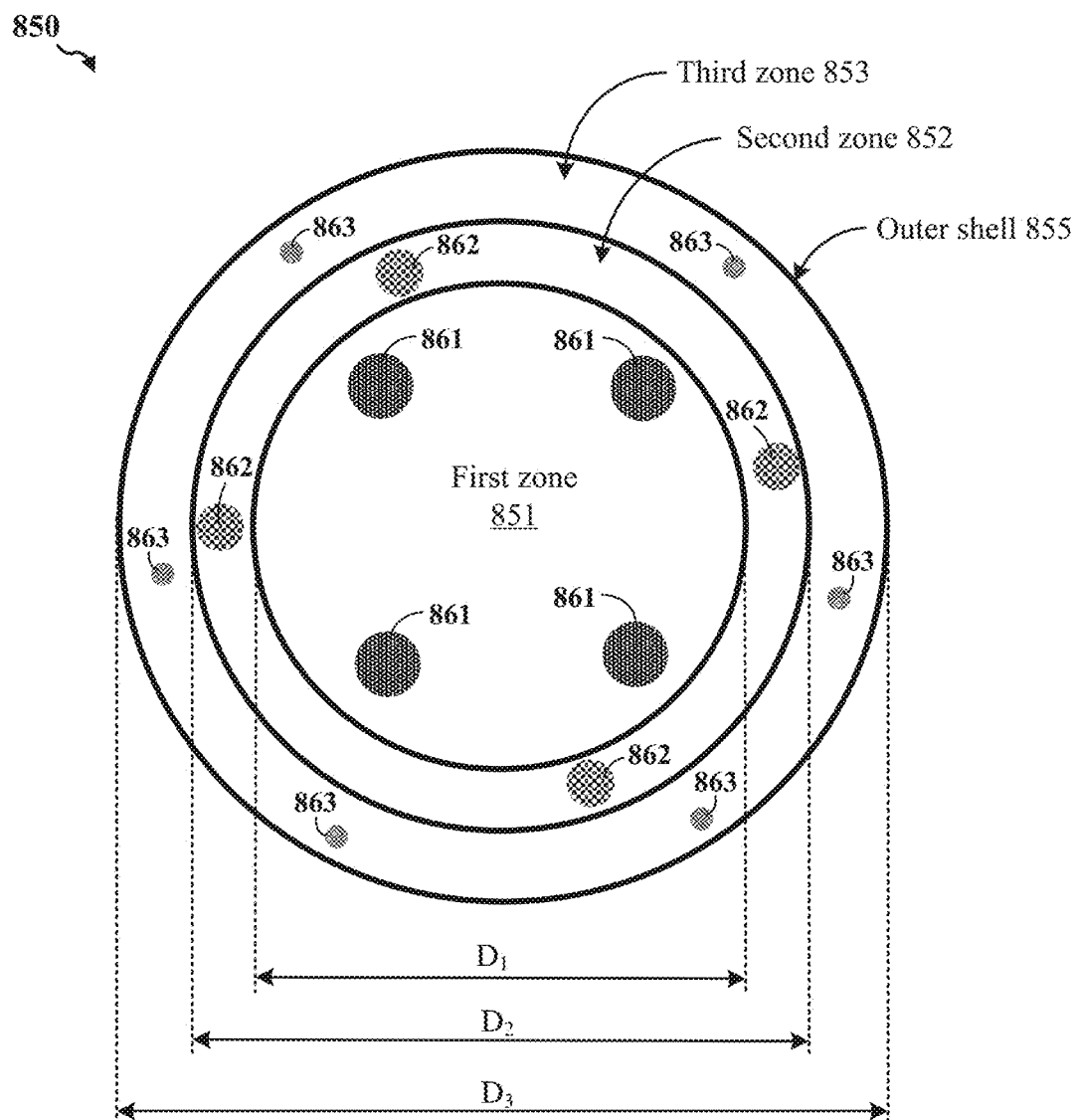
FIG. 8B shows a diagram of an example of a tri-zone particle, according to some implementations.

In some implementations, carbonaceous materials within the density gradient 716 may include one or more of flat graphene, wrinkled graphene, a plurality of carbon nanotubes (CNTs), or a plurality of carbon nano-onions (CNOs) (e.g., as depicted in FIG. 8A/FIG. 8B and as shown in the micrographs of FIGS. 9A-9B and FIGS. 10A-10B). In one implementation, graphene nanoplatelets may be dispersed throughout and isolated from each other within the polymeric network 710. The dispersion of the graphene nanoplatelets includes one or more different concentration levels. In one implementation, the dispersion of the graphene nanoplatelets may include at least some of the carbonaceous materials functionalized with at least some of the fluorinated polymer chains.

For example, the fluorinated polymer chains may include one or more acrylate or methacrylate monomers including 2,2,3,3,4,4,5,5,6,6,7,7-Dodecafluoroheptyl acrylate (DFHA), 3,3,4,4,5,5,6,6,7,7,8,8,9,9,10,10,10-Heptadecafluorodecyl methacrylate (HDFDMA), 2,2,3,3,4,4,5,5-Octafluoropentyl methacrylate (OFPMA), Tetrafluoropropyl methacrylate (TFPM), 3-[3,3,3-Trifluoro-2-hydroxy-2-(trifluoromethyl)propyl]bicyclo[2.2.1]hept-2-yl methacrylate (HFA monomer), or vinyl-based monomers including 2,3,4,5,6-Pentafluorostyrene (PFSt).

In some implementations, fluorinated polymer chains may be grafted to a surface of the layer of carbonaceous materials and may thereby chemically interact with the one or more surfaces of the alkali metal of the anode via the Wurtz reaction 750. In organic chemistry, organometallic chemistry, and inorganic main-group polymers, the Wurtz reaction is a coupling reaction, whereby two alkyl halides are reacted with sodium metal (or some other metal) in dry ether solution to form a higher alkane. In this reaction alkyl halides are treated with alkali metal, for example, sodium metal in dry ethereal (free from moisture) solution to produce higher alkanes. In case of Sodium intermediate product of the Wurtz reaction are highly polar and highly reactive Carbon-Sodium metal bonds, which in turn are chemically reacting with Carbon-Halide bonds to yield newly formed C—C bonds and Sodium Halide. A formation of new Carbon-Carbon bonds allows to use the Wurtz reaction for the preparation of higher alkanes containing even number of carbon atoms, for example:

$$2R\text{—}X + 2Na \rightarrow R\text{—}R + 2Na^+X^- \quad \text{(Eq. 1)}$$

Other metals have also been used to influence Wurtz coupling, among them silver, zinc, iron, activated copper, indium and a mixture of manganese and copper chloride. The related reaction dealing with aryl halides is called the Wurtz-Fittig reaction. This can be explained by the formation of free radical intermediate and its subsequent disproportionation to give alkene. The Wurtz reaction 750 occurs through a free-radical mechanism that makes possible side reactions producing alkene products. In some implementations, chemical interactions associated with the Wurtz reaction described above may form an alkali metal fluoride, e.g., lithium fluoride.

In one implementation, the polymeric network 710 may include an interface layer 718 in contact with the anode 702. A protective layer 720 may be disposed on top of the interface layer 718, which may be based on the Wurtz reaction 750 at an interface between the anode 702 and the polymeric network 710. The interface layer 718 may have a relatively high cross-linking density (e.g., of fluorinated polymers and/or the like), a high metal-fluoride concentration, and a relatively low carbon-fluorine bond concentration. In contrast to the interface layer 718, the protective layer 720 may have a relatively low cross-linking density, a low metal-fluoride concentration, and a high carbon-fluorine bond concentration.

In some implementations, the interface layer 718 may include cross-linkable monomers such as methacrylate (MA), acrylate, vinyl functional groups, or a combination of epoxy and amine functional groups. In one implementation, the protective layer 720 may be characterized by the density gradient 716. In this way, the density gradient 716 may be associated with one or more self-healing properties of the protective layer 720 and/or may strengthen the polymeric network 710. In some implementations, the protective layer 720 may further suppress alkali metal dendrite formation 740 from the anode 702 during battery cycling.

Operationally, the interface layer 718 may suppress alkali metal dendrite formation 740 associated with the anode 702 by uniformly producing metal-fluorides, e.g., lithium fluoride, at an interface across the length of the anode 702. The uniform production of metal fluorides causes dendrite surface dissolution, e.g., via conversion into metal-fluorides, ultimately suppressing alkali metal dendrite formation 740. In addition, cross-linking of fluorinated polymer chains over remaining dendrites may further suppress alkali metal dendrite formation 740. In some implementations, the density gradient 716 may be tuned to control the degree of cross-linking between the fluorinated polymer chains.

FIG. 8A shows a simplified cutaway view of an example carbonaceous particle 800 with graded porosity, according to some implementations. The carbonaceous particle 800 may be synthesized in a reactor, and output in a controlled manner to produce the cathode 110 and/or anode 120 of FIG. 1, the cathode 210 and/or anode 220 of FIG. 2, or the electrode 300 of FIG. 3. The carbonaceous particle 800, which may also be referred to as a composition of matter, includes a plurality of regions nested within each other. Each region may include at least a first porosity region 811 and a second porosity region 812. The first porosity region 811 may include a plurality of first pores 801, and the second porosity region 812 may include a plurality of second pores 802. In some aspects, each region may be separated from immediate adjacent regions by at least some of the first pores 801. The first pores 801 may be dispersed throughout the first porosity region 811 of the carbonaceous particle 800, and the second pores 802 may be dispersed throughout the second porosity region 812 of the carbonaceous particle 800. In this way, the first pores 801 may be associated with a first pore density, and the second pores 802 may be associated with a second pore density that is different than the first pore density. In some aspects, the first pore density may be between approximately 0.0 cubic centimeters (cc)/g and 2.0 cc/g, and the second pore density may be between approximately 1.5 and 5.0 cc/g. In some aspects, the first pores 801 may be configured to retain polysulfides 820, and the second pores 802 may provide exit pathways from the carbonaceous particle 800.

A group of carbonaceous particles 800 may be joined together to form a carbonaceous aggregate (not shown for simplicity), and a group of carbonaceous aggregates may be joined together to form a carbonaceous agglomerate (not shown for simplicity). In some implementations, the first pores 801 and second pores 802 may be dispersed throughout aggregates formed by respective groups of the carbonaceous particles 800. In some aspects, the first porosity region 811 may be at least partially encapsulated by the second porosity region 812 such that a respective agglomerate may include some of the first pores 801 and/or some of the second pores 802.

In some implementations, the carbonaceous particle 800 may have a principal dimension "A" in an approximate range between 20 nm and 150 nm, an aggregate formed by a group of the carbonaceous particle 800 may have a principal dimension in an approximate range between 20 nm and 10 µm, and an agglomerate formed by a group of aggregates may have a principal dimension in an approximate range between 0.1 µm and 1,000 µm. In some aspects, at least some of the first pores 801 and the second pores 802 has a principal dimension in an approximate range between 1.3 nm and 32.3 nm. In one implementation, each of the first pores 801 has a principal dimension in an approximate range between 0 nm and 100 nm.

The carbonaceous particle 800 may also include a plurality of deformable regions 813 distributed along a perimeter 810 of the carbonaceous particle 800. The carbonaceous particle 800 may conduct electricity along joined boundaries with (such as the perimeter 810) one or more other carbonaceous particles. The carbonaceous particle 800 may also confine polysulfides 820 within the first pores 801 and/or at one or more blocking regions 822, thereby inhibiting the migration of polysulfides 820 towards the anode and increasing the rate at which lithium cations (Li$^+$) can be transported from the anode to the cathode of a host battery.

In some implementations, the carbonaceous particle 800 may have a surface area of exposed carbon surfaces in an approximate range between 10 m$^2$/g to 3,000 m$^2$/g. In other implementations, the carbonaceous particle 800 may have a composite surface area including sulfur 824 micro-confined within a number of the first pores 801 and/or a number of the second pores 802. As used herein, the first pores 801 and/or the second pores 802 that micro-confine the polysulfides 820 may be referred to as "functional pores." In some aspects, one or more of the carbonaceous particles, the aggregates formed by corresponding groups of carbonaceous particles, or the agglomerates formed by corresponding groups of aggregates may include one or more exposed carbon surfaces configured to nucleate the sulfur 824. The composite surface area may be in an approximate range between 10 m$^2$/g to 3,000 m$^2$/g, and the carbonaceous particle 800 may have a sulfur to carbon weight ratio between approximately 1:5 to 10:1. In some aspects, the carbonaceous particle 800 may have an electrical conductivity in an approximate range between 100 S/m to 20,000 S/m at a pressure of 12,000 pounds per square in (psi).

In some implementations, the carbonaceous particle 800 may include a surfactant or a polymer that includes one or more of styrene butadiene rubber, polyvinylidene fluoride, poly acrylic acid, carboxyl methyl cellulose, polyvinylpyrrolidone, and/or polyvinyl acetate that can act as a binder to join a group of the carbonaceous particles 800 together. In other implementations, the carbonaceous particle 800 may include a gel-phase electrolyte or a solid-phase electrolyte disposed within at least some of the first pores 801 or second pores 802.

FIG. 8B shows a diagram of an example of a tri-zone particle 850, according to some implementations. In various implementations, the tri-zone particle 850 may be one example of the carbonaceous particle 800 of FIG. 8A. The tri-zone particle 850 may include three discrete zones such as (but not limited to) a first zone 851, a second zone 852, and a third zone 853. In some aspects, each of the zones 851-853 surrounds and/or encapsulates a preceding zone. For example, the first zone 851 may be surrounded by or encapsulated by the second zone 852, and the second zone 852 may be surrounded by or encapsulated by the third zone 853. The first zone 851 may correspond to an inner region of the tri-zone particle 850, the second zone 852 may correspond to an intermediate transition region of the tri-zone particle 850, and the third zone 853 may correspond to an outer region of the tri-zone particle 850. In some aspects, the tri-zone particle 850 may include a permeable shell 855 that deforms in response to contact with one or more adjacent non-tri-zone particles and/or tri-zone particles 850.

In some implementations, the first zone 851 may have a relatively low density, a relatively low electrical conductivity, and a relatively high porosity, the second zone 852 may have an intermediate density, an intermediate electrical conductivity, and an intermediate porosity, and the third zone 853 may have a relatively high density, a relatively high electrical conductivity, and a relatively low porosity. In some aspects, the first zone 851 may have a density of carbonaceous material between approximately 1.5 g/cc and 5.0 g/cc, the second zone 852 may have a density of carbonaceous material between approximately 0.5 g/cc and 3.0 g/cc, and the third zone 853 may have a density of carbonaceous material between approximately 0.0 and 1.5 g/cc. In other aspects, the first zone 851 may include pores having a width between approximately 0 and 40 nm, the second zone 852 may include pores having a width between approximately 0 and 35 nm, and the third zone 853 may include pores having a width between approximately 0 and 30 nm. In some other implementations, the second zone 852 may not be defined for the tri-zone particle 850. In one implementation, the first zone 851 may have a principal dimension $D_1$ between approximately 0 nm and 100 nm, the second zone 852 may have a principal dimension $D_2$ between approximately 20 nm and 150 nm, and the third zone 853 may have a principal dimension $D_3$ of approximately 200 nm.

Aspects of the present disclosure recognize that the unique layout of the tri-zone particle 850 and the relative dimensions, porosities, and electrical conductivities of the first zone 851, the second zone 852, and the third zone 853 can be selected and/or modified achieve a desired balance between minimizing the polysulfide shuttle effect and maximizing the specific capacity of a host battery. Specifically, in some aspects, the pores may decrease in size and volume from one zone to other. In some implementations, the tri-zone particle may consist entirely of one zone with a range of pore sizes and pores distributions (e.g., pore density). For the example of FIG. 8B, the Pores 861 associated with the first zone 851 or the first porosity region have relatively large widths and may be defined as macropores, the pores 862 associated with the second zone 852 or the second porosity region have intermediate-sized widths and may be defined as mesopores, and the pores 863 associated with the third zone 853 or the third porosity region have relatively small widths and may be defined as micropores.

A group of tri-zone particles 850 may be joined together to form an aggregate (not shown for simplicity), and a group of the aggregates may be joined together to form an agglomerate (not shown for simplicity). In some implementations, a plurality of mesopores may be interspersed throughout the aggregates formed by respective groups of the carbonaceous particles 800. In some aspects, the first porosity region 811 may be at least partially encapsulated by the second porosity region 812 such that a respective aggregate may include one or more mesopores and one or more macropores. In one implementation, each mesopore may have a principal dimension between 3.3 nanometers (nm) and 19.3 nm, and each macropore may have a principal dimension between 0.1 μm and 1,000 μm. In some instances, the tri-zone particle 850 may include carbon fragments intertwined with each other and separated from one another by at least some of the mesopores.

In some implementations, the tri-zone particle 850 may include a surfactant or a polymer that includes one or more of styrene butadiene rubber, polyvinylidene fluoride, poly acrylic acid, carboxyl methyl cellulose, polyvinylpyrrolidone, and/or polyvinyl acetate that can act as a binder to join a group of the carbonaceous materials together. In other implementations, the tri-zone particle 850 may include a gel-phase electrolyte or a solid-phase electrolyte disposed within at least some of the pores.

In some implementations, the tri-zone particle 850 may have a surface area of exposed carbonaceous surfaces in an approximate range between 10 m$^2$/g to 3,000 m$^2$/g and/or a composite surface area (including sulfur micro-confined within pores) in an approximate range between 10 m$^2$/g to 3,000 m$^2$/g. In one implementation, a composition of matter including a multitude of tri-zone particles 850 may have an electrical conductivity in an approximate range between 100 S/m to 20,000 S/m at a pressure of 12,000 pounds per square in (psi) and a sulfur to carbon weight ratio between approximately 1:5 to 10:1.

Figure 8C:
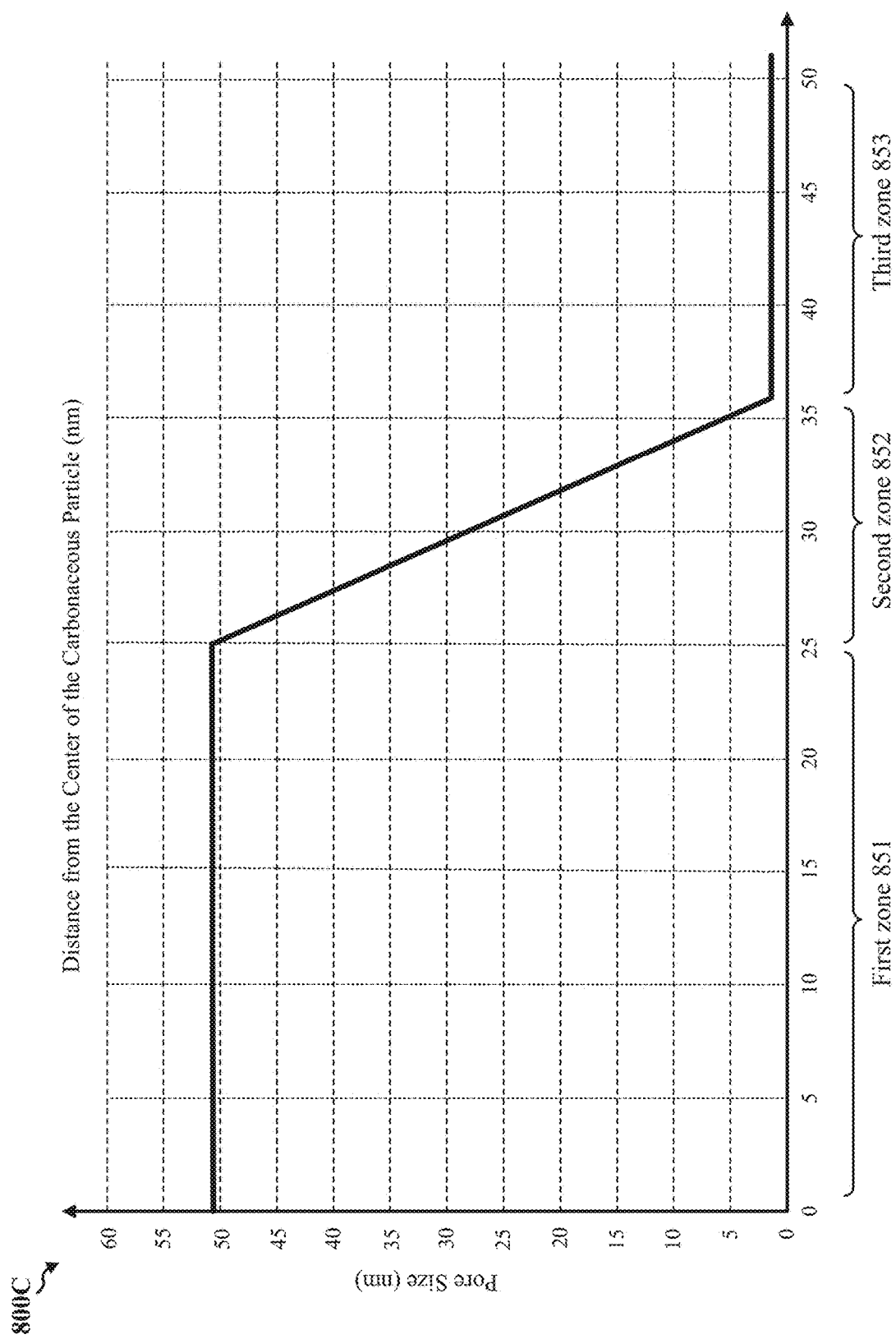
FIG. 8C shows an example step function representative of the tri-zone particle of FIG. 8B, according to some implementations.

FIG. 8C shows an example step function 800C representative of the average pore volumes in each of the regions of the tri-zone particle 850 of FIG. 8B, according to some implementations. As discussed, the pores distributed throughout the tri-zone particle 850 may have different sizes, volumes, or distributions. In some implementations, the average pore volume may decrease based on a distance between a center of the tri-zone particle 850 and an adjacent zonae, for example, such that pores associated with the first zone 851 or the first porosity region have a relatively large volume or pore size, pores associated with the second zone 852 or the second porosity region have an intermediate volume, and pores associated with the third zone 853 or the third porosity region have a relatively small volume. The interior region has a higher pore volume than the regions near the periphery. The region with higher pore volume provides for high sulfur loading whereas the lower pore volume outer regions mitigate the migration of polysulfides during cell cycling. In the example of FIG. 8C, the average pore volume in the inner region is approximately 3 cc/g, the average pore volume in the outermost region is ~0.5 cc/g and the average pore volume in the intermediate region is between 0.5 cc/g and 3 cc/g.

Figure 8D:
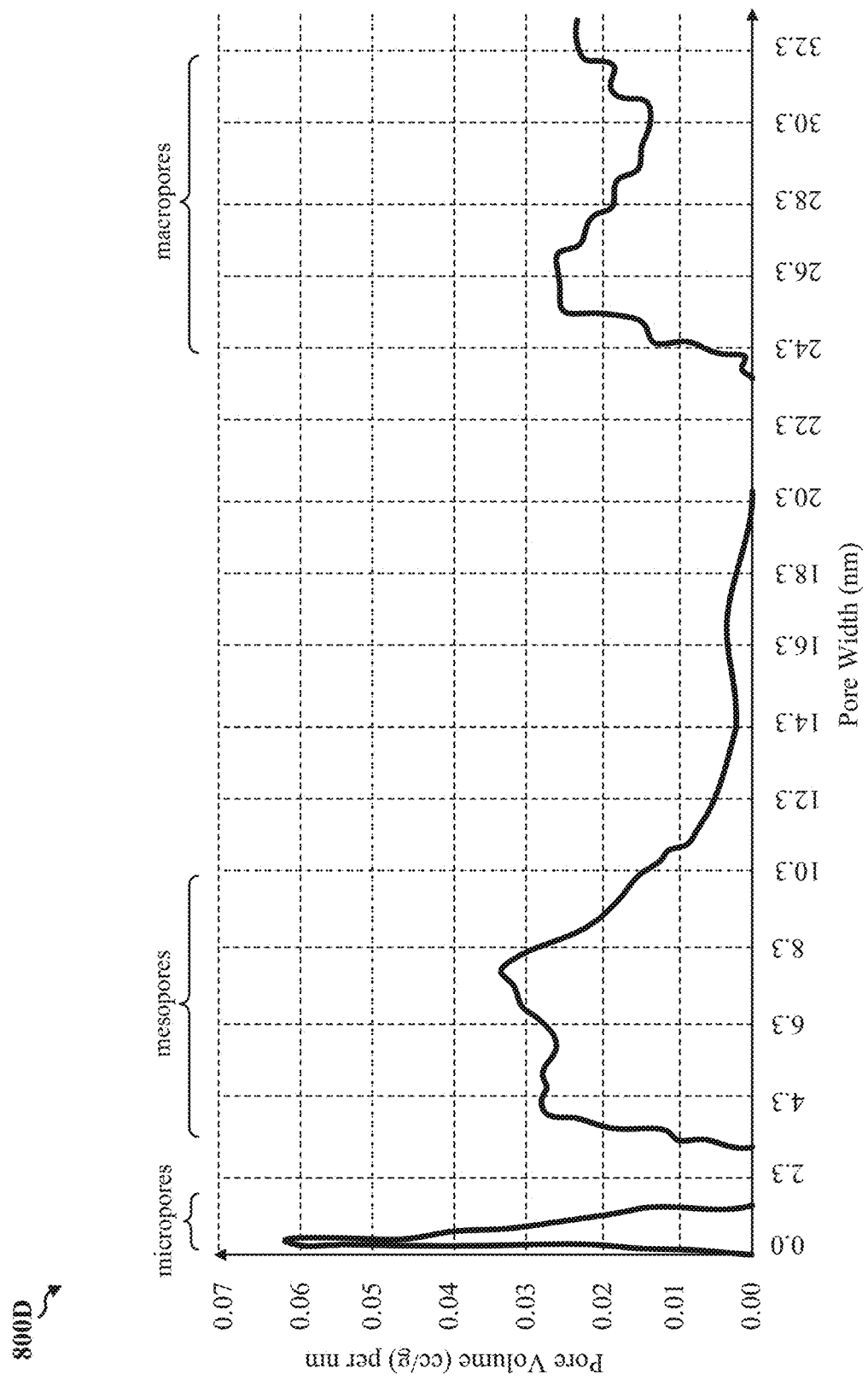
FIG. 8D shows a graph depicting an example distribution of pore volume versus pore width of an example carbonaceous particle, according to some implementations.

FIG. 8D shows a graph 800D depicting an example distribution of pore volume versus pore width of carbonaceous particles described herein. As depicted in the graph 800D, pores associated with a relatively high pore volume may have a relatively low pore width, for example, such that the pore width generally increases as the pore volume decreases. In some aspects, pores having a pore width less than approximately 1.0 nm may be referred to as micropores, pores having a pore width between approximately 3 and 11 nm may be referred to as mesopores, and pores having a pore width greater than approximately 24 nm may be referred to as macropores.

Figures 9A, 9B:
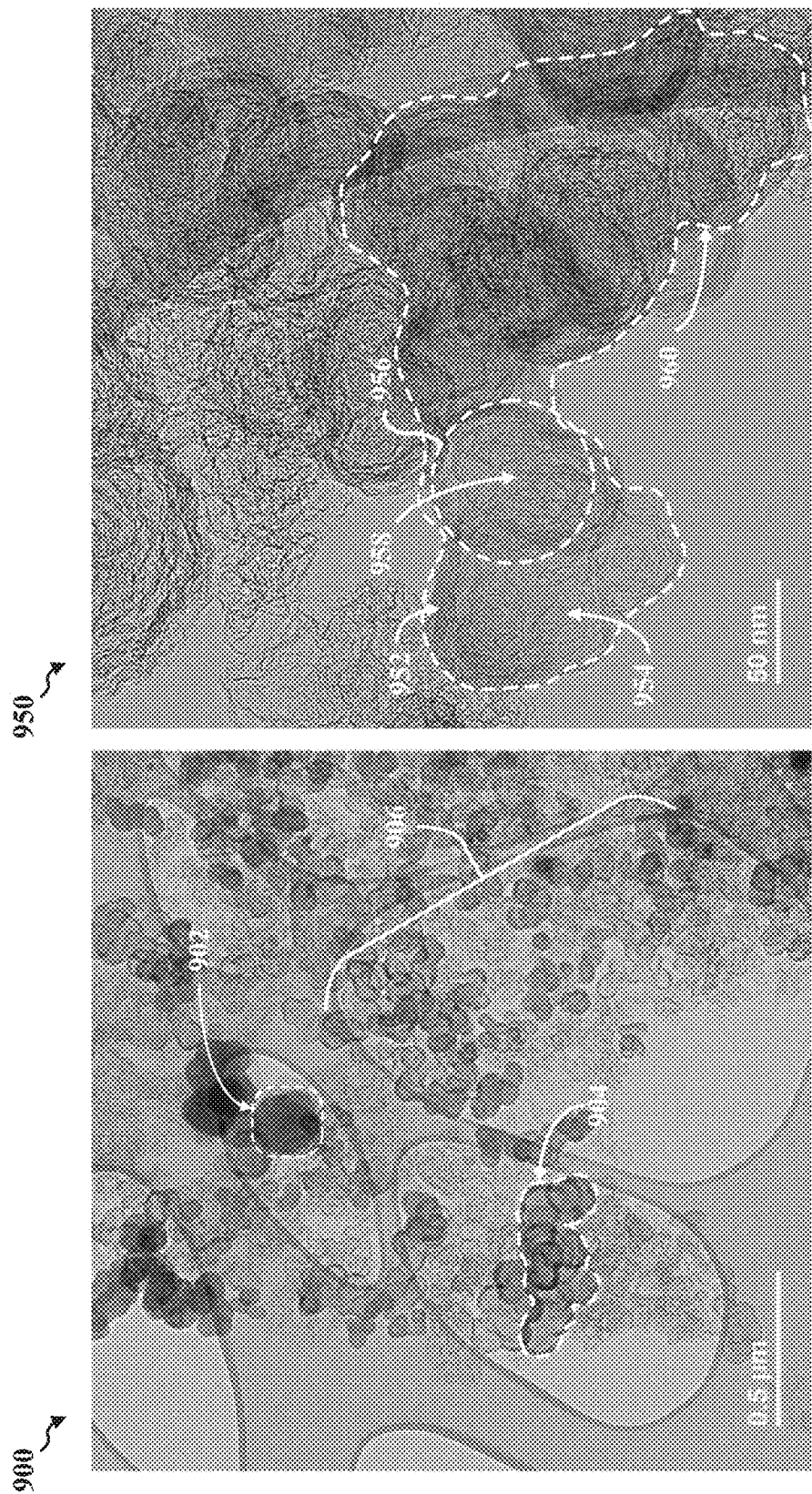
FIGS. 9A and 9B show electron micrographs of example carbonaceous particles, aggregates, and/or agglomerates depicted in FIG. 8A and/or FIG. 8B, according to some implementations.

FIG. 9A shows a micrograph 900 of a plurality of carbonaceous structures 902, according to some implementations. In some implementations, each of the carbonaceous structures 902 may have a substantially hollow a core region surrounded by various monolithic carbon growths and/or layering. In some aspects, the monolithic carbon growths and/or layering may be examples of the monolithic carbon growths and/or layering described with reference to FIGS. 8A and 8B. In some instances, the carbonaceous structures 902 may include several concentric multi-layered fullerenes and/or similarly shaped carbonaceous structures organized at varying levels of density and/or concentration. For example, the actual final shape, size, and graphene configuration of each of the carbonaceous structures 902 may depend on various manufacturing processes. The carbonaceous structures 902 may, in some aspects, demonstrate poor water solubility. As such, in some implementations, non-covalent functionalization may be utilized to alter one or more dispersibility properties of the carbonaceous structures 902 without affecting the intrinsic properties of the underlying carbon nanomaterial. In some aspects, the underlying carbon nanomaterial may be formative a sp$^2$ carbon nanomaterial. In some implementations, each of the carbonaceous structures 902 may have a diameter between approximately 20 and 500 nm. In various implementations, groups of the carbonaceous structures 902 may coalesce and/or join together to form the aggregates 904. In addition, groups of the aggregates 904 may coalesce and/or join together to form the agglomerates 906. In some aspects, one or more of the carbonaceous structures 902, the aggregates 904, and/or the agglomerates 906 may be used to form the anode and/or the cathode of the battery 100 of FIG. 1, the battery 200 of FIG. 2, or the electrode 300 of FIG. 3.

FIG. 9B shows a micrograph 950 of an aggregate formed of carbonaceous material, according to some implementations. In some implementations, the aggregate 960 may be an example of one of the aggregates 904 of FIG. 9A. In one implementation, exterior carbonaceous shell-type structures 952 may fuse together with carbons provided by other carbonaceous shell-type structures 954 to form a carbonaceous structure 956. A group of the carbonaceous structures 956 may coalesce and/or join with one another to form the aggregate 1010. In some aspects, a core region 958 of each of the carbonaceous structures 956 may be tunable, for example, in that the core region 958 may include various defined concentration levels of interconnected graphene structures, as described with reference to FIG. 8A and/or FIG. 8B. In some implementations, some of the carbonaceous structures 956 may have a first concentration of interconnected carbons approximately between 0.1 g/cc and 2.3 g/cc at or near the exterior carbonaceous shell-type structure 952. Each of the carbonaceous structures 956 may have pores to transport lithium cations ($Li^+$) extending inwardly from toward the core region 1008.

In some implementations, the pores in each of the carbonaceous structures 956 may have a width or dimension between approximately 0.0 nm and 0.5 nm, between approximately 0.0 and 0.1 nm, between approximately 0.0 and 6.0 nm, or between approximately 0.0 and 35 nm. Each carbonaceous structures 956 may also have a second concentration at or near the core region 958 that is different than the first concentration. For example, the second concentration may include several relatively lower-density carbonaceous regions arranged concentrically. In one implementation, the second concentration may be lower than the first concentration at between approximately 0.0 g/cc and 1.0 g/cc or between approximately 1.0 g/cc and 1.5 g/cc. In some aspects, the relationship between the first concentration and the second concentration may be used to achieve a balance between confining sulfur or polysulfides within a respective electrode and maximizing the transport of lithium cations ($Li^+$). For example, sulfur and/or polysulfides may travel through the first concentration and be at least temporarily confined within and/or interspersed throughout the second concentration during operational cycling of a lithium-sulfur battery.

In some implementations, at least some of the carbonaceous structures 956 may include CNO oxides organized as a monolithic and/or interconnected growths and be produced in a thermal reactor. For example, the carbonaceous structures 956 may be decorated with cobalt nanoparticles according to the following example recipe: cobalt(II) acetate ($C_4H_6CoO_4$), the cobalt salt of acetic acid (often found as tetrahydrate $Co(CH_3CO_2)_2 \cdot 4\ H_2O$, which may be abbreviated as $Co(Oac)_2 \cdot 4\ H_2O$, may be flowed into the thermal reactor at a ratio of approximately 59.60 wt % corresponding to 40.40 wt % carbon (referring to carbon in CNO form), resulting in the functionalization of active sites on the CNO oxides with cobalt, showing cobalt-decorated CNOs at a 15,000× level, respectively. In some implementations, suitable gas mixtures used to produce Carbon #29 and/or the cobalt-decorated CNOs may include the following steps:

Ar purge 0.75 standard cubic feet per minute (scfm) for 30 min;
Ar purge changed to 0.25 scfm for run;
temperature increase: 25° C. to 300° C. 20 mins; and
temperature increase: 300°-500° C. 15 mins.

Carbonaceous materials described with reference to FIGS. 9A and 9B may include or otherwise be formed from one or more instances of graphene, which may include a single layer of carbon atoms with each atom bound to three neighbors in a honeycomb structure. The single layer may be a discrete material restricted in one dimension, such as within or at a surface of a condensed phase. For example, graphene may grow outwardly only in the x and y planes (and not in the z plane). In this way, graphene may be a two-dimensional (2D) material, including one or several layers with the atoms in each layer strongly bonded (such as by a plurality of carbon-carbon bonds) to neighboring atoms in the same layer.

In some implementations, graphene nanoplatelets (e.g., formative structures included in each of the carbonaceous structures 956) may include multiple instances of graphene, such as a first graphene layer, a second graphene layer, and a third graphene layer, all stacked on top of each other in a vertical direction. Each of the graphene nanoplatelets, which may be referred to as a GNP, may have a thickness between 1 nm and 3 nm, and may have lateral dimensions ranging from approximately 100 nm to 100 μm. In some implementations, graphene nanoplatelets may be produced by multiple plasma spray torches arranged sequentially by roll-to-roll (R2R) production. In some aspects, R2R production may include deposition upon a continuous substrate that is processed as a rolled sheet, including transfer of 2D material(s) to a separate substrate. In some instances, the R2R production may be used to form the first thin film 310 and/or the second thin film 320 of the electrode 300 of FIG. 3, for example, such that the concentration level of the first aggregates 312 within the first thin film 310 is different than the concentration level of the second aggregates 322 within the second thin film 320. That is, the plasma spray torches used in the R2R processes may spray carbonaceous materials at different concentration levels to create the first thin film 310 and/or the second thin film 320 using specific concentration levels of graphene nanoplatelets. Therefore, R2R processes may provide a fine level of tunability for the battery 100 of FIG. 1 and/or the battery 200 or FIG. 2.

Figure 10B:
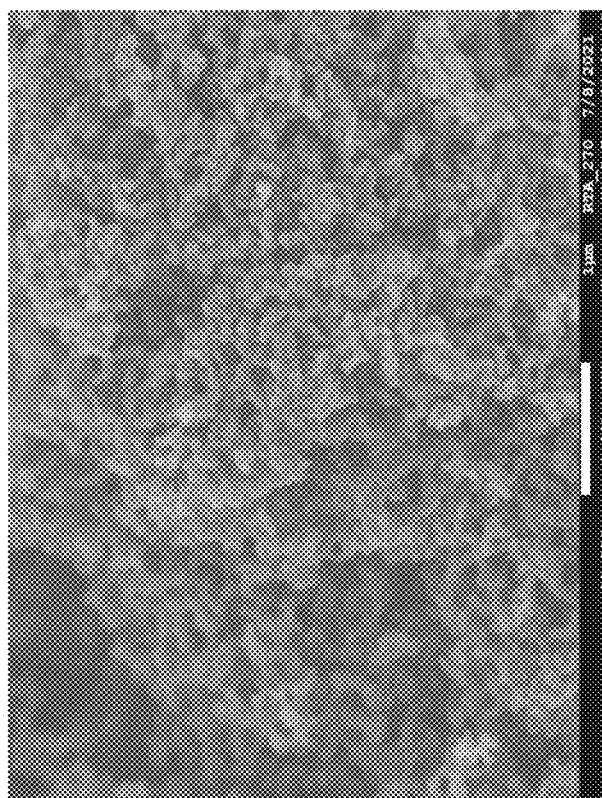
FIGS. 10A and 10B show transmission electron microscope (TEM) images of carbonaceous particles treated with carbon dioxide (CO$_2$), according to some implementation.
Figure 10A:
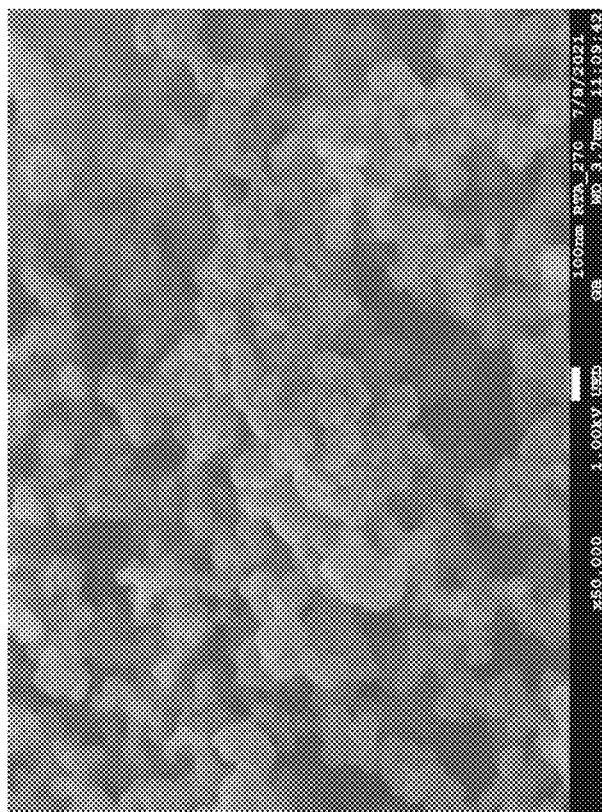

FIGS. 10A and 10B show transmission electron microscope (TEM) images 1000 and 1050, respectively, of carbonaceous particles treated with carbon dioxide ($CO_2$), according to some implementations. The carbonaceous particles shown in FIGS. 10A and 10B may include or otherwise be formed from one or more instances of graphene, which may include a single layer of carbon atoms with each atom bound to three neighbors in a honeycomb structure.

Figure 11:
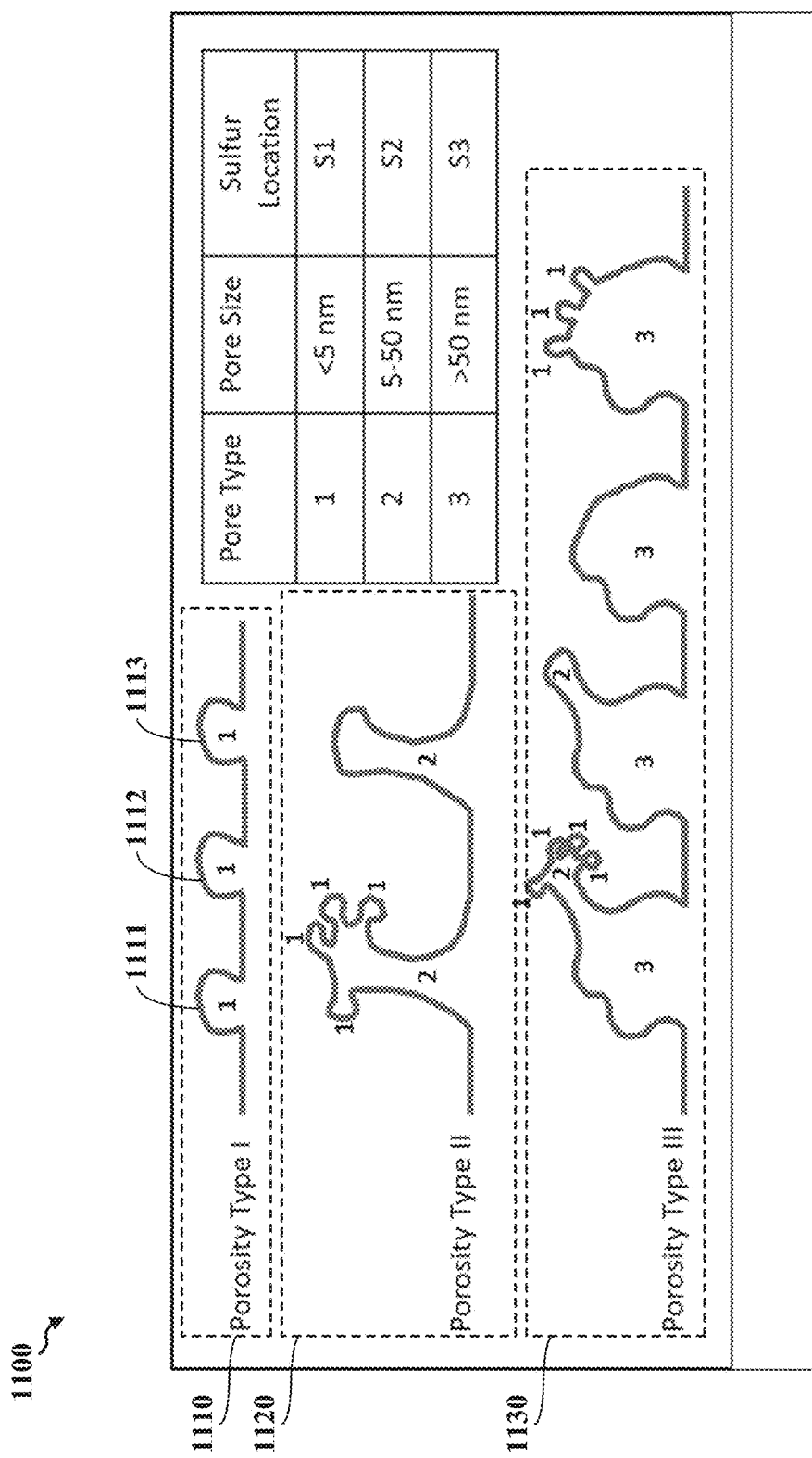
FIG. 11 shows a diagram depicting carbon porosity types prevalent in the anodes and/or the cathodes of the present disclosure, according to some implementations.

FIG. 11 shows a diagram 1100 depicting carbon porosity types of various carbonaceous aggregates, according to some implementations. In various implementations, the carbonaceous aggregates described with reference to FIG. 11 may be examples of the aggregates 904 of FIG. 9A and/or the carbonaceous structures 956 of FIG. 9B. In some aspects, the carbonaceous aggregates described with reference to FIG. 11 may be used to form the electrode 300 of FIG. 3. As discussed, the aggregates may be formed from or may include a group of carbonaceous structures such as the carbonaceous structure 902 of FIG. 9A or the carbonaceous structures 956 of FIG. 9B. In some aspects, the carbonaceous structures may be CNOs.

The carbonaceous structures may be used to form an electrode (such as the electrode 300 of FIG. 3) having any of the porosity types shown in the diagram 1100. For example, the electrode may include any of a porosity type 1 1110, a porosity type II 1120, and a porosity type III 1130. In some implementations, the porosity type 1 1110 may include a first pore 1111, a second pore 1112, and a third pore 1113, all sized with a principal dimension of less than 5 nm to retain polysulfides within the electrode. Some polysulfides may grow in size upon forming larger complexes and become immovably lodged within pores of the porosity type I 1110. In some implementations, aggregates may be joined together to create pores of the porosity type II 1120 and/or porosity type III 1130 that can retain larger polysulfides and/or polysulfide complexes.

Figure 12:
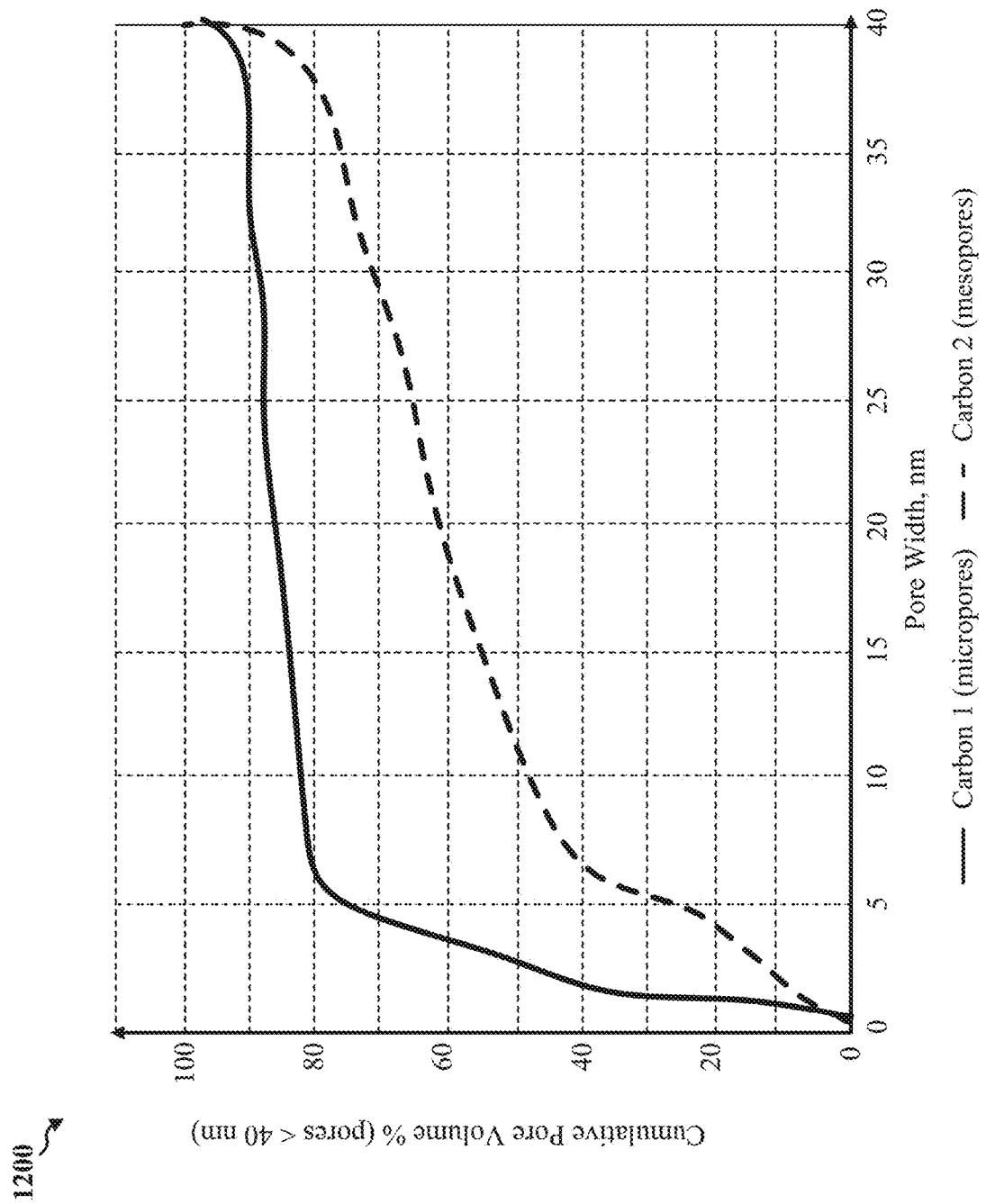
FIG. 12 shows a graph depicting cumulative pore volume versus pore width for micropores and mesopores dispersed throughout the anode or cathode of a battery, according to some implementations.

FIG. 12 shows a graph 1200 depicting pore size versus pore distribution of an example electrode, according to some implementations. As used herein, "Carbon 1" refers to structured carbonaceous materials including mostly micropores (such as less than 5 nm in principal dimension), and "Carbon 2" refers to structured carbonaceous materials including mostly mesopores (such as between approximately 20 nm to 50 nm in principal dimension). In some implementations, an electrode suitable for use in one of the batteries disclosed herein may be prepared to have the pore size versus pore distribution depicted in the graph 1200.

Figure 13:
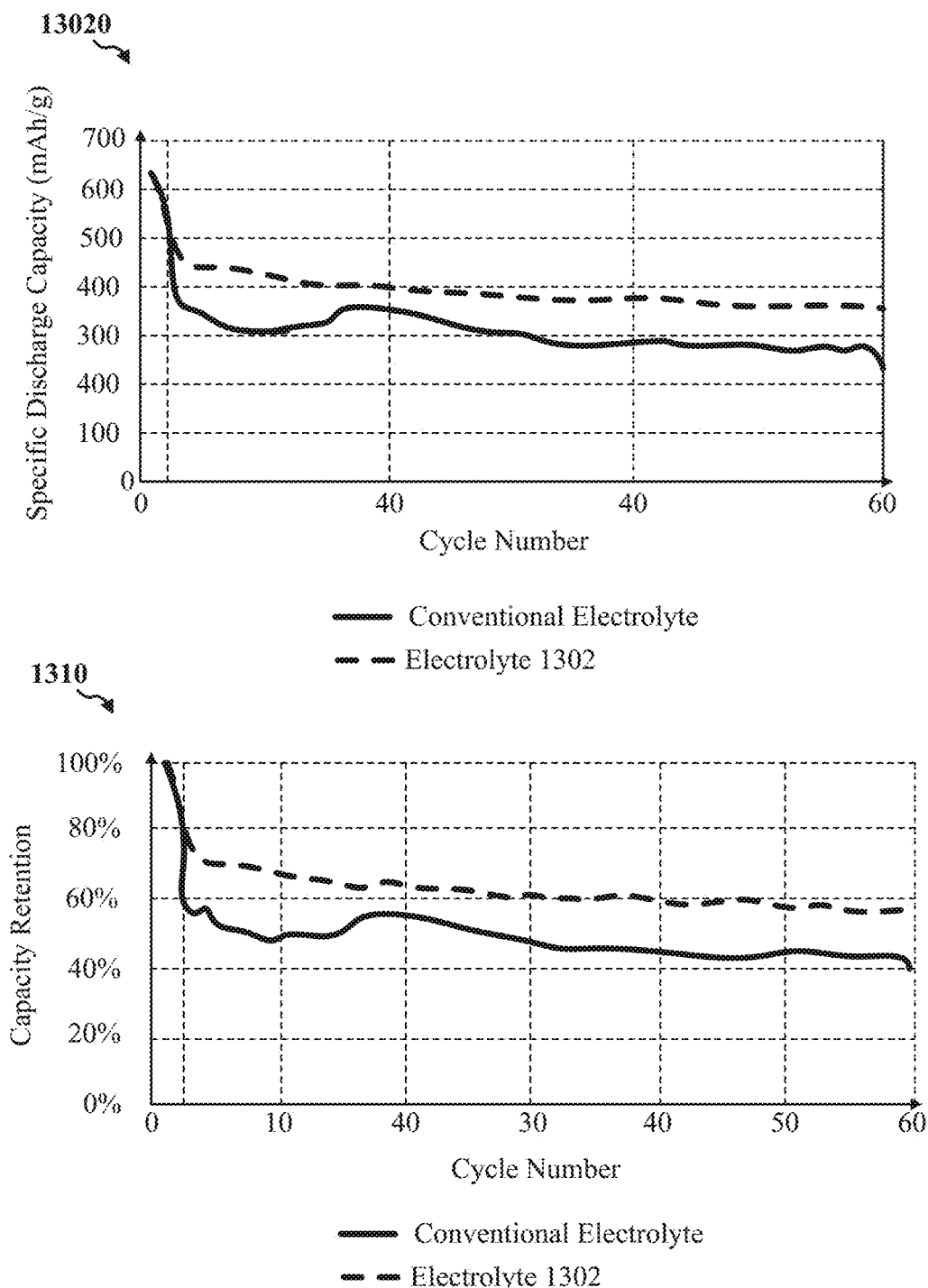
FIG. 13 shows graphs depicting battery performance per cycle number, according to some implementations.

FIG. 13 shows a first graph 1300 and a second graph 1310 depicting battery performance per cycle number, according to some implementations. Specifically, the first graph 1300 shows the specific discharge capacity of an example battery employing an electrolyte 1302 disclosed herein relative to the specific discharge capacity of a conventional battery employing a conventional electrolyte. The second graph shows the capacity retention of the battery employing the electrolyte 1302 relative to the capacity retention of the battery employing the conventional electrolyte. In some aspects, the electrolyte 1302 may be one example of the electrolyte 130 of FIG. 1 or the electrolyte 230 of FIG. 2. In the first graph 1300 and the second graph 1310, the conventional electrolyte is prepared as 1 M LiTFSI in DME:DOL:TEGDME (volume:volume:volume=1:1:1) with 2 wt. % $LiNO_3$.

Figure 14:
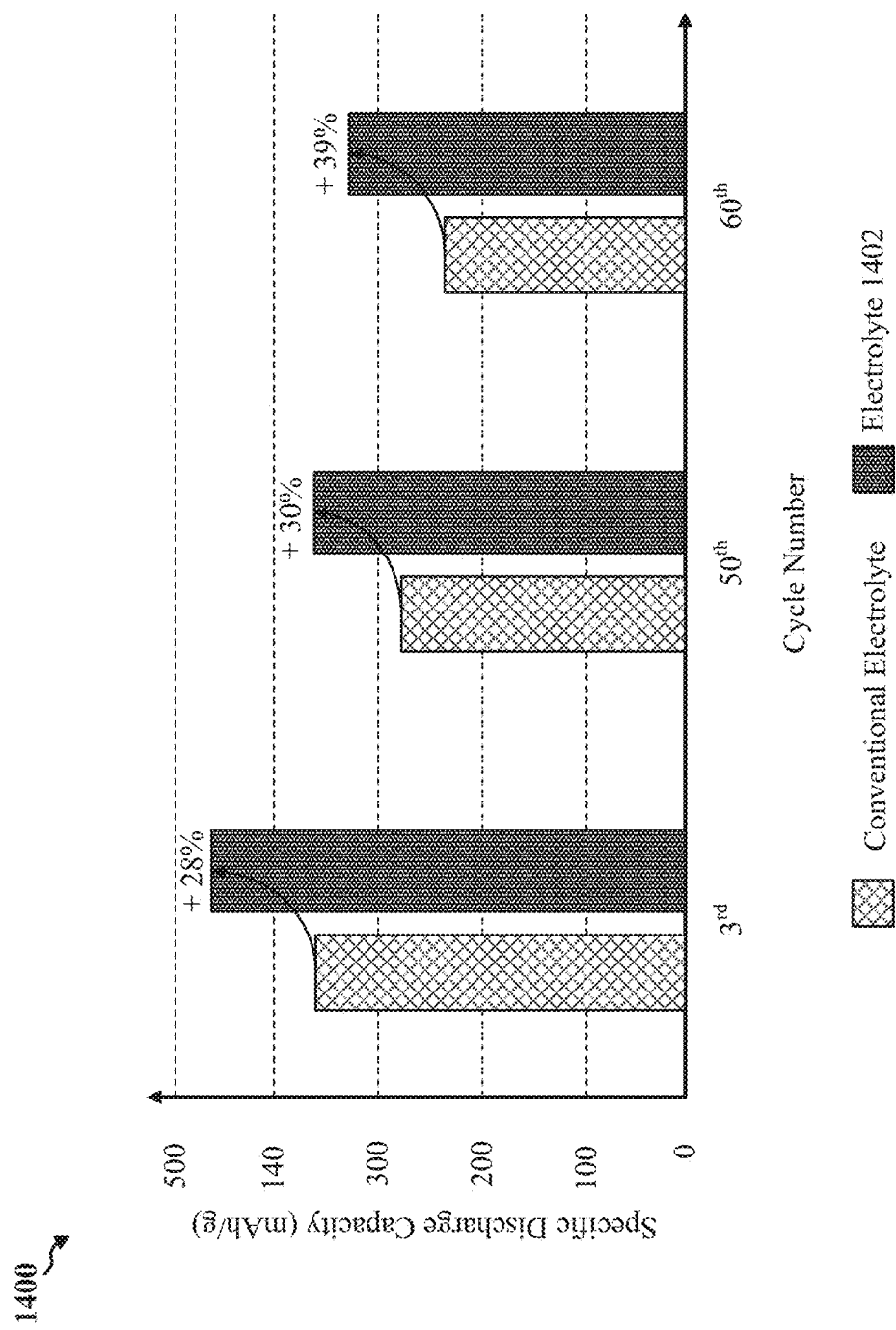
FIG. 14 shows a bar chart depicting capacity per cycle number, according to some implementations.

FIG. 14 shows a bar chart 1400 depicting battery performance per cycle number, according to some implementations. Specifically, the bar chart 1400 depicts the specific discharge capacity per cycle number of an example battery employing an electrolyte 1402 disclosed herein relative to the specific discharge capacity per cycle number of a conventional battery employing a conventional electrolyte. In some aspects, the electrolyte 1402 may be one example of the electrolyte 130 of FIG. 1 or the electrolyte 230 of FIG. 2. In the bar chart 1400, the conventional electrolyte is prepared as 1 M LiTFSI in DME:DOL:TEGDME (volume:volume:volume=1:1:1). The bar chart 1400 shows that employing the electrolyte 1402 in an example battery (such as the battery 100 of FIG. 1 or the battery 200 of FIG. 2) may increase the specific discharge capacity of the battery by approximately 28% at the $3^{rd}$ cycle number, by approximately 30% at the $50^{th}$ cycle number, and by approximately 39% at the $60^{th}$ as compared to a battery employing the conventional electrolyte.

Figure 15:
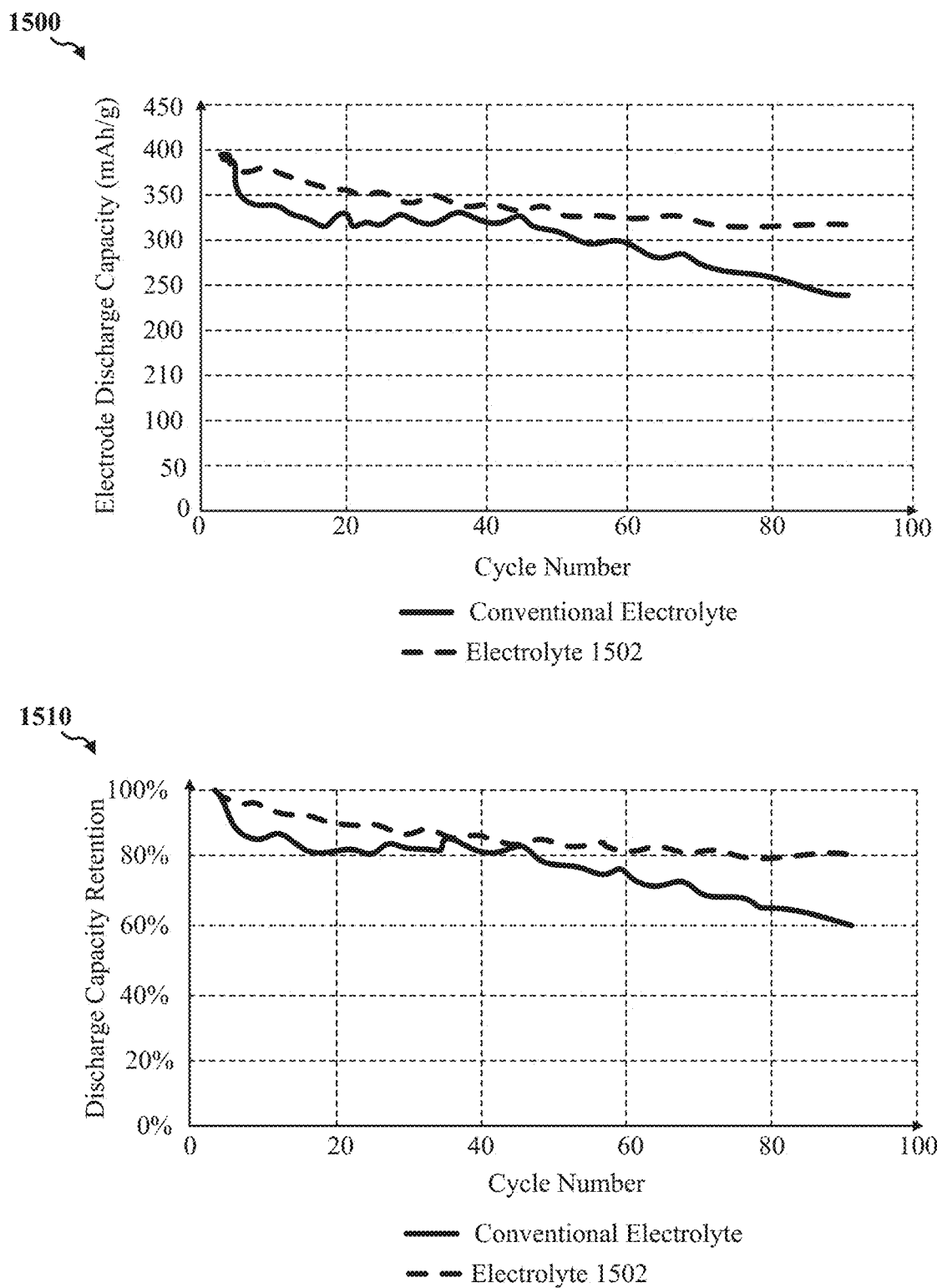
FIG. 15 shows graphs depicting battery performance per cycle number, according to some implementations.

FIG. 15 shows a first graph 1500 and a second graph 1510 depicting battery performance per cycle number, according to some implementations. Specifically, the first graph 1500 shows the electrode discharge capacity per cycle number of an example lithium-sulfur coin cell employing an electrolyte 1502 disclosed herein relative to the electrode discharge capacity per cycle number of an example lithium-sulfur coin cell battery employing a conventional electrolyte, and the second graph 1510 shows the capacity retention per cycle number of the lithium-sulfur coin cell battery employing the electrolyte 1502 relative to the electrode discharge capacity per cycle number of the lithium-sulfur coin cell battery employing the conventional electrolyte. In some aspects, the electrolyte 1502 may be one example of the electrolyte 130 of FIG. 1 or the electrolyte 230 of FIG. 2. The lithium-sulfur coin cell battery is cycled at a discharge rate of 1C (such as fully discharged within one hour), at 100% depth-of-discharge (DOD) and is kept at approximately at room temperature (68° F. or 20° C.). The conventional electrolyte is prepared as 1 M LiTFSI in DME:DOL:TEGDME (volume:volume:volume=1:1:1) with 2 wt. % $LiNO_3$.

Figure 16:
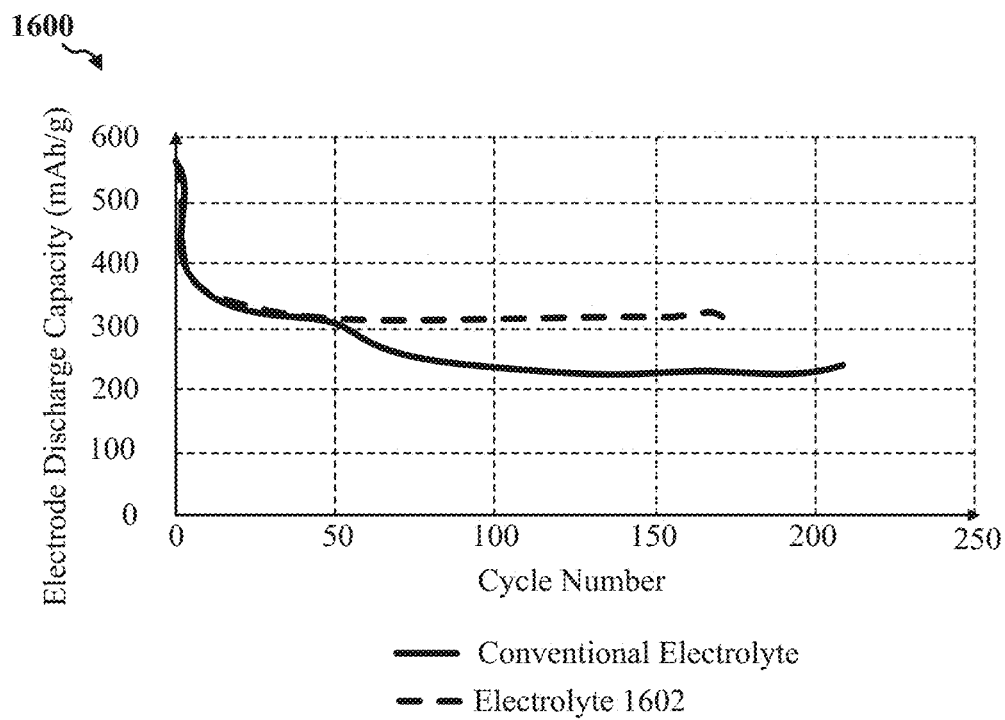
FIG. 16 shows a graph depicting battery discharge capacity per cycle number, according to some implementations.

FIG. 16 shows a graph 1600 depicting electrode discharge capacity per cycle number, according to some implementations. Specifically, the graph 1600 depicts the electrode discharge capacity per cycle number of an example battery employing an electrolyte 1602 disclosed herein relative to the electrode discharge capacity of a conventional battery employing a conventional electrolyte. In some aspects, the electrolyte 1602 may be one example of the electrolyte 130 of FIG. 1 or the electrolyte 230 of FIG. 2. The conventional electrolyte is prepared as 1 M LiTFSI in DME:DOL:TEGDME (volume:volume:volume=1:1:1) with 2 wt. % $LiNO_3$, and the electrolyte 1602 is prepared as 1 M LiTFSI in DME:DOL:TEGDME (volume:volume:volume=58:29:13) with approximately 2 wt. % $LiNO_3$.

Figure 17:
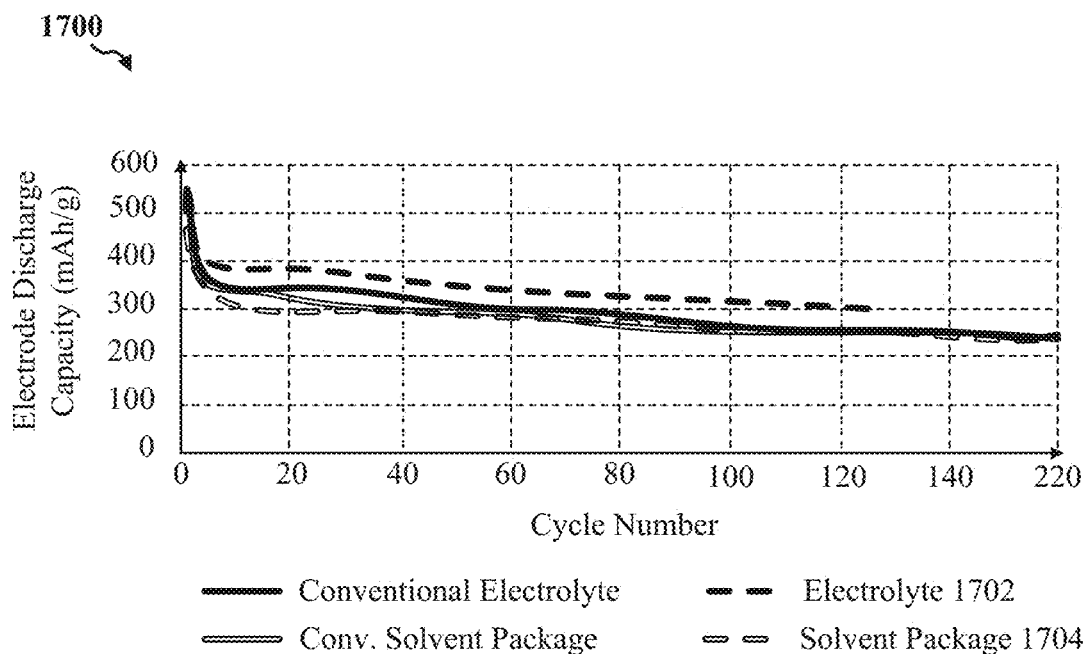
FIG. 17 shows a graph depicting battery discharge capacity per cycle number, according to some implementations.

FIG. 17 shows another graph 1700 depicting electrode discharge capacity per cycle number, according to some implementations. Specifically, the graph 1700 depicts the electrode discharge capacity per cycle number of an example battery employing an electrolyte 1702 and solvent package 1704 disclosed herein relative to the electrode discharge capacity of a conventional battery employing a conventional electrolyte and solvent package. The conventional electrolyte is prepared as 1 M LiTFSI in DME:DOL:TEGDME (volume:volume:volume=1:1:1) with approximately 2 wt. % $LiNO_3$, and the electrolyte 1702 is prepared as 1 M LiTFSI in DME:DOL:TEGDME (volume:volume:volume=58:29:13) with 2 wt. % $LiNO_3$. The conventional solvent package is prepared as 1 M LiTFSI in DME:DOL:TEGDME (volume:volume:volume=1:1:1), and the solvent package 1704 is prepared as 1 M LiTFSI in DME:DOL:TEGDME (volume:volume:volume=58:29:13).

Figure 18:
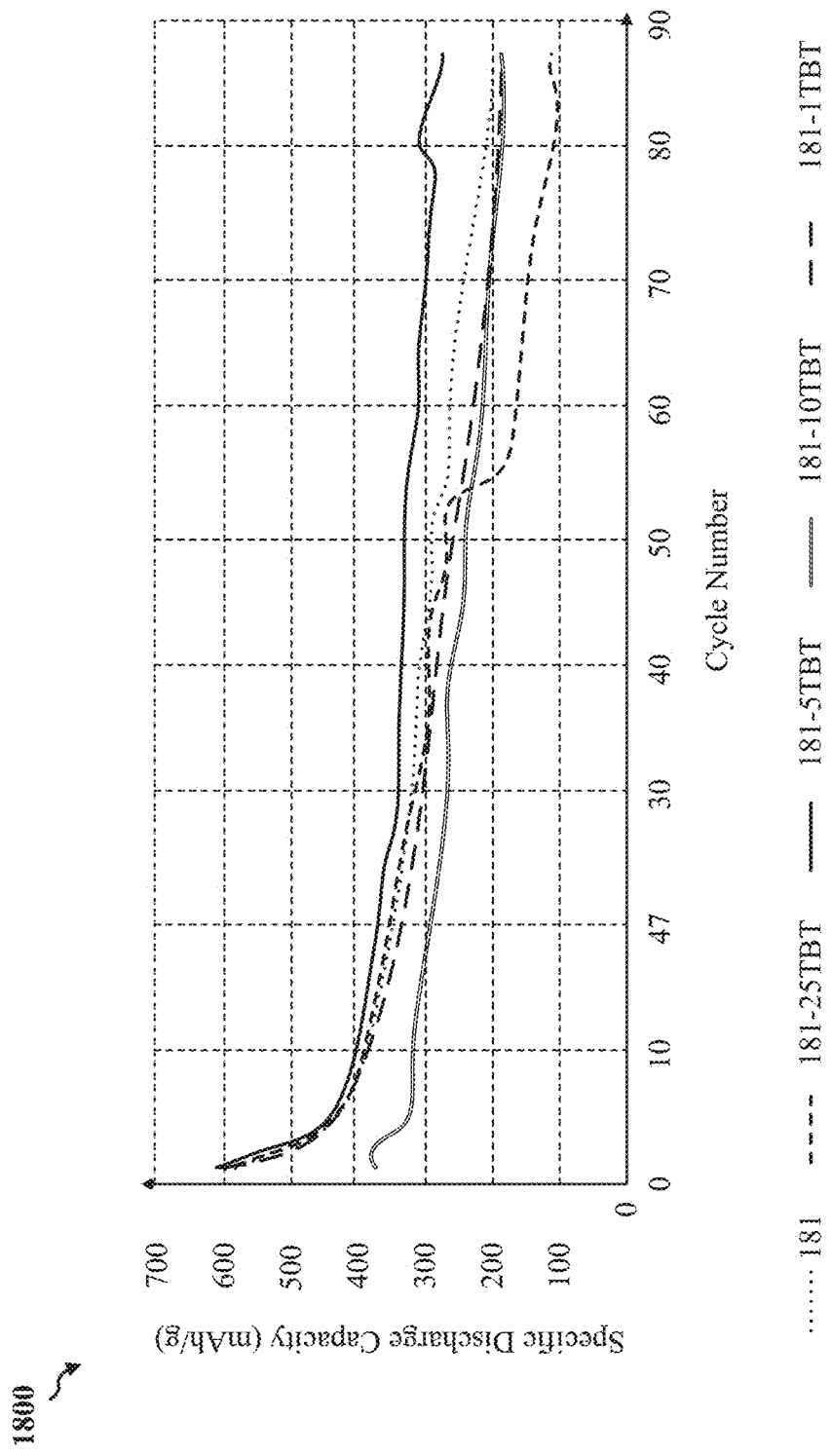
FIG. 18 shows a graph depicting battery specific discharge capacity for various TBT-containing electrolyte mixtures, according to some implementations.

FIG. 18 shows a graph 1800 depicting specific discharge capacity per cycle number for various TBT-containing electrolyte mixtures, according to some implementations. As shown in the graph 1800, "181" indicates an electrolyte without any TBT additions, resulting in a 0 M TBT concentration level, "181-25TBT" indicates an electrolyte prepared at a 25 M TBT concentration level and so on and so forth. In some implementations, a 5M TBT concentration level may result in an approximate 70 mAh/g discharge capacity increase relative to the electrolyte without any TBT additions.

Figure 19:
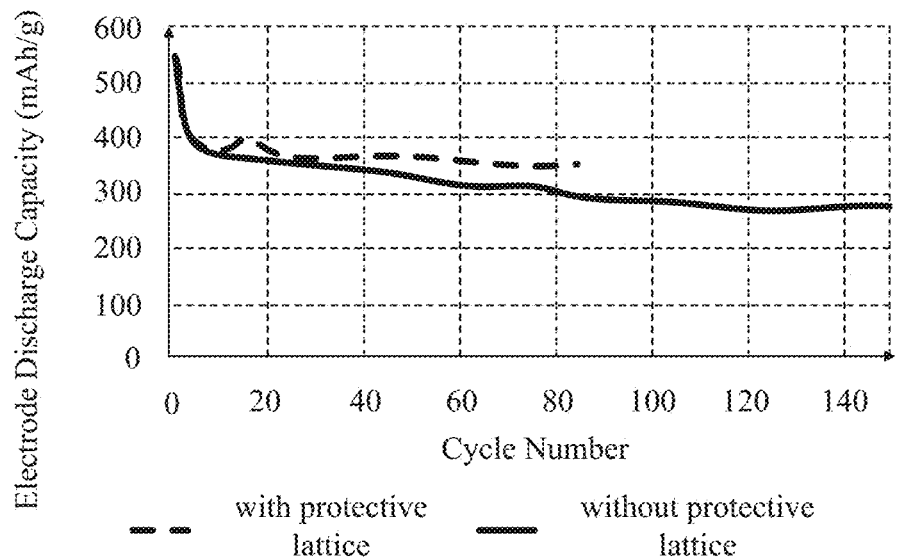
FIG. 19 shows graphs depicting battery specific discharge capacity per cycle number for the battery of FIG. 1, according to some implementations.
Figure 19:
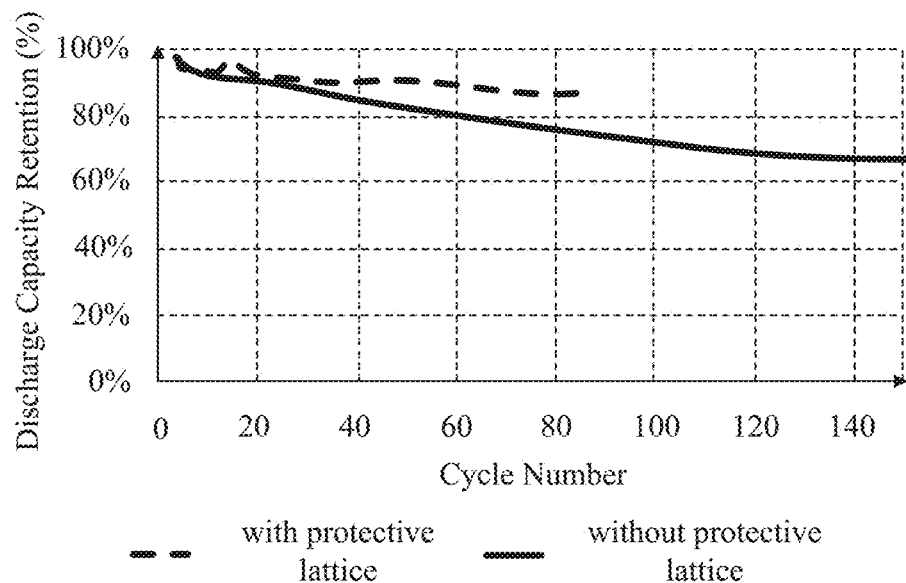

FIG. 19 shows a first graph 1900 depicting electrode discharge capacity per cycle number and a second graph 1910 depicting electrode capacity retention per cycle number, according to some implementations. Specifically, the first graph 1900 depicts the electrode discharge capacity per cycle number of an example battery that includes a protective lattice disclosed herein relative to the electrode discharge capacity of an example battery that does not include the protective lattice disclosed herein. The second graph 1910 depicts the electrode capacity retention per cycle number of an example battery that includes the protective lattice disclosed herein relative to the electrode capacity retention of an example battery that does not include the protective lattice disclosed herein. In some aspects, the protective lattice may be one example of the protective lattice 402 of FIG. 4. Performance results for both the first graph 1900 and the second graph 1910 include usage of an electrolyte prepared with 1 M LiTFSI in DME:DOL:TEGDME (volume:volume:volume=58:29:13) with 2 wt. % $LiNO_3$.

Figure 20:
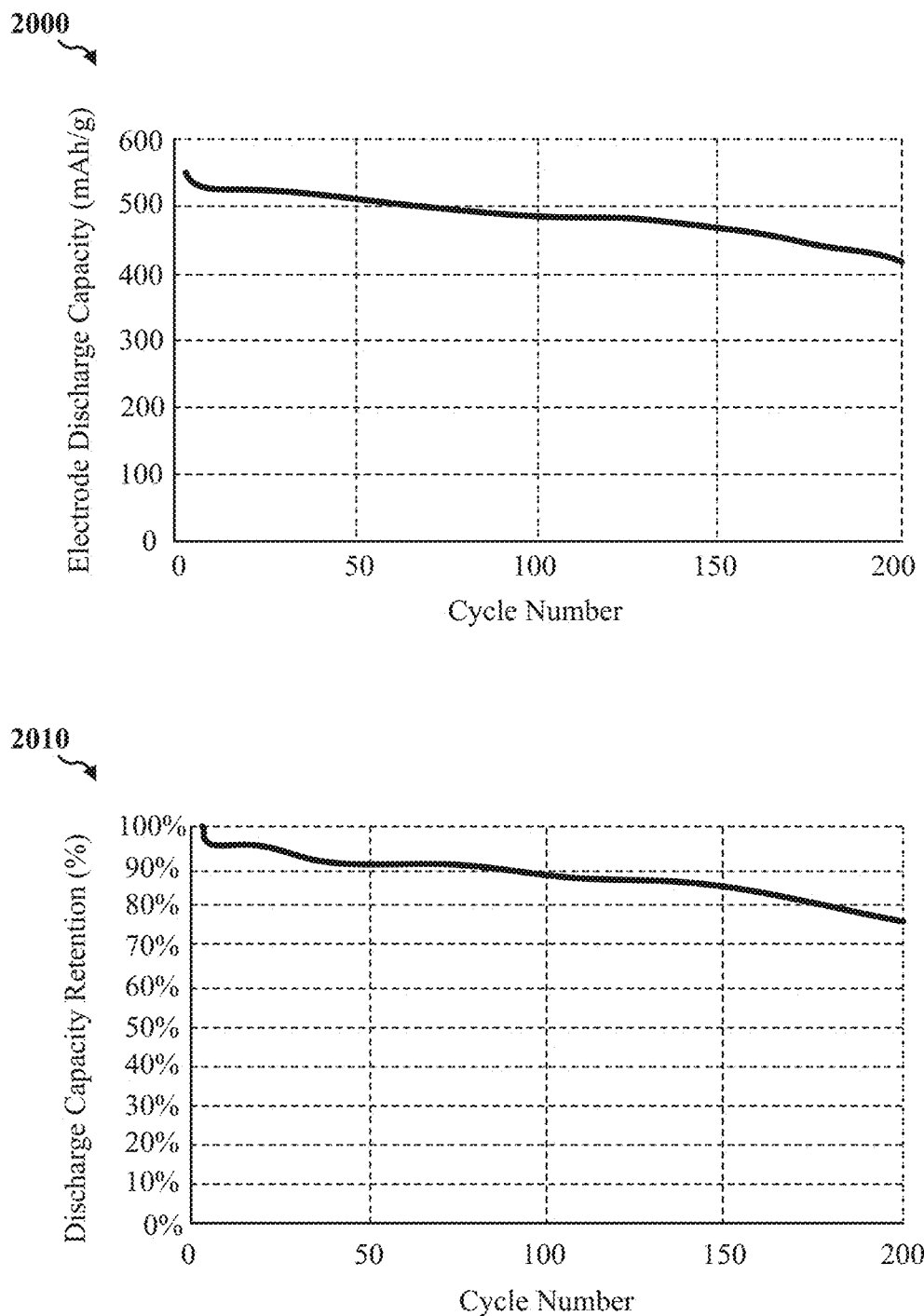
FIG. 20 shows graphs depicting battery specific discharge capacity and discharge capacity retention per cycle number for the battery of FIG. 2, according to other implementations.

FIG. 20 shows a first graph 2000 depicting electrode discharge capacity per cycle number and a second graph 2010 depicting electrode capacity retention per cycle number, according to other implementations. Specifically, the first graph 2000 depicts the electrode discharge capacity per cycle number of an example battery that includes the polymeric network of FIG. 7. The second graph 2010 depicts the discharge capacity retention per cycle number of an example battery that includes the polymeric network of FIG. 7. The battery may be one example of the battery 100 of FIG. 1 or the battery 200 of FIG. 2. Performance results for both the first graph 2000 and the second graph 2010 include usage of an electrolyte prepared with 1 M LiTFSI in DME:DOL: TEGDME (volume:volume:volume=58:29:13) with 2 wt. % LiNO$_3$.

Figure 21:
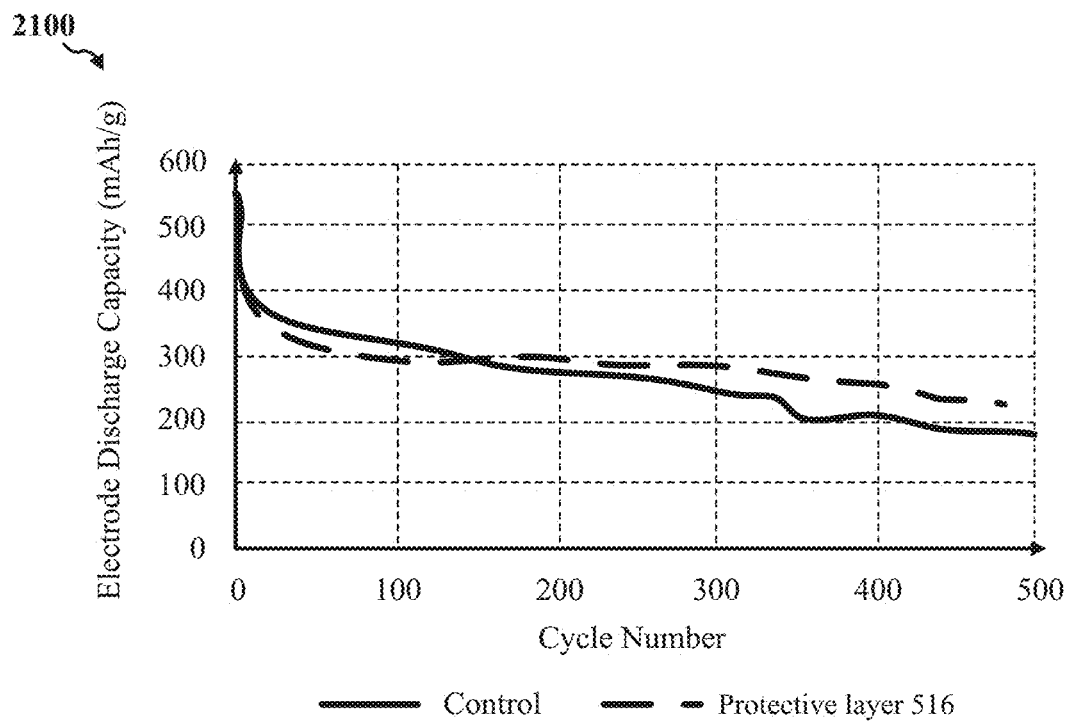
FIG. 21 shows graphs depicting battery specific discharge capacity and discharge capacity retention per cycle number for the battery of FIG. 2, according to some other implementations.
Figure 21:
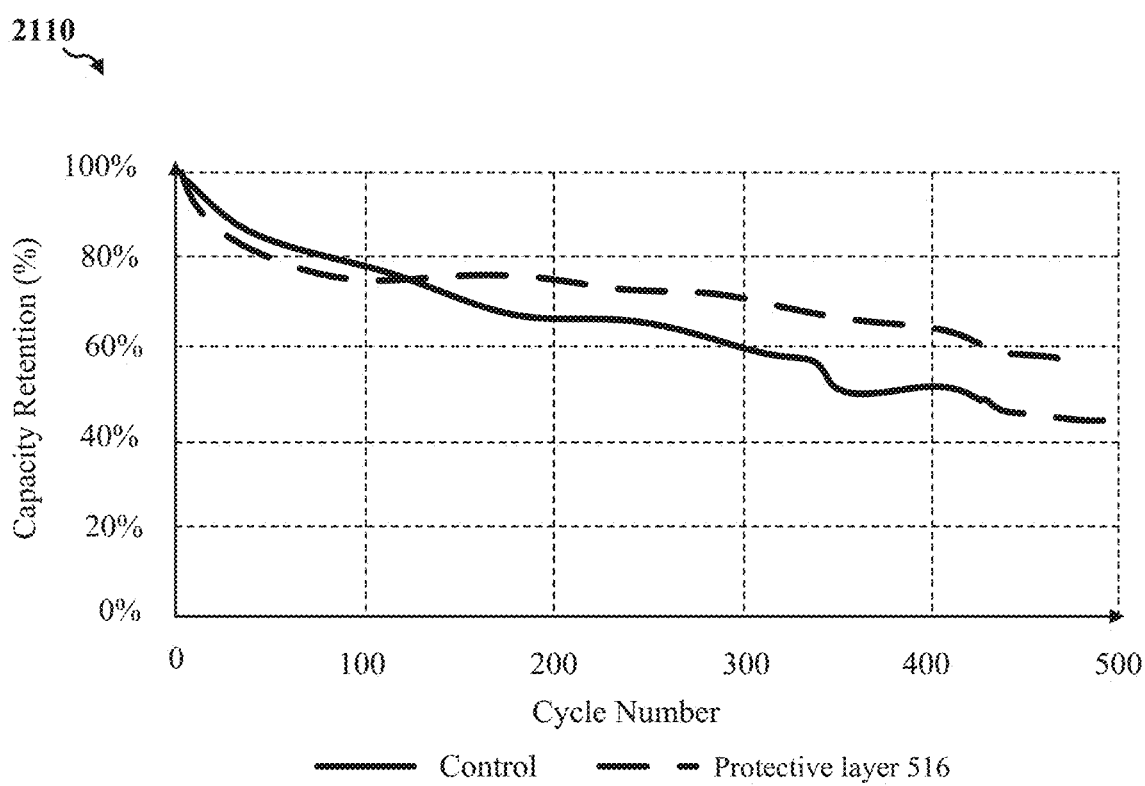

FIG. 21 shows a first graph 2100 depicting electrode discharge capacity per cycle number and a second graph 2110 depicting electrode capacity retention per cycle number, according to some other implementations. Specifically, the first graph 2100 depicts the electrode discharge capacity per cycle number of an example battery that includes the protective layer 516 of FIG. 5. The second graph 2110 depicts the discharge capacity retention per cycle number of an example battery that includes the protective layer 516 of FIG. 5. The battery may be one example of the battery 100 of FIG. 1 or the battery 200 of FIG. 2. Performance results for both the first graph 1900 and the second graph 1910 include usage of an electrolyte prepared with 1 M LiTFSI in DME:DOL:TEGDME (volume:volume:volume=58:29:13) with 2 wt. % LiNO$_3$.

Figure 22:
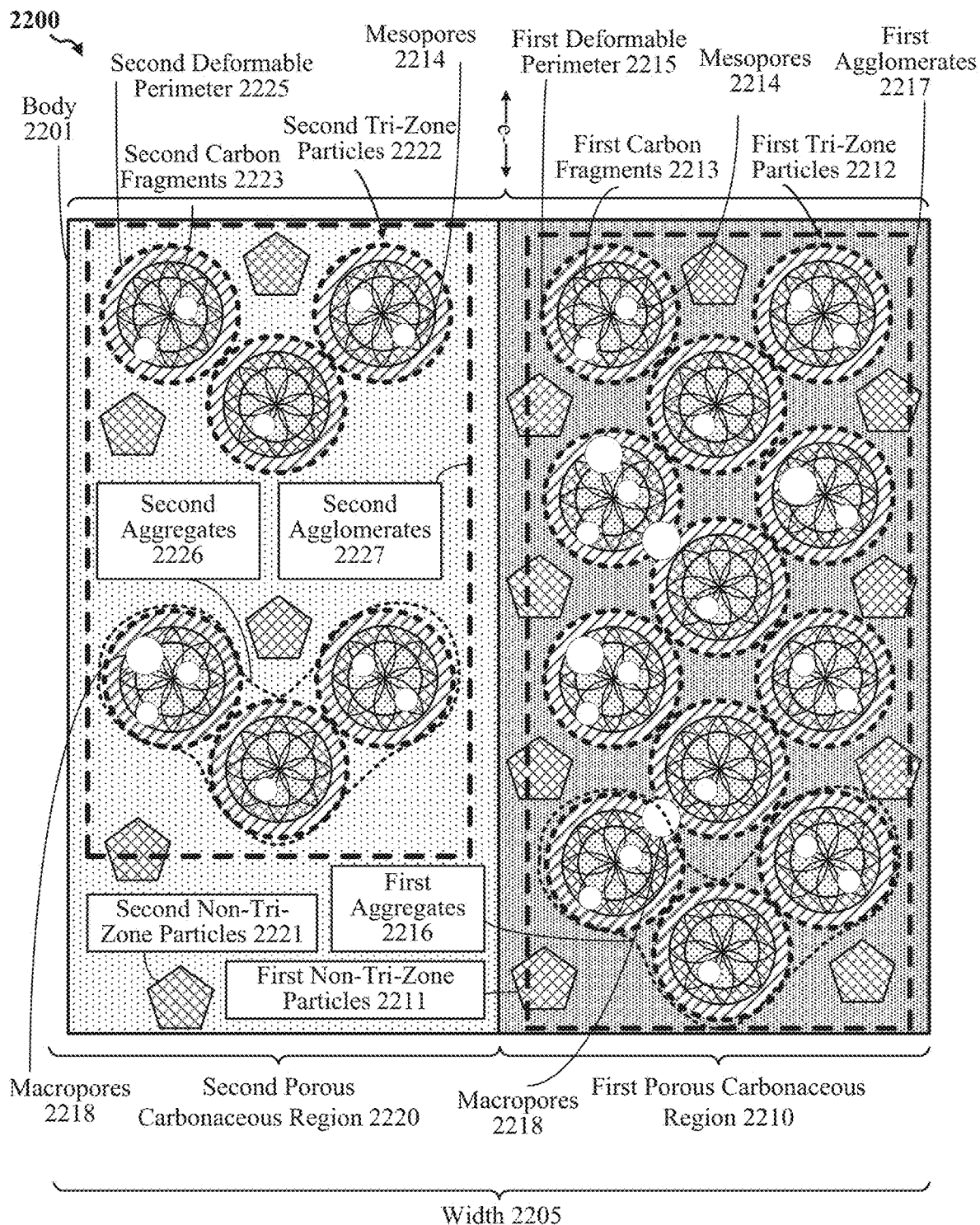
FIG. 22 shows a diagram of an example cathode of a battery, according to some implementations.

FIG. 22 shows an example cathode 2200 having a body 2201 and a width 2205, according to some implementations. In some implementations, the cathode 2200 may be one example of the electrode 300 of FIG. 3. The cathode 2200 may be similar to the electrode 300 of FIG. 3 in many respects, such that description of like elements is not repeated herein. In one implementation, the cathode 2200 includes a first porous carbonaceous region 2210 and a second porous carbonaceous region 2220 positioned adjacent to the first porous carbonaceous region 2210. The first porous carbonaceous region 2210 may be formed of a first concentration level of carbonaceous materials, and the second porous carbonaceous region 2220 formed of a second concentration level of carbonaceous materials dissimilar to the first concentration level of carbonaceous materials. For example, the second porous carbonaceous region 2220 may have a lower concentration level of carbonaceous materials than the first porous carbonaceous region 2210 as shown in FIG. 22. In some aspects, additional porous carbonaceous regions (not shown in FIG. 22 for simplicity) maybe coupled with at least the second porous carbonaceous region.

Specifically, these additional porous carbonaceous regions may be arranged in order of incrementally decreasing concentration levels of carbonaceous materials in a direction away from the first porous carbonaceous region 2210 to provide for complete ionic transport and electrical current tunability. That is, in one implementation, the second porous carbonaceous region 2220 may face a bulk electrolyte (e.g., provided in the liquid phase) and the first porous carbonaceous region 2210 of the cathode 2200 may be coupled with a current collector (not shown in FIG. 22 for simplicity). In this way, denser carbonaceous regions, such as the first porous carbonaceous region 2210, may facilitate higher levels of electrical conduction (shown in FIG. 22 as "e$^-$") between adjacent contact points of carbonaceous materials, while sparser carbonaceous regions, such as the second porous carbonaceous region 2220, may facilitate higher levels of lithium ion transport associated with improved lithium-sulfur battery discharge-charge cycling relative to conventional lithium ion batteries. In some implementations, additional carbonaceous regions coupled with and positioned adjacent to the second porous carbonaceous region 2220 may have a lower density of carbonaceous materials than the second porous carbonaceous region 2220. In this way, the additional carbonaceous regions of lower density may accommodate higher levels of lithium ion transport to, for example, permit for tuning of various performance characteristics of the electrode 300.

In one implementation, the first porous carbonaceous region 2210 may include first non-tri-zone particles 2211. The configuration of the first non-tri-zone particles 2211 within the first porous carbonaceous region is one example configuration. Other placements, orientations, alignments and/or the like are possible for the non-tri-zone particles. In some aspects, each non-tri-zone particle may be an example of one or more carbonaceous materials disclosed elsewhere in the present disclosure. The first porous carbonaceous region 2210 may also include first tri-zone particles 2212 interspersed throughout the first non-tri-zone particles 2211 as shown in FIG. 22, or positioned in any other placement, orientation, or configuration. Each first tri-zone particle 2212 may be one example of the tri-zone particle 850 of FIG. 8B. In addition, or the alternative, each first tri-zone-particle 2212 may include first carbon fragments 2213 intertwined with each other and separated from one another by mesopores 2214. Each tri-zone-particle may have a first deformable perimeter 2215 configured to coalesce with adjacent first non-tri-zone particles 2211 and/or first tri-zone particles 2212.

The first porous carbonaceous region 2210 may also include first aggregates 2216, where each aggregate includes a multitude of the first tri-zone particles 2212 joined together. In one or more particular examples, each first aggregate may have a principal dimension in a range between 10 nanometers (nm) and 10 micrometers (μm). The mesopores 2214 may be interspersed throughout the first plurality of aggregates, where each mesopore has a principal dimension between 3.3 nanometers (nm) and 19.3 nm. In addition, the first porous carbonaceous region 2210 may include first agglomerates 2217, where each agglomerate includes a multitude of the first aggregates 2216 joined to each other. In some aspects, each first agglomerate 2217 may have a principal dimension in an approximate range between 0.1 μm and 1,000 μm. Macropores 2218 may be interspersed throughout the first aggregates 2216, where each macropore may have a principal dimension between 0.1 μm and 1,000 μm. In some implementations, one or more of the above-discussed carbonaceous materials, allotropes and/or structures may be one or more examples of that shown in FIGS. 9A and 9B.

The second porous carbonaceous may include second non-tri-zone particles 2221, which may be one example of the first non-tri-zone particles 2211. The second porous carbonaceous region 2220 may include second tri-zone particles 2222, which may each be one example of each of the first tri-zone particles 2212 and/or may be one example of the tri-zone particle 850 of FIG. 8B. In addition, or the alternative, each second tri-zone particle 2222 may include second carbon fragments 2223 intertwined with each other and separated from one another by the mesopores 2214. Each second tri-zone particle 2222 may have a second deformable perimeter 2225 configured to coalesce with one or more adjacent second non-tri-zone particles 2221 or second tri-zone particles 2222.

In addition, the second porous carbonaceous region 2220 may include second aggregates 2226, where each second aggregate 2226 may include a multitude of the second tri-zone particles 2222 joined together. In one or more particular examples, each second aggregate 2226 may have a principal dimension in a range between 10 nanometers (nm) and 10 micrometers (μm). The mesopores 2214 may be interspersed throughout the second aggregates 2226, each mesopore may have a principal dimension between 3.3 nanometers (nm) and 19.3 nm. Further, the second porous carbonaceous region 2220 may include second agglomerates 2227, each second agglomerate 2227 may include a multitude of the second aggregates 2226 joined to each other, where each agglomerate may have a principal dimension in an approximate range between 0.1 µm and 1,000 µm. The macropores 2218 may be interspersed throughout the second plurality of aggregates, where each macropore having a principal dimension between 0.1 µm and 1,000 µm. In some implementations, one or more of the above-discussed carbonaceous materials, allotropes and/or structures may be one or more examples of that shown in FIGS. 9A and 9B.

In one implementation, the first porous carbonaceous region 2210 and/or the second porous carbonaceous region 2220 may include a selectively permeable shell (not shown in FIG. 22 for simplicity), which may form a separated liquid phase on the first porous carbonaceous region 2210 or the second porous carbonaceous region 2220, respectively. An electrolyte, such as any of the electrolytes disclosed in the present disclosure, may be dispersed within the first porous carbonaceous region and/or the second porous carbonaceous region for lithium ion transport associated with lithium-sulfur battery discharge-charge operational cycling.

In one or more particular examples, the first porous carbonaceous region 2210 may have an electrical conductivity in an approximate range between 500 S/m to 20,000 S/m at a pressure of 12,000 pounds per square in (psi). The second porous carbonaceous region 2220 may have an electrical conductivity in an approximate range between 0 S/m to 500 S/m at a pressure of 12,000 pounds per square in (psi). The first agglomerates 2217 and/or second agglomerates 2227 may include aggregates connected to each other with one or more polymer-based binders.

In some aspects, each first tri-zone particle 2212 may have a first porosity region (not shown in FIG. 22 for simplicity) located around a center of the first tri-zone particle 2212. Similarly, each second tri-zone particle 2222 may have a first porosity region (not shown in FIG. 22 for simplicity) located around a center of the second tri-zone particle 2222. The first porosity region may include first pores. A second porosity region (not shown in FIG. 22 for simplicity) may surround the first porosity region. The second porosity region may include second pores. In one implementation, the first pores may define a first pore density, and the second pores may define a second pore density that is different the first pore density.

In some aspects, the mesopores 2214 may be grouped into first mesopores and second mesopores (both not shown in FIG. 22 for simplicity). In one or more particular examples, the first mesopores may have a first mesopore density, and the second mesopores may have a second mesopore density that is different than the first mesopore density. In addition, the macropores 2218 may be grouped into first macropores that may have a first pore density, and second macropores (both not shown in FIG. 22 for simplicity) that may have a second pore density different than the first pore density.

In one implementation, the first porous carbonaceous region 2210 and/or the second porous carbonaceous region 2220 may nucleate sulfur, such as that necessary to facilitate operational discharge-charge cycling of any of the lithium-sulfur batteries disclosed by the present disclosure. For example, the cathode 2200 may have a sulfur to carbon weight ratio between approximately 1:5 to 10:1. In some aspects, one or more electrically conductive additives may be dispersed within the first porous carbonaceous region 2210 and/or the second porous carbonaceous region 2220 to, for example, correspondingly influence discharge-charge cycling performance of the cathode 2200. In addition, a protective sheath, such as the protective lattice 402 of FIG. 4, may be disposed on the cathode.

In one implementation, the example cathode 2200 of FIG. 22 and/or any of the battery configurations presented in the present disclosure (such as the battery 100 and/or 200), may be prepared with an electrolyte (such as the electrolyte 130 and/or 230) dispersed throughout the respective battery configuration. In addition, or the alternative, the electrolyte 130, the electrolyte 230 and/or the like may be formulated according to the following numbered examples:

| | |
|---|---|
| Example 1 | A 0.4 molar (M) solution of lithium bis(trifluoromethanesulfonyl)imide (LiTFSI) is prepared from approximately 114.83 grams of powdered LiTFSI dissolved in 1 liter of a liquid solvent mixture. The liquid solvent mixture (alternatively referred to as a "ternary solvent package") has a 58:28:13 volume ratio of dimethoxyethane (DME), 1,3-dioxolane (DOL), and tetraethylene glycol dimethyl ether (TEGDME). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 2 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and tetrahydrofuran (THF). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 3 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and toluene. An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 4 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and dimethyl sulfoxide (DMSO). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 5 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and tetramethyl urea (TMU). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 6 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and dimethyl formamide (DMF). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 7 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and methoxyperfluorobutane (MPB). An additive including 26 grams of lithium nitrate (LiNO$_3$) may be added to the 0.4 molar (M) solution of LiTFSI to achieve a dilution level of 2 percent by weight of lithium nitrate (LiNO$_3$). |

| | |
|---|---|
| Example 8 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and trifluoro ethyl ether (TFE). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 9 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and triethylene glycol dimethyl ether (TrigDME). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 10 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and methyl tert-butyl ether (MTBE). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 11 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and dimethyl trisulfide (DMTS). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 12 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and acetonitrile (can). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 13 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and 1,1,2,2-tetrafluoro-1-1(2,2,2-trifluoroethoxy)ethane (TFETFE). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 14 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and DAP. An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 15 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and TTE. An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 16 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and 2-Methyl-tetrahydrofuran (MeTHF). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 17 | A 0.4 molar (M) solution of LiTFSI is prepared from approximately 114.83 grams of powdered LiTFSI dissolved in 1 liter of a liquid solvent mixture having a 50:25:25 volume ratio of DME, DOL, and bis(2-methoxyethyl) ether (DEGDME). An additive including 26 grams of lithium nitrate (LiNO$_3$) is added to the 0.4 molar (M) solution of LiTFSI to achieve a dilution level of 2 percent by weight of lithium nitrate (LiNO$_3$). |
| Example 18 | A 0.1 molar (M) solution of LiTFSI is prepared from approximately 28.71 grams of powdered LiTFSI dissolved in 1 liter of a liquid solvent mixture having a 95:5 volume ratio of DME and DOL. No additional lithium nitrate (LiNO$_3$) is added to the 0.1 molar (M) solution of LiTFSI. |
| Example 19 | A 0.1 molar (M) solution of LiTFSI is prepared from approximately 28.71 grams of powdered LiTFSI dissolved in 1 liter of a liquid solvent mixture having a 50:25:25 volume ratio of DME, DOL, and bis(2-methoxyethyl) ether (DEGDME). An additive including 26 grams of lithium nitrate (LiNO$_3$) is added to the 0.1 molar (M) solution of LiTFSI to achieve a dilution level of 2 percent by weight of lithium nitrate (LiNO$_3$). |
| Example 20 | A 0.4 molar (M) solution of LiTFSI is prepared from approximately 114.83 grams of powdered LiTFSI dissolved in 1 liter of a liquid solvent mixture having a 58:29:13 volume ratio of DME, DOL, and tetraethylene glycol dimethyl ether (TEGDME). No additional lithium nitrate (LiNO$_3$) is added to the 0.1 molar (M) solution of LiTFSI. |

In some aspects, ionic conductivity of the lithium cations (Li$^+$) 125 transported throughout the electrolyte 130, such as when prepared according to any one or more of the above-presented examples, may depend on the molecular structure of various component substances of the electrolyte 130. For example, substances that are hydrophobic and less polar may have lower ionic conductivity values. Substances that are hydrophilic and more polar may have higher ionic conductivity values. In this way, component materials used in the above electrolyte formulation examples of the electrolyte 130 may be ranked from lowest ionic conductivity to highest ionic conductivity according to the following order: DMTS, TOL, TFETFE, MPB, MTBE, TrigDME, THF, TEE, TMU, DMSO, DMF, ACN.

Of the electrolyte components disclosed above in examples 1-20, lithium nitrate (LiNO$_3$) may dissociate into lithium cations (Li$^+$) (Li$^+$) and nitrate anions (NO$_3^-$). In this way, the lithium nitrate (LiNO$_3$) may produce nitrogen-oxygen containing compounds (not shown in the Figures for simplicity), which may be derived from and/or based on nitrate anions (NO$_3^-$). The electrolyte 130, such as when prepared according to any one or more of the examples presented above, may prevent diffusion of nitrogen-oxygen containing compounds generated during operational discharge-charge cycling of the battery 100. In addition, some nitrate anions (NO$_3^-$) may form a solvation sheath (not shown in the Figures for simplicity) on the anode 120. In this way, the electrolyte 130 may be prepared to permit nitrogen-oxygen additives to coat the anode 120 at least partially and thereby prevent the extension of dendrites from the anode 120 toward the cathode 110 through the electrolyte 130. The solvation sheath may form coordination complexes between LiTFSI in the electrolyte 130 and the lithium cations (Li$^+$) 125. The coordination complexes may include a central atom or ion (such as the lithium cations (Li$^+$) 125), which may be metallic and may be referred to as "the coordination center," and a surrounding array of bound molecules or ions, which may be referred to ligands or complexing agents.

Protection against dendrite formation provided by the solvation sheath may be at least partially compromised due to continued reduction of nitrogen compounds prevalent in the nitrogen-oxygen additives that form, for example, nitrite ($NO_2^-$), which may produce gas resulting in pockets of gas bubbles in the electrolyte 130. These gas bubbles may interfere with transport of the lithium cations ($Li^+$) 125, may cause expansion of the battery 100 and may also lead to undesirable hindrance of lithium ionic transport. To address these limitations, Example 18 of the above-presented electrolyte formulations may be prepared without the addition of lithium nitrate ($LiNO_3$) and/or other types of nitrogen-oxygen containing additives.

Figure 23:
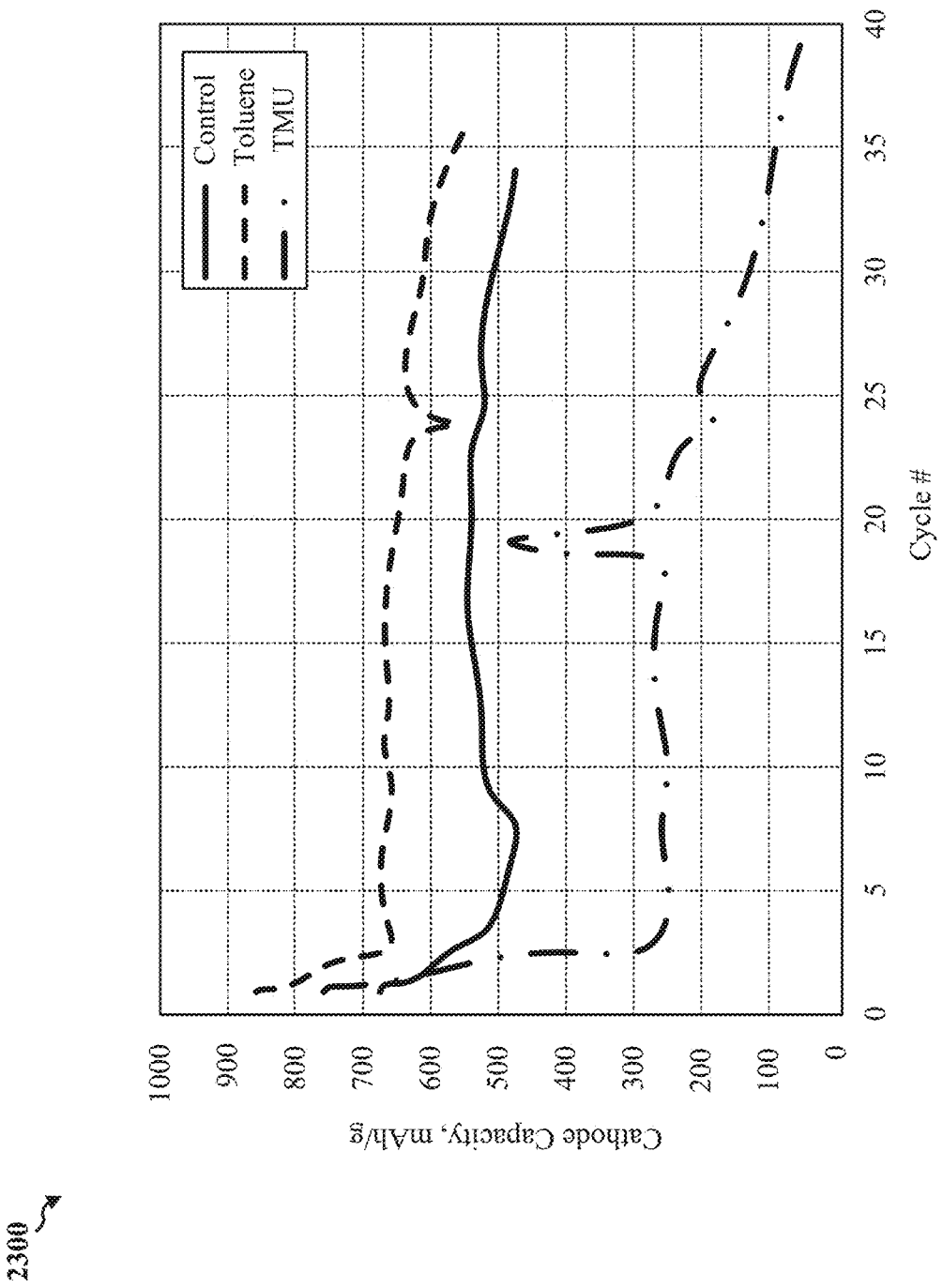
FIGS. 23-25 show graphs depicting specific discharge capacity per cycle number, according to some implementations.
Figure 24:
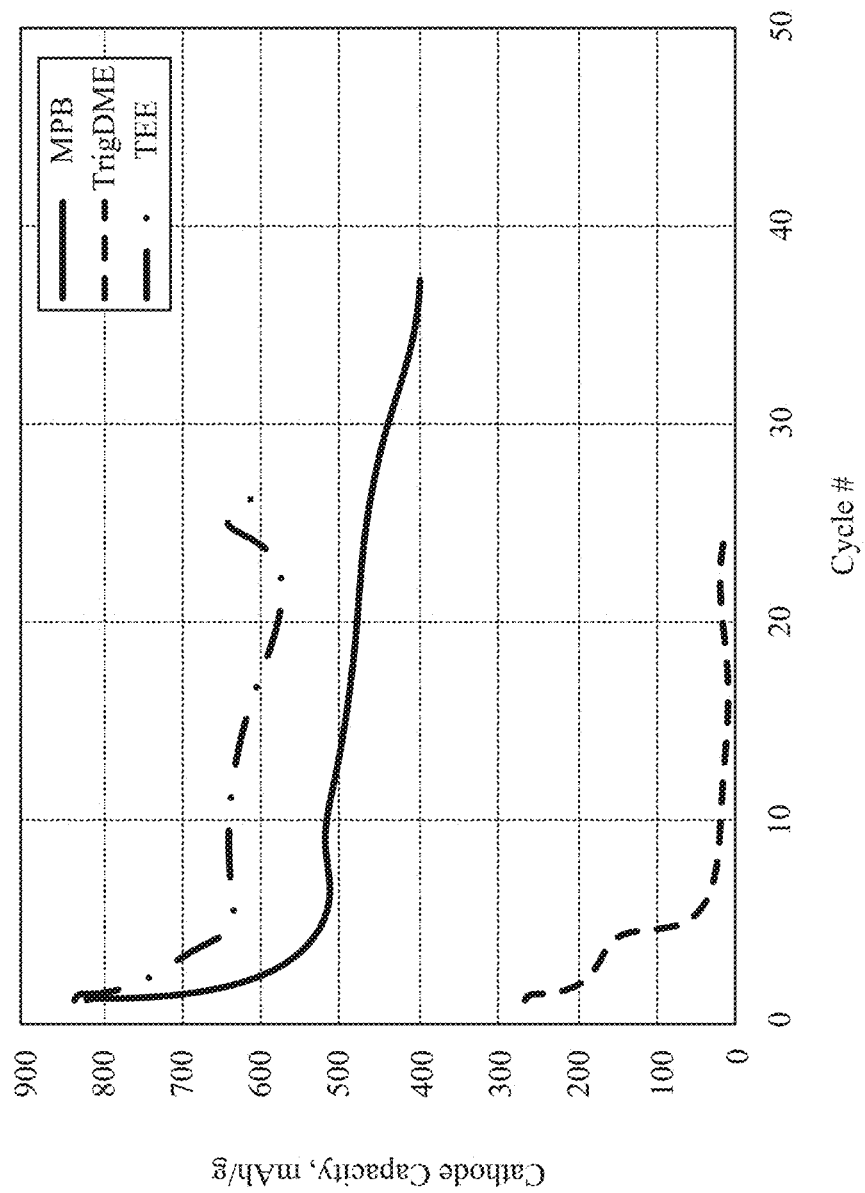
Figure 25:
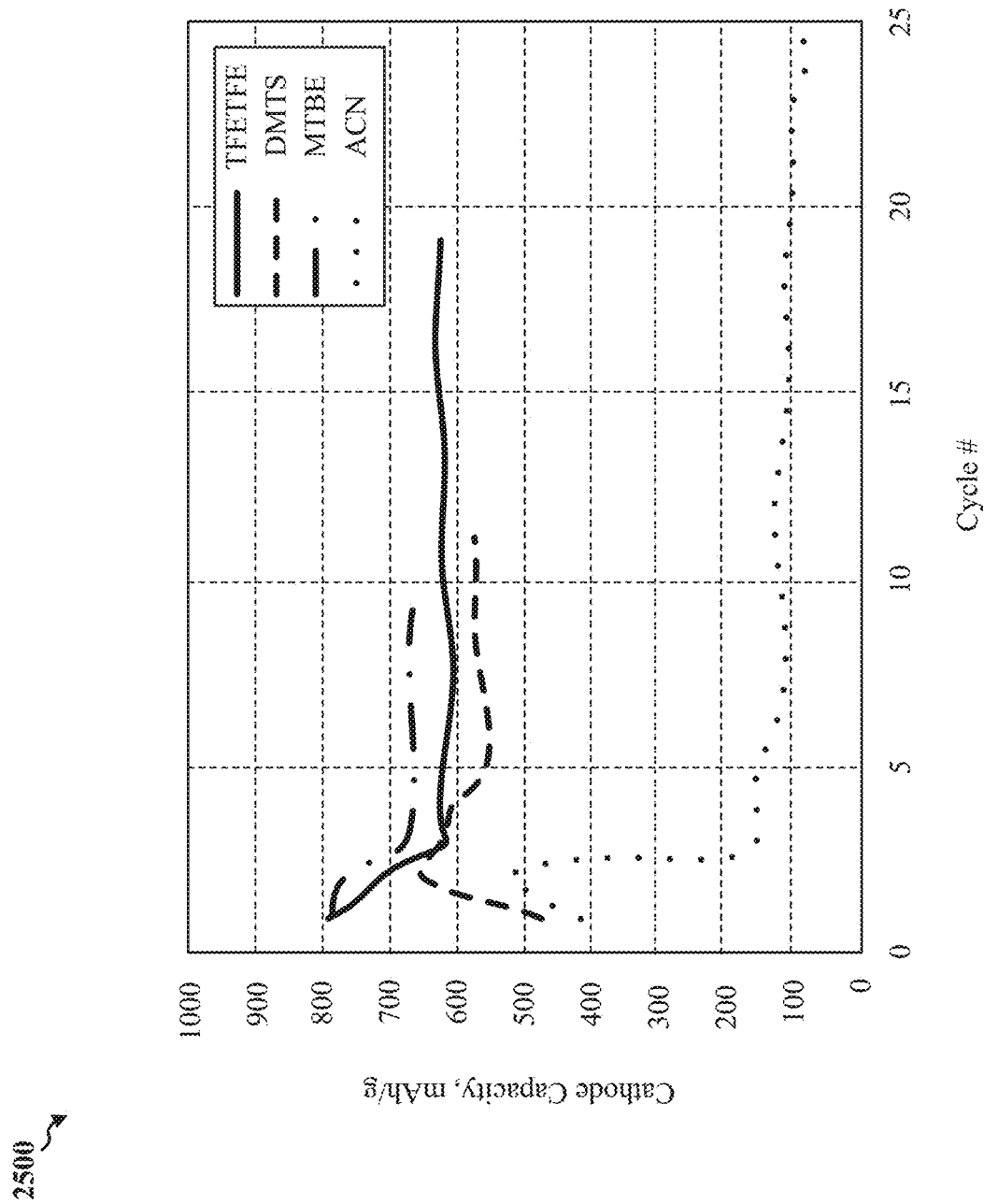

FIGS. 23-25 show graphs depicting specific discharge capacity per cycle number for one or more of the Examples 1-20 presented earlier, according to some implementations. FIG. 23 shows a graph 2300 of specific discharge capacity (mAh/g) per cycle number depicting performance improvements of the battery 100 of FIG. 1A and/or other battery configurations disclosed herein. Regarding the graph 2300, "control" refers to the electrolyte 130 prepared according to Example 1, "Toluene" refers to the electrolyte 130 prepared according to Example 3, and "TMU" refers to the electrolyte 130 prepared according to Example 5. In some aspects, toluene in the electrolyte 130 prepared according to Example 3 may provide favorable unexpected results based on its non-polar nature and correspondingly poor interactions with, for example, the polysulfides 128 of FIG. 1B. That is, toluene has a unique chemical structure that may impede facile transport of the polysulfides 128 through the electrolyte 130 when prepared according to Example 3. Benefits associated with usage of varying concentrations or dilution levels of toluene within, for example, the liquid solvent mixture (also referred to as the ternary solvent package) may increase in significance proportionate to cycling rate. That is, usage of toluene may be even more beneficial in terms of cathode capacity retention than that shown in the graph 2300 when observing a lithium-sulfur battery discharged at a C/3 rate (corresponding to complete battery discharge over a time period of 3 hours) relative to a traditional discharge rate of 1C (corresponding to complete battery discharge over a time period of 1 hour). In this way, toluene may be particularly well suited for end-use applications that may involve longer battery life or discharge times, such as electric vehicles (EVs).

Toluene may be uniquely suited to out-perform other solvents based on its chemical structure and non-polar nature, having an approximate ionic conductivity value (mS/cm) of 5.128026. In this way, toluene in the electrolyte 130, such as when prepared according to Example 3, may contribute to higher specific capacity and improved capacity retention during battery cycling by impeding movement of the polysulfides 128 within the electrolyte 130, thereby freeing up volume in the electrolyte 130 available to transport the lithium cations ($Li^+$) 125. In addition, or the alternative, toluene may act as a favorable solvent for the elemental sulfur 126, when pre-loaded (such as by capillary infusion or some other suitable technique) into the cathode 110 or the cathode 2200. In one implementation, toluene may assist in the de-passivation of the cathode 110 or the cathode 2200 to pre-condition the battery 100 to prevent dropping beneath the minimum designed voltage (of the battery 100) once the external load 172 is applied.

By impeding movement of the polysulfides 128 in the electrolyte 130, toluene may improve sulfur retention within the cathode 110 and overall sulfur related kinetics, that is sulfur utilization in forming coordination complexes with the lithium cations ($Li^+$) 125. Toluene also may improve interfacial regions between the anode 120 and the electrolyte 130 by preventing movement of the polysulfides 128 from contacting the anode 120. In addition, toluene may increase the boiling point and/or decrease the volatility of the electrolyte 130, which may improve safety and reliability of the electrolyte 130. Further, toluene may lower the freezing point of the electrolyte 130, which may assist in low temperature performance of the battery 100. Toluene may also lower the density of the electrolyte 130 as well, which may improve specific energy, since the mass of the electrolyte 130 may impact the performance and/or efficiency of the battery 100.

In some implementations, the ability of toluene to improve the performance of the electrolyte 130 may depend at least in part on the ability of toluene to solubilize certain forms of elemental sulfur, such as cyclooctasulfur ($S_8$). In some aspects, toluene may have a normalized first cycle discharge capacity (Ah/g) of approximately between 0.6 (Ah/g) to 0.8 (Ah/g) at a $S_8$ solubility level of approximately 0.0275 (mol/L). These values present a marked improvement when compared to, for example, ACN, which has a normalized first cycle discharge capacity (Ah/g) of approximately between 0.37 (Ah/g) to 0.41 (Ah/g) at a $S_8$ solubility level of approximately 0.0075 (mol/L), indicating that toluene tends to solvate $S_8$ better and provides correspondingly improve discharge capacity.

FIG. 24 shows a graph 2400 of specific discharge capacity (mAh/g) per cycle number depicting performance improvements of the battery 100 of FIG. 1A and/or other battery configurations disclosed herein. Regarding the graph 2400, "MPB" refers to the electrolyte 130 prepared according to Example 7, "TrigDME" refers to the electrolyte 130 prepared according to Example 9, and "TEE" refers to the electrolyte 130 prepared according to Example 8.

FIG. 25 shows a graph 2500 of specific discharge capacity (mAh/g) per cycle number depicting performance improvements of the battery 100 of FIG. 1A and/or other battery configurations. Regarding the graph 2500, "TFETFE" refers to the electrolyte 130 prepared according to Example 13, "DMTS" refers to the electrolyte 130 prepared according to Example 11, "MTBE" refers to the electrolyte 130 prepared according to Example 10, and "ACN" refers to the electrolyte 130 prepared according to Example 12.

In some aspects, a cathode (such as the cathode 2200 of FIG. 22) may be positioned opposite to an anode (such as the anode 120 of FIG. 1) and have an overall porosity between 40% and 70%. In one example, the cathode 2200 may include non-hollow carbon spherical (NHCS) particles joined together. Each NHCS particle may be one example of the first tri-zone particles 2212 of FIG. 22, the second tri-zone particles 2222 of FIG. 22, the carbonaceous particle 800 of FIG. 8A, and/or the like. At least some NHCS particles may coalesce together and thereby collectively form tubular NHCS particle agglomerates, which may be one example of the aggregate 960 of FIG. 9B. Each NCHS particle may have a diameter between 30 nanometers (nm) and 60 nm, and may include a first region and a second region. In one implementation, the first region may be defined by the first pores 801 of FIG. 8A, and the second region may be defined by the second pores 802 of FIG. 8A. In this way, the first region may be adjacent to a center of a respective NHCS particle and may have a first density of carbonaceous materials, and the second region may be adjacent to a surface a respective NHCS particle. The second region may encapsulate the first region and have a second density of carbonaceous materials that is lower than the first density of carbonaceous materials. The first region and the second region may be in fluid communication with each other.

In addition, the cathode 2200 may include interconnected channels (not shown in FIG. 22 for simplicity) defined in shape by adjacent NHCS particles. Some interconnected channels may be pre-loaded with an elemental sulfur and retain polysulfides (PS) based on one or more of the first density of carbonaceous materials or the second density of carbonaceous materials. An electrolyte, which may be prepared by any of the formulations presented in Examples 1-20, may be interspersed throughout the cathode and in contact with the anode. A separator may be positioned between the anode and the cathode.

Figure 26A:
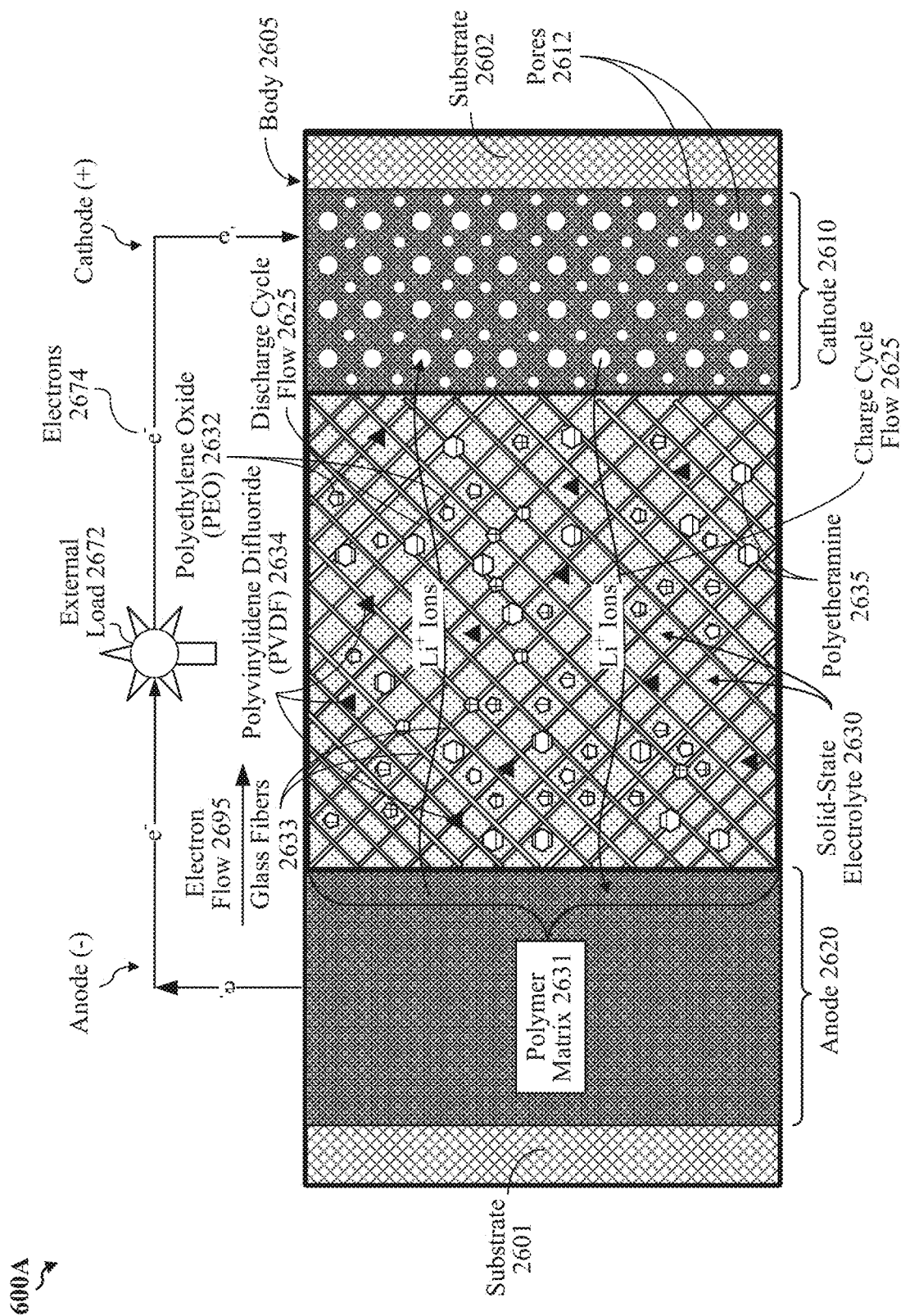
FIG. 26A shows a diagram depicting an example battery, according to some implementations.

FIG. 26A shows an example battery 2600A, according to some other implementations. The battery 2600A may be an example of other battery configurations disclosed herein. In one implementation, the battery 2600A may be implemented as a lithium-sulfur battery, and may include an anode 2620 (e.g., an anode active material comprising a foil of lithium), a cathode 2610, and a solid-state electrolyte 2630. In some instances, the solid-state electrolyte 2630 may replace one or more electrolyte solution compositions presented in Examples 1-20. The cathode 2610 may be one example of other cathode configurations disclosed herein, such as the cathode 110 of FIG. 1, the cathode 210 of FIG. 2, and/or the cathode 2200 of FIG. 22. In some aspects, the cathode may be loaded with elemental sulfur of 3 milligrams (mg) per cubic centimeter ($cm^3$). In other aspects, the cathode 2610 may be loaded with other concentrations of elemental sulfur of 3 milligrams (mg) per cubic centimeter ($cm^3$) suitable for maximizing the efficiency of discharge-charge cycling of the battery 2600A. In some aspects, the cathode 2610 may be porous and formed from a composition of matter (not shown in FIG. 26A for simplicity) including a plurality of pores 2612. The composition of matter may be one example of various carbonaceous materials and/or structures disclosed herein, such as the first tri-zone particles 2212 of FIG. 22, the second tri-zone particles 2222 of FIG. 22, the carbonaceous particle 800 of FIG. 8A, one or more instances of the aggregate 960 of FIG. 9B and/or the like.

The solid-state electrolyte 2630 may be dispersed throughout at least the pores 2612 of the cathode 2610, and may also be in contact with the anode 2620. In some aspects, the solid-state electrolyte 2630 may be formed as a membrane and thereby provide ionic conduction capabilities associated with a separator, such as the separator 150 of FIG. 1. In one implementation, the solid-state electrolyte 2630 may be formed from and/or include a polymer matrix 2631, which may be formed of glass fibers 2633 interconnected with each other. In some aspects, the polymer matrix 2631 may have an ionic conductivity (e.g., conducting lithium cations ($Li^+$)) and may include between 8 weight percent (wt. %) and 12 wt. % of polyethylene oxide (PEO) 2632, between 13 wt. % and 17 wt. % of polyvinylidene difluoride (PVDF) 2634, between 3 wt. % and 7 wt. % of polyetheramine 2535 having repeated oxypropylene units (not shown in FIG. 26A for simplicity) in its backbone, and between 5 wt. % and 10 wt. % of one or more lithium-containing salts including one or more of lithium bis(trifluoromethanesulfonyl)imide (LiTFSI) or lithium iodide (LiI) (not shown in FIG. 26A for simplicity). In some implementations, at least some of the lithium-containing salts may dissociate into lithium cations ($Li^+$) and thereby assist in lithium ionic transport between the anode 2620 and the cathode 2610 during operational discharge-charge cycling of the battery 2600A.

Similar to the various other lithium-sulfur battery configurations disclosed herein, the battery 2600A may generate undesirable lithium-containing polysulfide species (not shown in FIG. 26A for simplicity) during operational discharge-charge cycling of the battery 2600A. In some instances, the cathode 2610 may at least partially trap and/or retain the lithium-containing polysulfide species, thereby preventing blockage of lithium transport pathways (e.g., as shown as a charge cycle flow 2625) within the solid-state electrolyte 2630. In some aspects, the anode 2620 may be formed as a layer of lithium that provides lithium cations ($Li^+$) upon activation of the battery 2600A. In this way, the layer of lithium may provide lithium cations ($Li^+$) during operational discharge-charge cycling of the battery 2600A. In other aspects, the cavity 2622 may receive lithium deposits from the cathode 2610 during operational charge cycling of the battery 2600A. That is, lithium cations ($Li^+$) may travel along the charge cycling flow 2624 from the cathode 2610 to the cavity 2622 as may be associated with the return of the electrons 2674 back towards the battery 2600A as may be encountered in or associated with battery charge and/or recharge cycling. In this way, the cavity 2622 may transform into the anode 2620, which may be capable of again providing lithium cations ($Li^+$) to their respective electrochemically favored positions in the cathode 2610 during operational discharge cycling of the battery 2600A.

In one implementation, the composition of matter used to form the cathode 2610 may be formed from and/or include one or more non-tri-zone particles, tri-zone particles, aggregates, or agglomerates as disclosed herein. In some aspects, the cathode 2610 may be one example of the cathode 2200 of FIG. 22. That is, each tri-zone particle used in the cathode 2610 may include carbon fragments intertwined with each other. At least some carbon fragments may be separated from one another by mesopores. A deformable perimeter may be defined upon coalescence of one or more adjacent non-tri-zone particles or tri-zone particles. Each aggregate may include a multitude of the tri-zone particles joined together and have a principal dimension in a range between 10 nanometers (nm) and 10 micrometers (μm). Mesopores may be interspersed throughout the aggregates. Each mesopore may have a principal dimension between 3.3 nanometers (nm) and 19.3 nm. Each agglomerate may be formed from a multitude of the aggregates joined to each other and have a principal dimension in an approximate range between 0.1 μm and 1,000 μm. Macropores may be interspersed throughout the aggregates, where each macropore having a principal dimension between 0.1 μm and 1,000 μm.

In some implementations, the ionic conductivity of the solid-state electrolyte 2630, when formed and/or deposited as a membrane (not shown in FIG. 26A for simplicity) on the anode 2620, may be based on relative concentration levels of one or more lithium-containing salts doped into the polymer matrix 2631. In this way, the ionic conductivity of the solid-state electrolyte 2630 may be between $0.97 \times 10^{-3}$ siemens per meter (S/m) and $1.03 \times 10^{-3}$ S/m at a temperature between 18 degrees Celsius (° C.) and 22° C. In other implementations, the membrane may be coated onto the anode 2620, such that the ionic conductivity of the membrane is between $3.97 \times 10^{-6}$ siemens per meter (S/m) and $4.03 \times 10^{-6}$ S/m at a temperature between 18 degrees Celsius (° C.) and 22° C. In some aspects, higher quantities of one or more lithium-containing salts may be associated with an increase in the ionic conductivity of the polymer matrix 2631.

In one implementation, the solid-state electrolyte 2630, when formed as a membrane, has a thickness between 10 micrometers (μm) and 50 μm, and may have a uniform density throughout its thickness. For example, in some instances, the solid-state electrolyte 2630 may have a density between 2 grams per cubic centimeter (g/cm$^3$) and 3 g/cm$^3$. In some aspects, the membrane may be coated onto a sacrificial polymer (not shown in FIG. 26A for simplicity), which may be disposed on the anode 2620 facing the solid-state electrolyte 2630. In this way, the solid-state electrolyte 2630 may prevent electrons from traveling from the anode 2620 to the cathode 2610 through the solid-state electrolyte 2630. In addition, contact points between the solid-state electrolyte 2630 and the anode 2620 may prevent impedance growth of the battery 2600A.

In one implementation, the cathode 2610 has a thickness between 50 micrometers (μm) and 150 μm, and a density between 5 grams per cubic centimeter (g/cm$^3$) and 15 g/cm$^3$. In some aspects, the solid-state electrolyte 2360 may be prepared without a liquid-phase electrolyte, such as Examples 1-20 disclosed herein. In addition, or the alternative, the solid-state electrolyte 2630 may localize lithium-containing polysulfide species within the cathode 2610 and/or prevent growth of lithium-containing dendritic structures from the anode 2620. In some aspects, the anode 2620 may volumetrically expand between 5% and 20% of its initial size during operational discharge-charge cycling of the battery 2600A. In some instances, the solid-state electrolyte 2630 may provide interfacial stability between the anode 2620 and the solid-state electrolyte 2630 during operational discharge-charge cycling of the battery 2600A, for example, to reduce or limit volumetric expansion of the anode 2620.

Figure 26B:
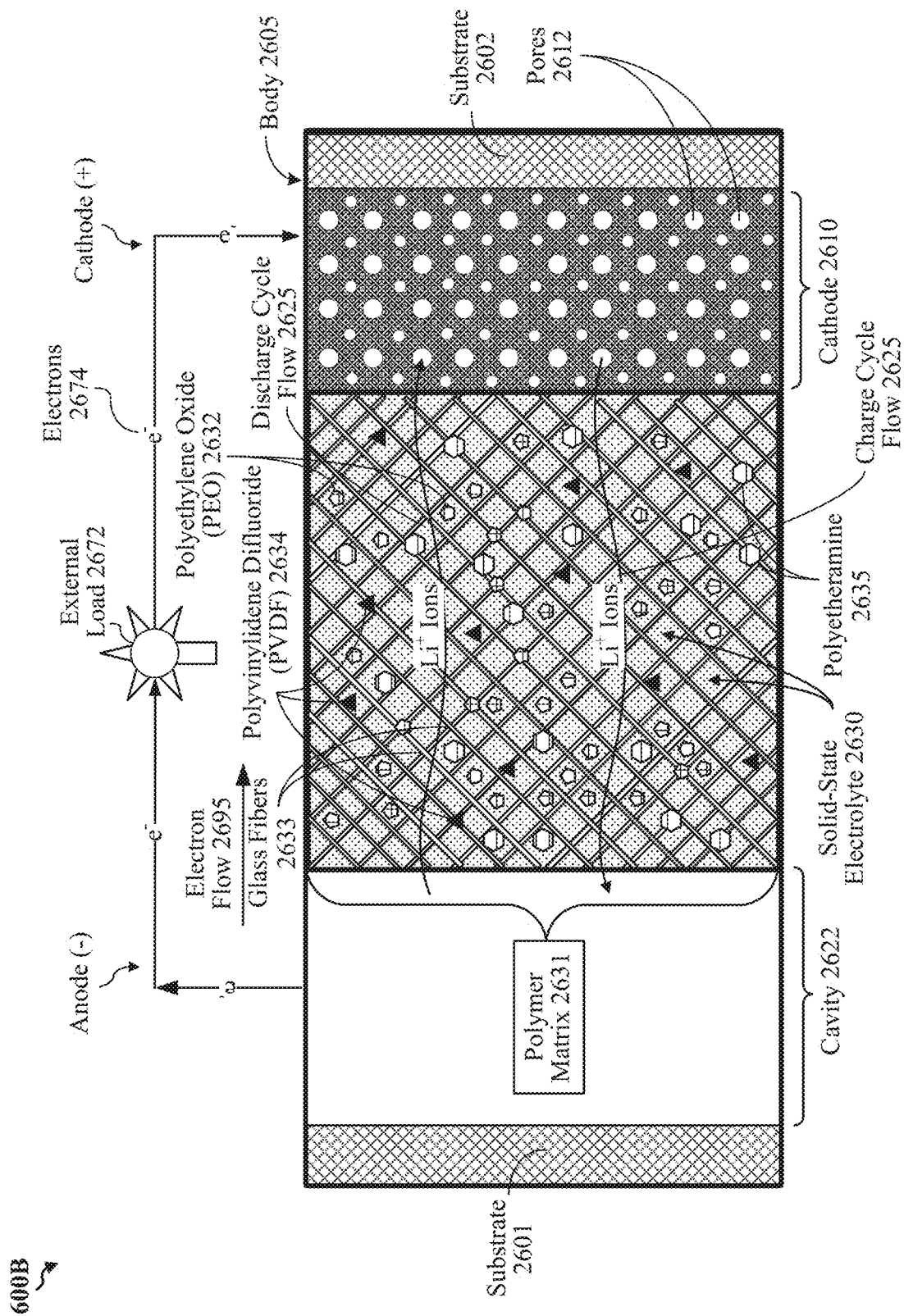
FIG. 26B shows a diagram depicting an example battery, according to some implementations.

FIG. 26B shows another example battery 2600B, according to some other implementations. In one implementation, the battery 2600B may be another example of the battery 2600A. In some aspects, the cavity 2622 may replace the anode 2620, and may be incrementally filled with lithium provided from the cathode 2610 during operational discharge-charge cycling of the battery 2600B. In this way, once the cavity 2622 of FIG. 26B is filled with lithium to become the anode 2620 of FIG. 26A, the battery 2600B may function in a manner similar or identical to the battery 2600A.

Figure 27:
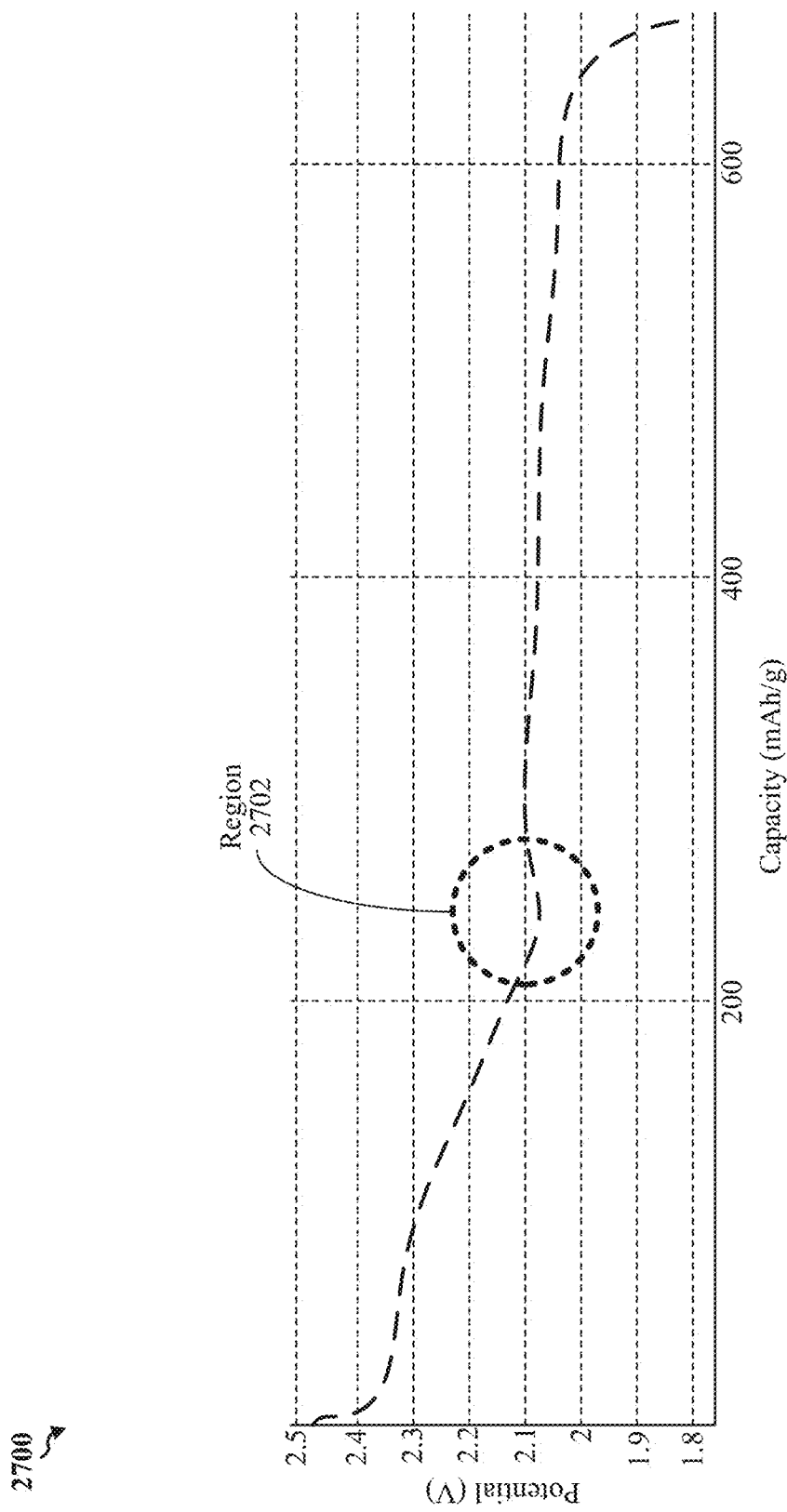
FIG. 27 shows a graph depicting voltage drop per specific capacity, according to some implementations.

FIG. 27 shows a graph 2700 depicting voltage drop per specific capacity for an example configuration of the battery 2600A of FIG. 26A, according to some implementations. Regarding the graph 2700, the battery 2600A was prepared with a sulfur loading level of 3 milligrams (mg) per cubic centimeter (cm$^3$) and in a coil cell format. In addition, the battery 2600A was prepared with the solid-state electrolyte 2630 at a thickness level of 18 micrometers (μm). Region 2702 may be representative of unique voltage drop behavior associated with formation and/or dissociation of lithium-containing polysulfide intermediates generated during discharge-charge operational cycling of the battery 2600A.

Figure 28:
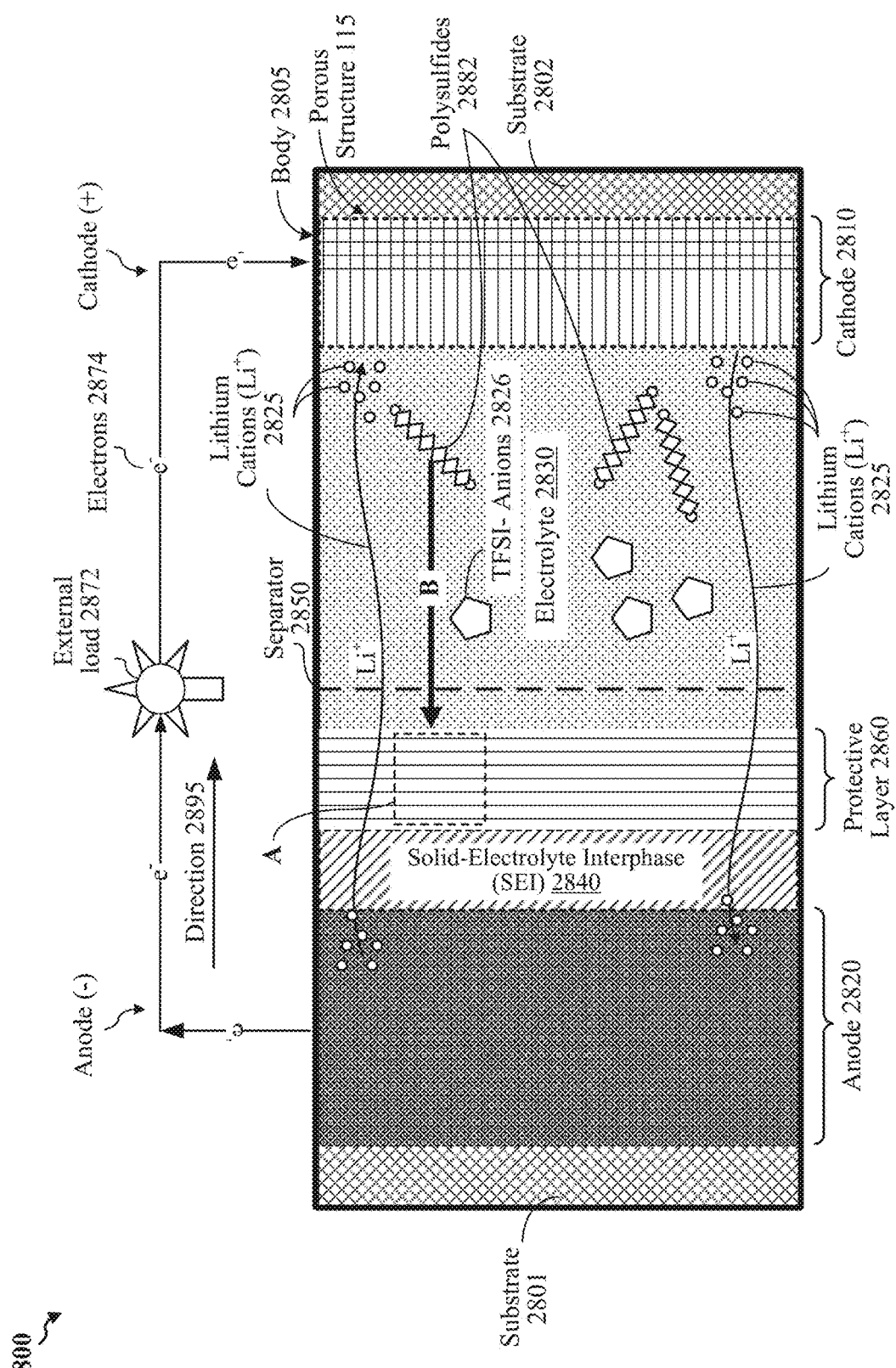
FIG. 28 shows a diagram depicting an example battery, according to some implementations.

FIG. 28 shows another example battery 2800, according to some other implementations. The battery 2800 may be an example of other battery configurations disclosed herein. In one implementation, the battery 2800 may be implemented as a lithium-sulfur battery, and may include a cathode 2810, an anode structure 2822 including an anode 2820 (e.g., an anode active material comprising a foil of lithium) positioned opposite to the cathode, a separator 2850 positioned between the anode 2820 and the cathode 2810, and an electrolyte 2830. In some aspects, the electrolyte 2830 may be formulated by mixing at least two or more solvents, such as those disclosed in Examples 1-20 presented earlier. The electrolyte 2830 may be dispersed throughout the cathode 2810 and in contact with the anode 2820. In some aspects, the anode 2820 may be a single foil of solid metallic lithium. In this way, at least some lithium cations (Li$^+$) 2825 output by the anode 2820 may participate in dissociation reactions and/or combination reactions during operational discharge-charge cycling of the battery 2800. That is, lithium cations (Li$^+$) 2825 output from the anode 2820 may be transported through the electrolyte 2830 and retained in their electrochemically favored positions (not shown in FIG. 28 for simplicity) within the cathode 2810 during discharge cycles of the battery 2800. Then, during charge cycles of the battery 2800, the lithium cations (Li$^+$) 2825 may be forced to return to the anode 2820 upon exposure to an outside current source.

In addition, a solid-electrolyte interphase 2840 may form on the anode 2820. In this way, a protective layer 2860 may form at least partially within and/or on the solid-electrolyte interphase 2840 and face the cathode 2810. In some aspects, the solid-electrolyte interphase 2840 may form one or more compounds on the anode 2820 based on one or more oxidation-reduction reactions involving lithium cations (Li$^+$) and one or more solvents of the electrolyte 2830. In some implementations, the protective layer 2860 may be at least partially formed from carbonaceous materials including one or more of flat graphene, wrinkled graphene, carbon nano-tubes (CNTs), carbon nano-onions (CNOs), or non-hollow carbon spherical particles (NHCS), one or more of which may be one example of the carbonaceous structure 956 of FIG. 9B.

Figure 29:
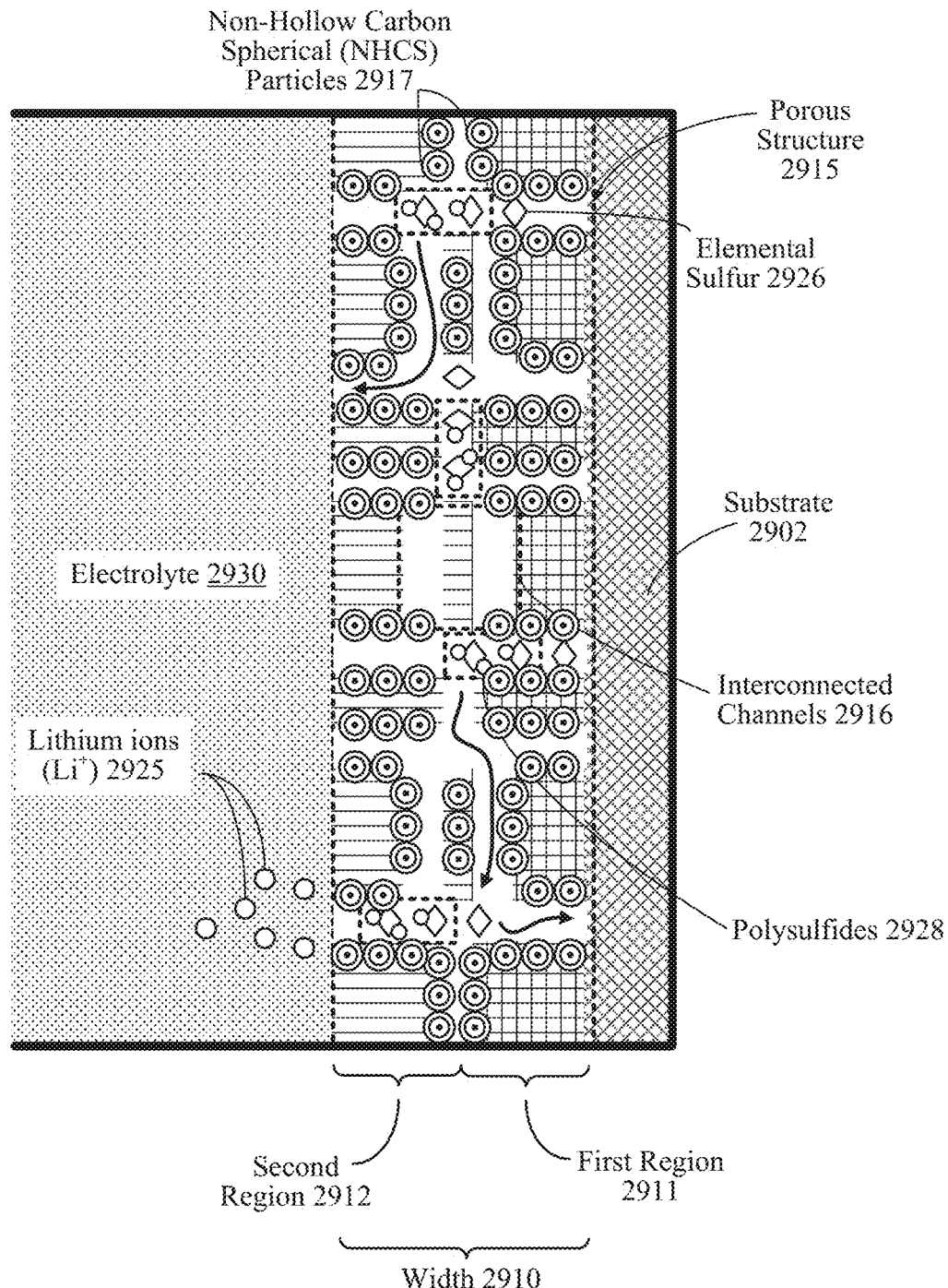
FIG. 29 shows a diagram depicting an example cathode of the battery of FIG. 28, according to some implementations.

FIG. 29 shows a diagram depicting an example cathode 2900, according to some implementations. The cathode 2900 may be one example of other cathode configurations disclosed herein, such as the cathode 2200 of FIG. 22 and/or the cathode 2810 of FIG. 28. In some implementations, the cathode 2900 may include a porous structure 2915 with interconnected channels 2916 defined by adjacent and interconnected non-hollow carbon spherical particles (NHCS) particles 2917, each of which may be one example of the tri-zone particle 850 of FIG. 8B, the aggregate 960 of FIG. 9B, and/or other carbonaceous materials described in the present disclosure. In this way, at least some of the interconnected channels 2916 may be loaded with elemental sulfur 2926 in the cathode 2900 prior to activation and discharge-charge cycling of, for example, the battery 2800 of FIG. 28. The elemental sulfur 2926 may form coordination complexes with at least some of the lithium cations (Li$^+$) 2825 to increase specific capacity of the cathode 2900, for example, compared to conventional lithium ion chemistries. In some aspects, the cathode 2900 may have a width 2910 formed of a first region 2911 disposed on a substrate 2902 (e.g., a copper or other metal current collector), and may have multiple additional regions, such as a second region 2912 positioned adjacent to the first region 2911. Each of the regions including the first region 2911, the second region 2912, and/or additional subsequent regions positioned adjacent to the second region 2912 (not shown for simplicity in FIG. 29) may be defined in shape, size, and orientation by a respective concentration level of NHCS particles 2917. That is, in some aspects, the first region 2911 may be prepared with a relatively higher concentration of NHCS particles 2917, thereby resulting in increased electrical conduction between adjacent graphene sheets within each NHCS particle, as may be desirable near or at the substrate 2902. In contrast, the second region 2912 may be prepared with a relatively lower concentration of NHCS particles 2917, thereby permitting for additional transport of lithium ions (Li$^+$) 2925 into the width 2910 of the cathode 2900 for complexation with elemental sulfur 2926 contained within the interconnected channels 2916.

Figure 30:
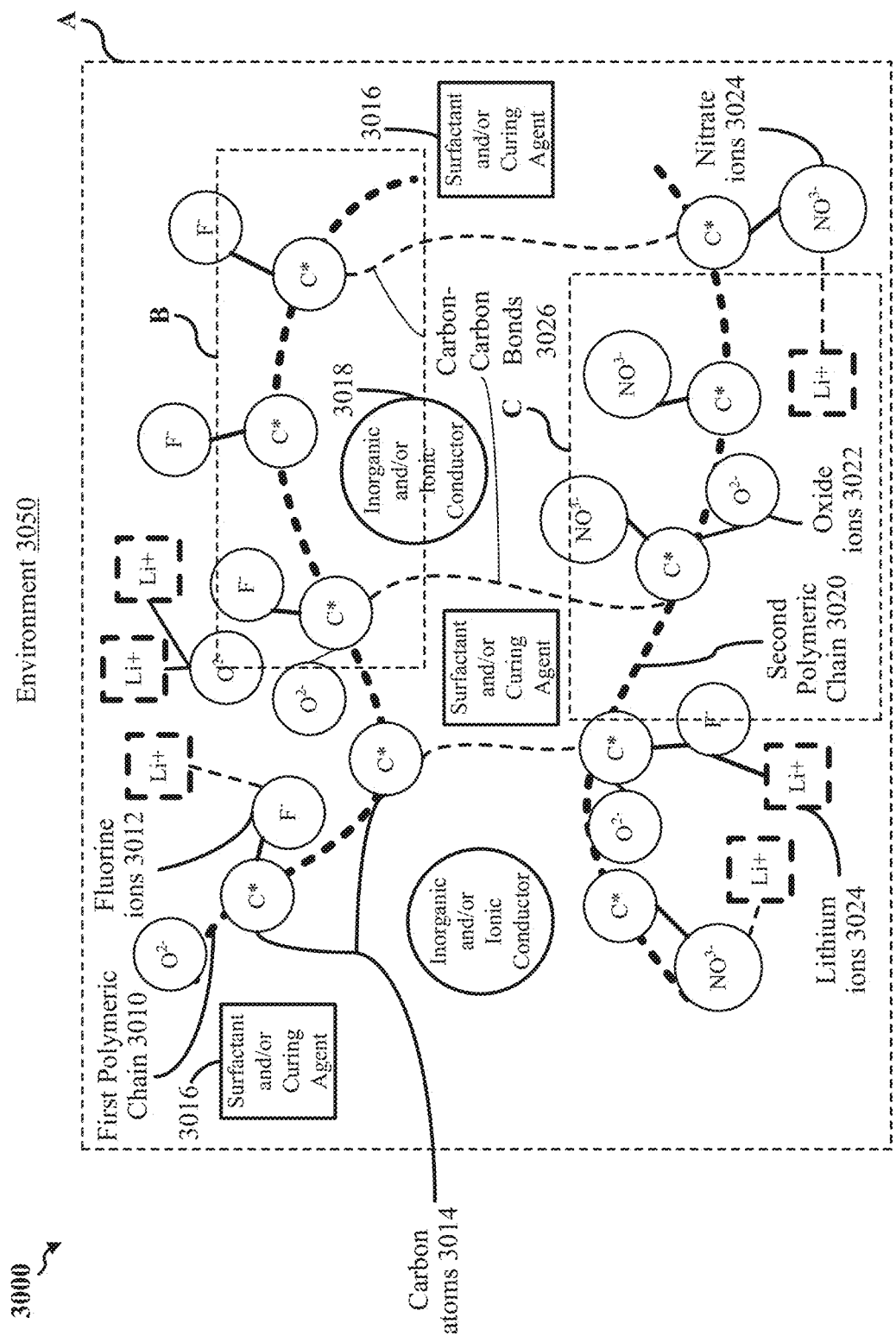
FIG. 30 shows a diagram depicting the protective layer of the battery of FIG. 28, according to some implementations.

FIG. 30 shows a diagram 3000 depicting region "A" of the protective layer 2860 of the battery of FIG. 28, according to some implementations. In some aspects, region "A" may be one example of various anode protective layers disclosed herein, including the protective layer 2860. In one implementation, region "A" may be at least partially formed from polymeric materials, such as a first polymeric chain 3010 with carbon atoms 3014 provided by at least some of the carbonaceous materials. Oxide anions ($O^{2-}$) 3022, fluorine anions ($F^-$) 3012, and nitrate anions ($NO^{3-}$) 3024 may be uniformly dispersed throughout region "A" and grafted onto one or more of the carbon atoms 3014. Region "A" may also include a second polymeric chain 3020 including at least some of the carbon atoms 3014, which may be also provided by carbonaceous materials. Similar to the first polymeric chain 3010, the carbon atoms 3014 of the second polymeric chain 3020 may also be grafted to one or more of oxide anions ($O^{2-}$) 3022, fluorine anions ($F^-$) 3012, and nitrate anions ($NO^{3-}$) 3024, one or more of which may be uniformly dispersed throughout the protective layer 2860. In some aspects, the second polymeric chain 3020 may be positioned opposite to the first polymeric chain 3010. In addition, in one implementation, the first polymeric chain 3010 and the second polymeric chain 3020 may be configured to cross-link with each other based on exposure to one or more nitrogen-containing groups, such as the nitrate anions ($NO^{3-}$) 3024.

In some aspects, inorganic and/or ionic conductor 3018, such as lithium-containing salts including lithium bis(trifluoromethanesulfonyl)imide (LiTFSI), may be uniformly dispersed throughout the electrolyte 2830 and/or the protective layer 2860, and thereafter dissociate into lithium cations ($Li^+$) 2825 and TFSI$^-$ anions 2826. In addition, the first polymeric chain 3010 and the second polymeric chain 3020 may at least partially cross-link with each other and form carbon-carbon bonds 3026 upon exposure to an environment 3050. In some instances, the environment 3050 may include a polymerization initiator and/or ultraviolet (UV) radiation.

Specifically, exposure of the first and second polymeric chains 3010 and 3020 to the polymerization initiator and/or the UV radiation may cause region "A" to be formed as a three-dimensional (3D) lattice having a cross-linking density defined by a number of cross-link points per-unit volume. In some aspects, the cross-link points may be configured to at least partially trap the TFSI$^-$ anions 2826 produced upon dissociation of LiTFSI. For example, the number of cross-link points per-unit volume may restrict re-dissolution of lithium-containing additives in region "A" toward the electrolyte 2830. In some aspects, the cross-linking density of the protective layer 2860 may inhibit swelling above 10% of an initial volume of the protective layer 2860 by, for example, preventing absorption of at least one of the solvents in the electrolyte 2830. In some other aspects, the cross-linking density of the protective layer 2860 may control swelling between 10%-50% of an original volume of the protective layer 2860 by controlling absorption of at least one solvent. In this way, the cross-linking density of the protective layer 2860 may improve and/or may be associated with an improvement of lithium ion ($Li^+$) transport throughout the anode structure 2822 and the electrolyte 2830.

In one implementation, the protective layer 2860 may have a modulus of elasticity between 3 gigapascals (GPa) and 100 GPa, a glass transition temperature above 60° Celsius (C) and may cure at a temperature of less than 81° Celsius (C). Upon activation of the battery 2800, lithium fluoride (LiF) may form based on one or more chemical reactions (e.g., the Wurtz reaction of FIG. 7). For example, lithium fluoride (LiF) may be configured to form based on a combination of fluorine anions (F−) and lithium cations ($Li^+$). In some aspects, the combination of fluorine anions (F−) and lithium cations ($Li^+$) may generate lithium oxide ($Li_2O$), lithium nitrate ($LiNO_3$) and/or nitrogen-oxygen containing compounds. In one implementation, lithium fluoride (LiF) may be formed based on a combination of lithium cations ($Li^+$) 2825 output from the anode 2820 and fluorine anions (F−) 3012 (of FIG. 30) grafted onto the first polymeric chain 3010 and/or the second polymeric chain 3020. In some aspects, the combination of lithium cations ($Li^+$) 2825 and fluorine anions ($F^-$) 3012 may consume at least some of the lithium cations ($Li^+$) 2825 output from the anode 2820, thereby reducing lithium-containing dendritic growth (not shown in FIG. 28 for simplicity) from the anode 2820. Reducing lithium-containing dendritic growth from the anode may, in turn, increase the charge rate, the discharge rate, the energy density, the cycle life of the battery 2800, or any combination thereof. In addition, lithium fluoride (LiF), lithium oxide ($Li_2O$), lithium nitrate ($LiNO_3$) or nitrogen-oxygen containing additives may form one or more regions across one or more of the anode 2820 or the solid-electrolyte interphase 2840.

In some aspects, the inorganic and/or ionic conductor 3018 of the protective layer 2860 may include additives, such as lithium salts including lithium nitrate ($LiNO_3$) and/or inorganic ionically conductive ceramics including one or more of lithium lanthanum zirconium oxide (LLZO), NASICON-type oxide $Li_{1+x}Al_xTi_{2-x}(PO_4)_3$ (LATP) and/or lithium tin phosphorus sulfide (LSPS), and/or nitrogen-oxygen containing additives. At least some of these additives dispersed throughout region "A" and/or the protective layer 2860 may dissociate to produce the lithium cations ($Li^+$) 2825. In this way, the presence of at least some additives within the protective layer 2860 may increase the charge rate, the discharge rate, and/or the energy density of the lithium-sulfur battery 2800.

In one implementation, the first polymeric chain 3010 may be formed from a first plurality of interconnected monomer units, "B", (e.g., of FIGS. 36 and 37), and the second polymeric chain 3020 may be formed from a second plurality of interconnected monomer units, "C". In some aspects, the first plurality of interconnected monomer units, "B", and the second plurality of interconnected monomer units, "C", may be identical. In other aspects, the first plurality of interconnected monomer units, "B", and the second plurality of interconnected monomer units, "C", may be distinct from each other.

In some aspects, the first polymeric chain 3010 and the second polymeric chain 3020 may cross-link with each other based on exposure to nitrogen-containing groups (e.g., nitrate ions $NO_3^-$), some of which may cure in an epoxy and/or include an amine-containing group. In addition, or the alternative, the first polymeric chain 3010 and/or the second polymeric chain 3020 may be prepared to include liquid bisphenol A epichlorohydrin-based epoxy resin, polyoxyethylene bis(glycidyl ether) having an average $M_n$ of 500 (PEG-DEG-500), and polyoxypropylenediamine. For example, in one implementation, the protective layer 2860 may be prepared to include between 2 wt. %-5 wt. %, of difunctional bisphenol A/epichlorohydrin derived liquid epoxy resin, between 15 wt. %-25 wt. % of polyoxyethylene bis(glycidyl ether) (PEG-DEG-500) having an average $M_n$ of 500, between 20 wt. %-25 wt. % of diaminopolypropylene glycol, between 5 wt. %-15 wt. % of poly(propylene glycol) bis(2-aminopropyl ether), between 5 wt. %-15 wt. % of lithium bis(trifluoromethanesulfonyl)imide (LiTFSI), and between 40 wt. %-60 wt. % of lithium lanthanum zirconium oxide (LLZO). In some other aspects, the protective layer 2860 may be prepared to include between 2 wt. %-5 wt. % of difunctional bisphenol A/epichlorohydrin derived liquid epoxy resin, between 15 wt. %-25 wt. % of polyoxyethylene bis(glycidyl ether) having an average $M_n$ of 500, between 5 wt. %-15 wt. % of 3,4-epoxy cyclohexyl methyl-3,4-epoxy cyclohexane carboxylate (ECC), between 15 wt. %-20 wt. % of lithium bis(trifluoromethanesulfonyl)imide (LiTFSI), between 40 wt. %-60 wt. % of lithium lanthanum zirconium oxide (LLZO), and between 1 wt. %-5 wt. % of diphenyliodonium hexafluorophosphate (DPIHFP). In addition, the protective layer 2860 may be coated and/or deposited onto the anode 2820 by a roll-to-roll apparatus. For example, the protective layer is one or more of spray coated, gravure coated, micro gravure coated, slot-die coated, doctor-blade coated, and/or Mayer's rod spiral-coated onto the anode.

In some implementations, the battery 2800 may be arranged in one or more additional configurations. For example, the first polymeric chain 3010 and the second polymeric chain 3020 may participate in one or more cross-linking polymerization reactions with each other and form the protective layer 2860 based on exposure to one or more ultraviolet (UV) curing accelerators, including one or more cationic photo initiators. As discussed, the UV curing accelerators may be provided by the environment 3050, which may include an ultraviolet (UV) radiation source.

In some aspects, one or more cross-linking polymerization reactions may include ring-opening polymerization (ROP). In addition, the one or more ultraviolet (UV) curing accelerators includes a plurality of onium salts, which may include one or more triphenylsulfonium salts, one or more diazonium salts, one or more diaryliodonium salts, one or more ferrocenium salts, and/or one or more metallocene compounds. In some aspects, the one or more ultraviolet (UV) curing accelerators may include one or more antimony salts and/or polyols, which may serve as reactive diluents.

In some aspects, the protective layer 2860 may be formed from multiple polymers uniformly mixed together and/or cross-linked (e.g., via cationic polymerization and/or ultraviolet (UV) curing)) to form a three-dimensional (3D) lattice. The protective layer 2860 may be formulated according to one or more recipes disclosed in formulation recipe Examples 21-22 below:

Example 21: For Amine-Curable Epoxy-Based Membrane Compositions

| Components | Weight Percent (wt. %) of Total |
| --- | --- |
| Polyoxyethylene bis(glycidyl ether) (PEG-DEG-500) having an average $M_n$ of 500 | 19.64 |
| Undiluted clear difunctional bisphenol A/epichlorohydrin derived liquid epoxy resin (e.g., EPON ™ Resin 828) | 3.62 |
| Polyoxypropylenediamine (e.g., JEFF AMINE ® D-230) | 10.04 |
| Lithium bis(trifluoromethanesulfonyl)imide (LiTFSI) | 16.7 |
| Lithium Lanthanum Zirconium Oxide (LLZO) - 500 nm particle size | 50 |

Example 22: For Amine-Curable Epoxy-Based Membrane Compositions

| Components | Weight Percent (wt. %) of Total |
| --- | --- |
| Polyoxyethylene bis(glycidyl ether) (PEG-DEG-500) having an average $M_n$ of 500 | 11.7 |
| 4,4'-Methylenebis(N,N-diglycidylaniline) | 11.7 |
| Polyoxypropylenediamine (e.g., JEFF AMINE ® D-230) | 9.94 |
| Lithium bis(trifluoromethanesulfonyl)imide (LiTFSI) | 16.7 |
| Lithium Lanthanum Zirconium Oxide (LLZO) - 500 nm particle size | 50 |

In some aspects, the protective layer 2860 may be prepared following the steps of Example 23, an example procedure for preparing a 30 milliliter (mL) sample-scale dispersion of any one or more of the formulation recipes provided by Examples 21-22 and/or 24-28 disclosed herein:

Example 23: Procedure for Preparing the Protective Layer

| Phase | Steps |
| --- | --- |
| 1. Dispersion Preparation | 1. Weigh components listed in one of the Examples 21-22 or 24-28 outside of a glovebox; pour and/or disperse the listed components into a 4 ounce (oz) glass bottle.<br>2. Transfer the bottle to inside a glovebox, weigh and optionally add LLZO (e.g., in the amount listed by the respective Example) and optionally add DME (e.g., depending on the level of dilution sought) as a non-reactive diluent.<br>3. Wrap bottle lid with paraffin, and sonicate the wrapped for a duration of 60 minutes (min.) outside the glovebox in a fume hood, or inside glovebox if a sonicator is available; vortex the wrapped bottle for 1 min., then sonicate the wrapped for another 60 min.<br>4. Transfer the bottle back to glovebox to prepare for spray coating the anode. |
| 2. Spray coating | 1. Clean a spray nozzle with acetone prior to spraying the liquid dispersion prepared in Phase 1.<br>2. Spray all contents of the bottle (e.g., the entire dispersion) onto 6 centimeter (cm) by 60 cm lithium foil (e.g., the anode) within glovebox using the spray nozzle.<br>3. Spray for a total duration of approximately 30-45 min.<br>4. Dry (e.g., cure) the spray-coated dispersion (e.g., protective layer 2860) onto the lithium anode foil at room temperature (18° C.-22° C.) for more than 24 consecutive hours within the glovebox. |

When prepared according to Example 21, the protective layer 2860 has an on-set curing temperature of 68° C. and a glass-transition temperature ($T_g$) of −16° C. In some aspects, the protective layer 2860 may have one or more openings, also referred to as "pinholes," shown by a pinhole 3102A in FIG. 31A formed in the protective layer 2860 that permit for undesirable pass-through of polysulfides 2882 of towards the anode 2820. The polysulfides 2882 may at least partially coat the anode 2820 and thereby impede free movement and/or transport of the lithium cations (Li$^+$) 2825 between the anode 2820 and the cathode 2810, which in turn may facilitate the discharge-charge cycling operation of the battery 2800. To address the undesirable formation of pinholes in the protective layer 2860 when prepared according to Example 21, the protective layer 2860 may be prepared according to Example 22. In this configuration, the protective layer 2860 has an on-set curing temperature of 81° C., a curing peak temperature of 124° C., a curing enthalpy of 104 J/g, and a $T_g$ of 63° C. Variations of either Example 21 or Example 22 are possible where component loading levels are adjusted +/−3% from that listed. However, any formulation of the protective layer 2860 may be prepared to result in $T_g$ greater than 60° C. and an on-set curing temperature of less than 81° C., or a curing peak of less than 124° C., for the protective layer 2860 to cure at room temperature (e.g., 18° C.-22° C.). In addition, the protective layer 2860 may be disposed onto the anode 2820 according to Example 23 with a thickness between 100 nm to 3 µm.

The protective layer 2860 may be formulated according to either of Example 21 or Example 22 by following the procedure set forth in Example 23 to address commonly encountered operational challenges facing conventional lithium-sulfur batteries. For example, in conventional lithium-sulfur batteries using liquid-phase electrolyte solutions, unwanted and uncontrolled dissolution of polysulfides due to polysulfide shuttle may contribute to battery failure. In one or more particular examples, polysulfide attack on lithium can cause rapid battery capacity reduction due to continuous solid-electrolyte interphase (SEI) growth. This growth consumes lithium cations, thereby resulting in fewer lithium being available for transport through to the cathode for healthy discharge-charge operational cycling in conventional lithium-sulfur batteries. In addition, remaining lithium cations may adhere to other lithium cations due to, for example, gradients in electrochemical potential conducive for lithium-lithium metallic bonding, thereby producing lithium-containing dendritic structures, which grow and extend from the anode towards the cathode and may thereby cause short-circuiting of conventional lithium-sulfur batteries.

To protect lithium contained in the anode 2820 from the effects of poly sulfide migration from the cathode 2810 to the anode 2820, and to suppress lithium-containing dendrite formation, the protective layer 2860 may be directly coated onto the anode 2820 prior to activation and operational discharge-charge cycling of the battery 2800. As such, the protective layer 2860 may be prepared to include the first polymeric chain 3010 and the second polymeric chain 3020. Each of the polymeric chains 3010 and 3020 may have repeating monomer units (e.g., of FIGS. 36 and 37), and may be identical or dissimilar to each other. In addition, in some aspects, when the protective layer 2860 is formulated according to Example 21 or Example 22, at least some of the carbon atoms 3014 on each polymeric chain may form carbon-carbon bonds with each other via ring-opening (ROP) cationic polymerization (e.g., optionally catalyst-based), and may thereby form an amine-curable epoxy-based membrane. In some other aspects, when the protective layer 2860 is formulated according one of Examples 24 to 28 (presented below), at least some of the carbon atoms 3014 on each polymeric chain may form carbon-carbon bonds 3014 with each other via ultraviolet (UV) curable ROP cationic polymerization.

In addition, catalyst-based or UV-curing of di- and/or multi-functional components may initiate and/or facilitate cross-linking of the first polymeric chain 3010 to the second polymeric chain 3020 by the carbon-carbon bonds 3026 for efficient protection of the anode 2820. Functional groups (not shown in FIG. 28 or FIG. 30 for simplicity) may be attached to at least some of the inorganic and/or ionic conductors 3018 for additional tunability of the protective layer 2860. In this way, the protective layer 2860, when formulated by any recipe disclosed by Example 21 through Example 28, may provide several advantages relative to conventional anode protective layers, which typically have only one component.

In some implementations, the protective layer 2860 may be formulated to include multiple polymeric components, such as where the first polymeric chain 3010 and the second polymeric chain 3020 are different from each other to make the protective layer 2860 relatively more flexible for curing on and over the anode 2820 after spray-coating. This flexibility may prevent the protective layer 2860 from disintegrating during the fabrication process. In addition, directly coating the protective layer 2860 onto the anode 2820 may uniformly strip and plate at least some of the lithium cations (Li+) 2825 during operational discharge-charge cycling of the battery 2800, thereby minimizing lithium dendrite formation. In some aspects, inorganic and/or ionic conductors 3018, such as LLZO, dispersed throughout the protective layer 2860 may be ionically conductive and designed to minimize impedance growth of the battery 2800. In addition, UV curing may be used to replace conventional heat-drying processes to accelerate curing of the protective layer 2860 and minimize potential adverse effects of processing time of the protective layer 2860 on the anode 2820.

Figure 31A:
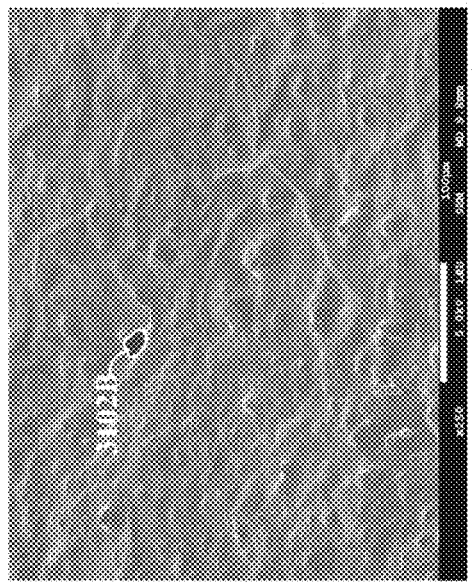
FIG. 31A shows a micrograph of an example baseline protective layer, according to some implementations.

FIG. 31A shows a micrograph of an example baseline protective layer 3100A, according to some implementations. The baseline protective layer 3100A may be one example of the protective layer 2860 of FIG. 28 and prepared according to Example 21 presented earlier, thereby resulting in formation of the pinhole 3102A. In some aspects, the pinhole 3102A may be sized as shown in FIG. 31A. In some other aspects, the pinhole 3102A may be smaller or larger than as shown in FIG. 31A. In addition, the baseline protective layer 3100A may have multiple instances of the pinhole 3102A, which collectively may negatively interfere with healthy operational discharge-charge cycling of the battery 2800. For example, the pinhole 3102A may permit passage of at least some of the polysulfides 2882 through the pinhole 3102 to contact the anode 2820 and/or otherwise interfere with formation of the SEI 2840, thereby reducing cycling efficiency of the battery 2800.

Figure 31B:
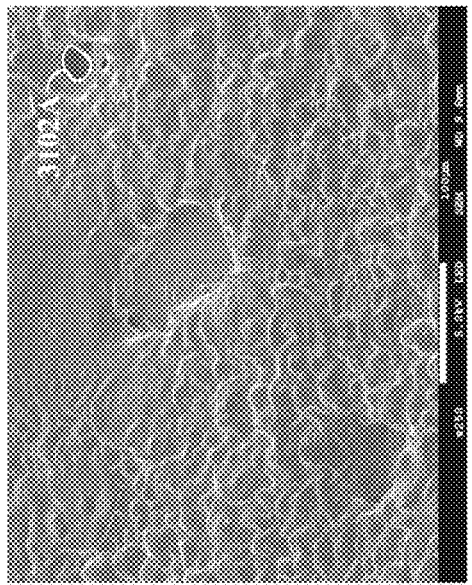
FIG. 31B shows a micrograph of the protective layer of the battery of FIG. 28, according to some implementations.

FIG. 31B shows a micrograph of an example protective layer 3100B, according to some implementations. The protective layer 3100B may be one example of the protective layer 2860 of the battery of FIG. 28 when prepared according to Example 22 by the process disclosed in Example 23. The protective layer 3100B may minimize pinhole formation to have no pinholes or one or more smaller pinholes 3102B, thereby reducing risk of at least some of the polysulfides 2882 contacting the anode 2820 and correspondingly improving operational discharge-charge performance of the battery 2800.

Figure 32:
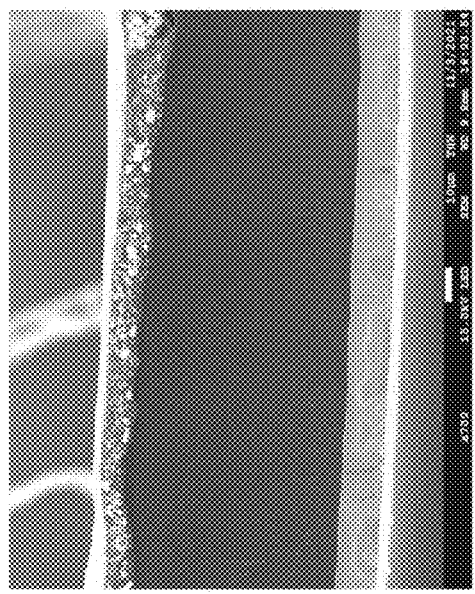
FIG. 32 shows a micrograph of a cutaway of the protective layer of the battery of FIG. 28, according to some implementations.

FIG. 32 shows a micrograph of a cutaway 3200 of the protective layer 2860 of the battery 2800 of FIG. 28, according to some implementations. The protective layer

2860 may be prepared according to Example 21 by the process disclosed in Example 23. In some other aspects, the protective layer 2860 may be prepared according to other recipes disclosed in the Examples, including Example 22.

Figures 33A, 33B:
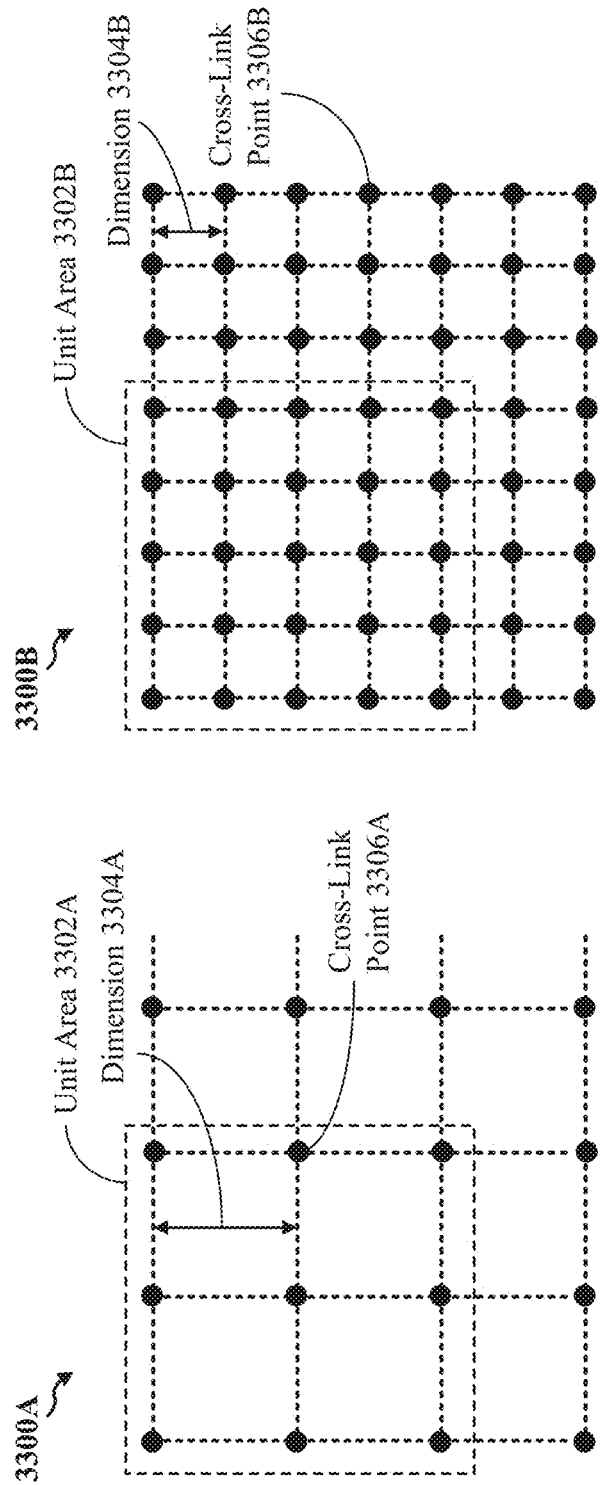
FIG. 33A shows an example cross-linking density of the protective layer of the battery of FIG. 28, according to some implementations.
FIG. 33B shows another example cross-linking density of the protective layer of the battery of FIG. 28, according to some implementations.

FIG. 33A shows an example cross-linking density 3300A of the protective layer 2860 of the battery 2800 of FIG. 28, according to some implementations. The cross-linking density 3300A may be one example of a cross-linking density of the protective layer 2860 when prepared according to Example 21 by the process disclosed in Example 23, and thereby have a certain number (e.g., 9) of cross-link points 3306A per unit area 3302A. In this way, each cross-link point 3306A may be separated from adjacent cross-link points 3306A by a dimension 3304A.

FIG. 33B shows another example cross-linking density 3300B of the protective layer 2860 of the battery 2800 of FIG. 28, according to some implementations. The cross-linking density 3300B may be one example of a cross-linking density of the protective layer 2860 when prepared according to Example 22 by the process disclosed in Example 23, and thereby have a certain number (e.g., 25) of cross-link points 3306B per unit area 3302B. In this way, each cross-link point 3306B may be separated from adjacent cross-link points 3306B by a dimension 3304B, which may be smaller than the dimension 3304A and thereby configured to trap at least some of the TFSI$^-$ anions 2826 subsequent to dissociation of LiTFSI in the electrolyte 2830 and/or included in the protective layer 2860. By trapping at least some of the TFSI$^-$ anions 2826 within the cross-linking density 3300B, the protective layer 2860 may function to prevent the trapped TFSI$^-$ anions 2826 from blocking passage of the lithium ions (L$^+$) 2825 and/or contacting the anode 2820, thereby improving operational discharge-charge cycling performance of the battery 2800.

Figure 34:
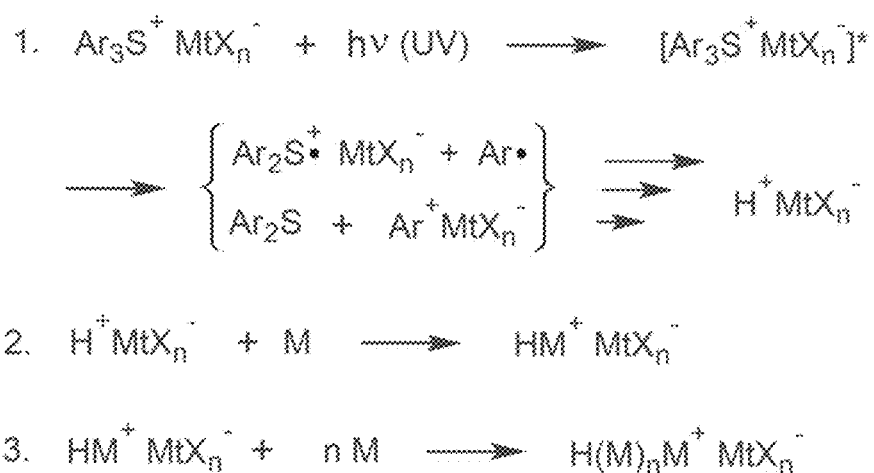
FIG. 34 shows an example ring-opening (ROP) mechanism for triarylsulfonium salt ($Ar_3S^+MtXn^-$), according to some implementations.

FIG. 34 shows an example ring-opening (ROP) mechanism 3400 for triarylsulfonium salt (Ar$_3$S$^+$MtXn$^-$), according to some implementations. Generally, usage of UV initiators to initiate ROP polymerization via cross-linking of the first polymeric chain 3010 with the second polymeric chain 3020 may accelerate curing of the protective layer 2860 from a maximum of 24 hours to 1-3 seconds, which may be desirable for large-scale manufacturing processes. In some aspects, usage of UV initiators may accelerate epoxy cross-linking for existing epoxy systems (e.g., Examples 21-22, and/or Examples 24-28 to be disclosed herein), without requiring the additional introduction of new chemistries. In addition, UV initiators selected to enable epoxy cross-linking may be cationic UV initiators. In this way, when various epoxies are exposed to UV radiation, they may produce a relatively strong Lewis acid and/or Brønsted-Lowry acid, which may then correspondingly initiate ROP of epoxy groups.

The ROP mechanism 3400 is illustrated for triarylsulfonium salt (Ar$_3$S$^+$MtXn$^-$), which may be representative of the inorganic and/or ionic conductor 3018 incorporated in the protective layer 2860. In some aspects, HMtXn is a Lewis acid (e.g., HBF$_4$, HPF$_6$, HAsF$_6$, HSbF$_6$) and M is a monomer (e.g., of FIGS. 36 and 37 and/or including an epoxy group). Unlike free-radical polymerization, cationic polymerization (e.g., including UV-initiated cationic ROP) is not inhibited by oxygen. However, polymer chain growth and cross-linking reactions may be inhibited by trace (e.g., less than 0.1 wt. %) of water and or chemicals (e.g., amines and/or urethanes). Nevertheless, initiating moieties in UV-initiated cationic ROP are relatively chemically stable for extended durations (e.g., more than 24 hrs.) In this way, polymerization in UV-initiated cationic ROP may continue even in the absence of visible light. In addition, some monomers (e.g., of FIGS. 36 and 37) and/or oligomers may be cured with lower UV dosages, depending on the amount of the protective layer 2860 sought for preparation.

Figure 35:
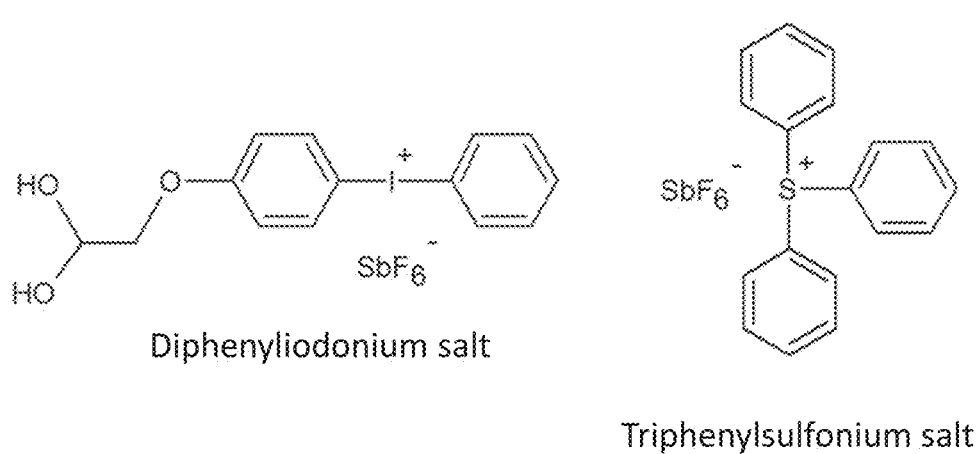
FIG. 35 shows several example onium salts suitable for usage as cationic photo-initiators for the protective layer of the battery of FIG. 28, according to some implementations.

FIG. 35 shows several example onium salts 3500 suitable for usage as cationic photo-initiators for the protective layer 2860 of the battery of FIG. 28, according to some implementations. The onium salts 3500 may be one example of the inorganic and/ionic conductor 3018 and may thereby be used to initiate cross-linking of the first polymeric chain 3010 with the second polymeric chain 3020 to form the protective layer 2860. In some aspects, the onium salts 3500 may include diphenyliodonium salts and/or triphenylsulfonium salts (both shown in FIG. 35), as well as diazonium salts, diaryliodonium salts, ferrocenium salts and/or various other metallocene compounds (not shown in FIG. 35 for simplicity). Efficiency of the onium salts 3500 as cationic photo-initiators may at least in part depend on their respective solubility in the protective layer 2860 (e.g., when formed as a resin), and/or their respective polarity and/or surface charge. Generally, solubility increases with increasing size of anions in respective onium salts 3500 because charge is dissipated over a relatively larger surface area of the anion, which lowers hydrophilicity of the respective onium salt 3500. In this way, the solubility and reactivity of at least some of the onium salts 3500 in non-ionic resins may increase along the order of tetrafluoroborate (BF$_{4-}$) <hexafluorophosphate (PF$_{6-}$)<hexafluoroarsenate (AsF$_{6-}$) <fluoronium (SbF$_{6-}$). In some aspects, antimony salts (e.g., including the fluoronium anion) may be selected most often for use as cationic photo-initiators, due to their relatively higher solubility and reactivity, over the other listed salts. In addition, besides solubility alone, spectroscopic properties such as range of light absorption and/or bond cleavage efficiency may affect the rate of initiation of polymerization of monomers in the first polymeric chain 3010 and/or the second polymeric chain 3020.

Figure 36:
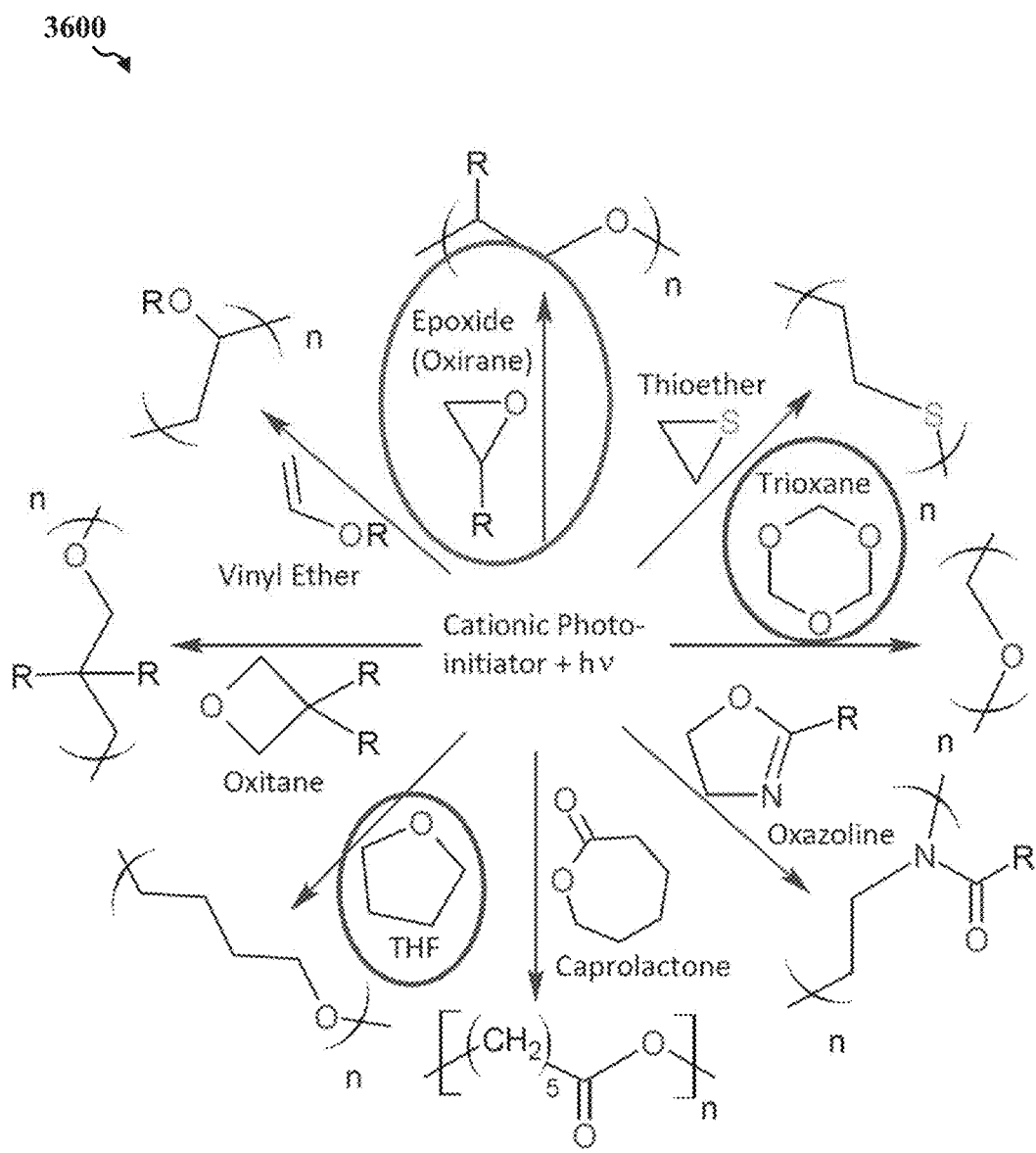
FIG. 36 shows a several example monomers of various cationic photo-polymerizable compositions suitable for forming the protective layer of the battery of FIG. 28, according to some implementations.

FIG. 36 shows a several example monomers 3600 of various cationic photo-polymerizable compositions suitable for forming the protective layer of the battery of FIG. 28, according to some implementations. The monomers 3600 may each be one example of repeating monomer unit "B" and/or "C" of FIG. 30 and may thereby be used to initiate cross-linking of the first polymeric chain 3010 with the second polymeric chain 3020 to form the protective layer 2860. That is, multiple of instances of repeating monomer unit "B" may attach to exposed carbon and/or other atoms to form the first polymeric chain 3010 of multiple units, e.g., "B"-"B"-"B"- . . . etc., in the manner shown in FIGS. 30 and 36. Repeating monomer unit "C" may be identical or dissimilar to repeating monomer unit "B," and thereby form the second polymeric chain in a similar manner to the first polymeric chain by attaching to additional instances of repeating monomer unit "C," e.g., "C"-"C"-"C"- . . . etc., in the manner shown in FIGS. 30 and 36.

In some aspects, cationic UV resin formulations formed of at least some of the monomers 3600 may include examples of one or more cycloaliphatic epoxies, any one of which may be used as an epoxide group. Cycloaliphatic epoxies tend to be the relatively more reactive compared to linear aliphatic groups or aromatic epoxy molecules, such that when any one or more of the monomers 3600 are used to produce the protective layer 2860, a tight network of polar groups may form to yield a relatively brittle polymer-based final product. To reduce undesirable brittleness, some UV cationic resin formulations may be prepared to include polyols (not shown in FIG. 36 for simplicity) as reactive diluents and performance modifiers. In some aspects, the polyols may act as monomeric materials, reacting into formed epoxy-based networks. In comparison to cycloaliphatic epoxy groups alone, many different polyols are available ranging from di and tri-functional glycols, polycaprolactone oligomers, and even high order dendritic polyols. Selecting between the relatively higher number of available polyols may assist in fine-tuning of end-usage properties of the protective layer 2860.

Figure 37:
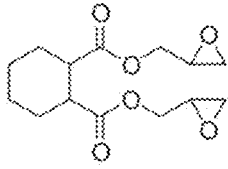
FIG. 37 shows ultraviolet (UV) curable monomers suitable for forming the protective layer of the battery of FIG. 28, according to some implementations.
Figure 37:
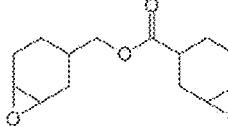
Figure 37:
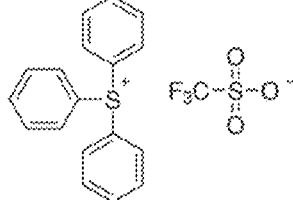
Figure 37:
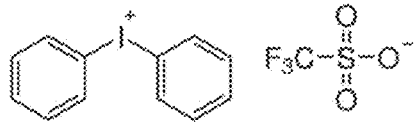
Figure 37:
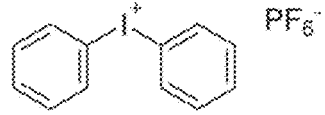
Figure 37:
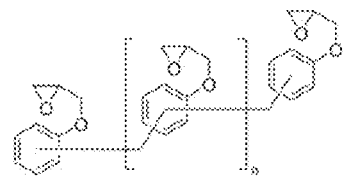
Figure 37:
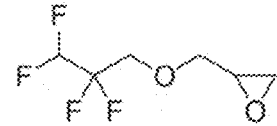

FIG. 37 shows ultraviolet (UV) curable monomers 3700 suitable for forming the protective layer 2860 of the battery 2800 of FIG. 28, according to some implementations. Monomers 3700 may be one example of monomer "B" and/or monomer "C" of FIG. 30 and may include diglycidyl 1,2-cyclohexanedicarboxylate (DG-CHDC), 3,4-epoxycyclohexylmethyl-3',4'-epoxycyclohexane carboxylate (ECC), triphenylsulfonium triflate (TPS-TF), diphenyliodonium triflate (DPI-TF), diphenyliodonium hexafluorophosphate (DPI-HFP), poly[(phenyl glycidyl ether)-co-formaldehyde] (PPGEF), and/or glycidyl 2,2,3,3-tetrafluoropropyl ether (GTFEP).

In some aspects, the protective layer 2860 may be formed from multiple polymers (e.g., formed from the monomers 3700) uniformly mixed together and/or cross-linked (e.g., via ultraviolet (UV) curing with a UV-curing wavelength of 254 nanometers (nm)) to form a three-dimensional (3D) lattice disposed on the anode 2820. The protective layer (e.g., when formed as the 3D lattice) may be formulated according to one or more recipes disclosed in Examples 24-28 below:

Example 24: UV-Curable Recipe

| Function | Components | Wt. % of Total |
| --- | --- | --- |
| Soft Oligomeric Epoxy (e.g., used as a flexible spacer to decrease brittleness of the protective layer 2860) | Polyoxyethylene bis(glycidyl ether) (PEG-DEG-500) having an average $M_n$ of 500 | 16.64 |
| Rigid Polymeric Epoxy (e.g., used as a flexible spacer to decrease brittleness of the protective layer 2860) | Undiluted clear difunctional bisphenol A/epichlorohydrin derived liquid epoxy resin (e.g., EPON ™ Resin 828) | 3.62 |
| Fast Curing Epoxy Monomer | Diglycidyl 1,2-cyclohexanedicarboxylate (DG-CHDC) | 8.04 |
| Photo-initiator | Triphenylsulfonium triflate (TPS-TF) | 5.00 |
| Inorganic and/or Ionic Conductor | Lithium bis(trifluoromethanesulfonyl)imide (LiTFSI) | 16.7 |
| Inorganic and/or Ionic Conductor (e.g., used as a UV-screen to minimize acid formation on exposed surfaces of the protective layer 2860) | Lithium lanthanum zirconium oxide (LLZO) (500 nm particle size) | 50.0 |

Example 25: UV-Curable Recipe

| Function | Components | Wt. % of Total |
| --- | --- | --- |
| Soft Oligomeric Epoxy (e.g., used as a flexible spacer to decrease brittleness of the protective layer 2860) | Polyoxyethylene bis(glycidyl ether) (PEG-DEG-500) having an average $M_n$ of 500 | 19.64 |
| Rigid Polymeric Epoxy (e.g., used as a flexible spacer to decrease brittleness of the protective layer 2860) | Undiluted clear difunctional bisphenol A/epichlorohydrin derived liquid epoxy resin (e.g., EPON ™ Resin 828) | 3.62 |
| Fast Curing Epoxy Monomer | 3,4-epoxycyclohexylmethyl-3',4'-epoxycyclohexane carboxylate (ECC) | 8.04 |
| Photo-initiator | Diphenyliodonium hexafluorophosphate (DPI-HFP) | 2.00 |
| Inorganic and/or Ionic Conductor | Lithium bis(trifluoromethanesulfonyl)imide (LiTFSI) | 16.7 |
| Inorganic and/or Ionic Conductor | Lithium lanthanum zirconium oxide (LLZO) (500 nm particle size) | 50.0 |

Example 26: UV-Curable Recipe

| Function | Components | Wt. % of Total |
| --- | --- | --- |
| Soft Oligomeric Epoxy | Polyoxyethylene bis(glycidyl ether) (PEG-DEG-500) having an average $M_n$ of 500 | 17.8 |
| Rigid Polymeric Epoxy | PPGEF (Number Average Molecular Weight (Mn) = 345) | 3.5 |
| Fast Curing Epoxy Monomer | Diglycidyl 1,2-cyclohexanedicarboxylate (DG-CHDC) | 7.0 |
| Photo-initiator | Diphenyliodonium triflate (DPI-TF) | 5.0 |
| Inorganic and/or Ionic Conductor | Lithium bis(trifluoromethanesulfonyl)imide (LiTFSI) | 16.7 |
| Inorganic and/or Ionic Conductor | Lithium lanthanum zirconium oxide (LLZO) (500 nm particle size) | 50.0 |

Example 27: UV-Curable Recipe

| Function | Components | Wt. % of Total |
| --- | --- | --- |
| Soft Oligomeric Epoxy | Polyoxyethylene bis(glycidyl ether) (PEG-DEG-500) having an average $M_n$ of 500 | 19.8 |
| Rigid Polymeric Epoxy | PPGEF (Number Average Molecular Weight (Mn) = 570) | 4.5 |
| Fast Curing Epoxy Monomer | 3,4-epoxycyclohexylmethyl-3',4'-epoxycyclohexane carboxylate (ECC) | 7.0 |
| Photo-initiator | Diphenyliodonium hexafluorophosphate (DPI-HFP) | 2.0 |

| Function | Components | Wt. % of Total |
|---|---|---|
| Inorganic and/or Ionic Conductor | Lithium bis(trifluoromethanesulfonyl)imide (LiTFSI) | 16.7 |
| Inorganic and/or Ionic Conductor | Lithium lanthanum zirconium oxide (LLZO) (500 nm particle size) | 50.0 |

In some aspects, polyethylene glycol (PEG), other polyethers and/or other polyols may be used and/or substitutes for any of the components listed in Examples 23-27 depending on the performance requirements for the protective layer 2860. In addition, variations of Examples 24-27 are possible where component loading levels are adjusted +/−3% from that listed. In addition, all listed components, except for polyoxypropylenediamine (e.g., JEFFAMINE® D-230), are compatible with UV-catalyzed cationic ROP. In this way, the first polymeric chain 3010 may initiate cross-linking with the second polymeric chain 3020 to form the carbon-carbon bonds 3026 and produce a 3D lattice disposed on the anode 2820. The 3D lattice may be formed of the various components listed in each Example, where the components are uniformly mixed together, interconnected with each other, and dispersed throughout the protective layer 2860. That is, the first polymeric chain 3010 and the second polymeric chain 3020 are exemplary and additional polymeric chains are possible, depending on the Example. Some Examples may include additional polymeric chains cross-linked to each other as well as one or more of the first polymeric chain 3010 or the second polymeric chain 3020. In addition, each component listed in any one or more of the Examples 21-22 and/or 24-28 may be formed of a corresponding polymeric chain.

That is, in Example 26, which is representative of the other Examples, polyoxyethylene bis(glycidyl ether) (PEG-DEG-500) having an average $M_n$ of 500 may be denoted as monomer "B" in the first polymeric chain 3010 and diglycidyl 1,2-cyclohexanedicarboxylate (DG-CHDC) may be denoted as monomer "C" in the second polymeric chain 3010. Monomer "B" may bond with additional instances of monomer "B" and also bond with one or more instance of monomer "C" in 3D to form the 3D lattice. Additional components (not shown in FIG. 30 for simplicity), may be denoted as monomer "D" and so forth. For example, in Example 26, PPGEF (Number Average Molecular Weight (Mn)=345) may be denoted as monomer "D" and bond to additional instances of itself as well as monomer "B" and/or monomer "C" in 3D to form the 3D lattice, where lithium bis(trifluoromethanesulfonyl)imide (LiTFSI) and/or lithium lanthanum zirconium oxide (LLZO) (500 nm particle size) may be depicted as the inorganic and/or ionic conductor 3018 and dispersed throughout the protective layer 2860.

Certain fast-curing cycloaliphatic epoxy monomers (e.g., 3,4-epoxycyclohexylmethyl-3',4'-epoxycyclohexane carboxylate (ECC)), such as included in Examples 25 and 27 above, may be incorporated into the protective layer 2860, to rapidly cross-link together at higher cross-linking density levels such as the cross-linking density 3300B of FIG. 33B via cationic polymerization processes to produce a network of polar groups to at least partially trap the TFSI⁻ anions 2826 within the protective layer 2860. In addition, in some aspects, various UV initiators (e.g., onium sales of hexafluorophosphate ($PF_6^-$), which may be beneficial for formation of the SEI 2840) may be substituted for the photo-initiators disclosed in Examples 24-27. In some other aspects, the anion for fluoroantimonic acid ($SbF_6^-$) may be substituted for the photo-initiators disclosed in Examples 24-27. The anion for fluoroantimonic acid ($SbF_6^-$) is soluble in the electrolyte 2830 and may facilitate alloying of at least some regions of the protective layer 2860 with at least some of the lithium cations ($Li^+$) 2825. In this way, alloying of some regions of the protective layer 2860 may consume at least some of the lithium cations ($Li^+$) 2825, thereby removing the consumed lithium cations from participating in lithium-lithium metallic bonding to form undesirable dendrites from the anode 2820 towards the cathode 2810.

In addition, in one implementation, lithium bis(trifluoromethanesulfonyl)imide (LiTFSI) may act as a co-initiator once UV curing has been initiated (e.g., by any of the photo-initiators listed in Examples 24-27), thereby increasing curing rates. For example, activation of the ROP reaction of an example monomer, poly(ethylene glycol) diglycidyl ether (DGEPEG) may be achieved using lithium bis(trifluoromethanesulfonyl)imide (LiTFSI) with a subsequent propagation step. In the activation step, the lithium cation (e.g., provided by LiTFSI) attacks the carbon-oxygen bond on one or more epoxides of DGEPEG. As this reaction occurs under acidic conditions, the epoxide is converted to a hydroxyl ion. During the initiation and propagation steps, the hydroxyl ions react with epoxides and other hydroxyl ions via a nucleophilic reaction yielding chain extension via the formation of C—O—C bonds.

In alternative to Examples 24-27 presented earlier, the protective layer 2860 may be formulated to include fluorinated materials (e.g., fluoropolymers, such as glycidyl 2,2,3,3 tetrafluoropropyl ether (GTFEP)) to be at least partially grafted onto the carbon atoms 3014. In this way, GTFEP may be used as a source of the fluorine ions ($F^-$) 3012, which may later dissociate from their respective carbon atoms to combine with the lithium cations ($Li^+$) 2825 to produce lithium fluoride (LiF) via the Wurtz reaction, as discussed elsewhere in the present disclosure. Example 28 may be prepared according to the procedure provided by Example 23 to include the following components:

Example 28: Fluorinated Polymer

| Components | Weight Percent (wt. %) of Total |
|---|---|
| Polyoxyethylene bis(glycidyl ether) (PEG-DEG-500) having an average $M_n$ of 500 | 14.7 |
| Glycidyl 2,2,3,3-tetrafluoropropyl ether (GTFEP) | 10.5 |
| Undiluted clear difunctional bisphenol A/epichlorohydrin derived liquid epoxy resin (e.g., EPON™ Resin 828) | 2.7 |
| Polyoxypropylenediamine (e.g., JEFF AMINE® D-230) | 7.5 |
| Lithium bis(trifluoromethanesulfonyl)imide (LiTFSI) | 14.3 |
| One or more surfactants (e.g., cationic surfactants such as alkyl trimethyl ammonium, $R-N(CH_3)_3^+$, dissolved in seawater (SW)) | 1.0 |
| Lithium lanthanum zirconium oxide (LLZO) (500 nm particle size) | 49.3 |

Example 28 as presented above may not be initiated by UV curing, as polyoxypropylenediamine (e.g., JEFFAMINE® D-230) may not be compatible with UV-catalyzed cationic ROP. However, in some aspects, polyoxypropylenediamine (e.g., JEFFAMINE® D-230) may be replaced by 3,4-epoxycyclohexylmethyl-3',4'-epoxycyclohexane carboxylate (ECC) to thereby render Example 28 UV-curable, similar to Examples 23-27.

Figure 38:
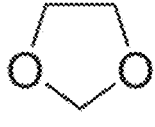
FIG. 38 shows several example non-reactive diluents suitable for usage as additives to adjust dilution levels in UV-curable formulations prepared with the UV curable monomers of FIG. 37, according to some implementations.

FIG. 38 shows several example non-reactive diluents 3800 suitable for usage as additives to adjust dilution levels in UV-curable formulations prepared with the UV curable monomers of FIG. 37, according to some implementations. In one implementation, the non-reactive diluents may include 1,2-Dimethoxyethane (DME) and/or triethylene glycol dimethyl ether (TEGDME). In some aspects, the non-reactive diluents 3800 may be removed from the protective layer 2860 after cross-linking by baking at 100° C. In some other aspects, the non-reactive diluents 3800 may be retained in the protective layer 2860 to enhance diffusion of the lithium cations ($Li^+$) 2825.

Figure 39:
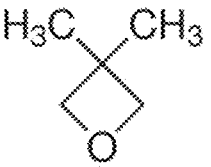
FIG. 39 shows several example reactive diluents suitable for usage as additives to adjust dilution levels in UV-curable formulations prepared with the UV curable monomers of FIG. 37, according to some implementations.
Figure 39:
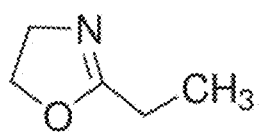
Figure 39:
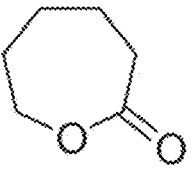

FIG. 39 shows several example reactive diluents 3900 suitable for usage as additives to adjust dilution levels in UV-curable formulations prepared with the UV curable monomers of FIG. 37, according to some implementations. In some aspects, reactive diluents may function as flexibilizers to release stress of at least some of the carbon atoms 3014 (e.g., which may be cross-linked to each other) within the protective layer 2860 to thereby minimize pinhole formation. In addition, in some aspects, the non-reactive diluents 3800 and/or the reactive diluents 3900 may be or include materials used as additives for UV-curable formulations in the amount between 1 wt. % and 50 wt. % per formulation weight to adjust the viscosity depending on deposition method (e.g., low viscosity for spray coating compared to high viscosity for slot die or draw-down coating methods). In this way, the remaining components are diminished in proportion to the amount of diluent added.

Figure 40A:
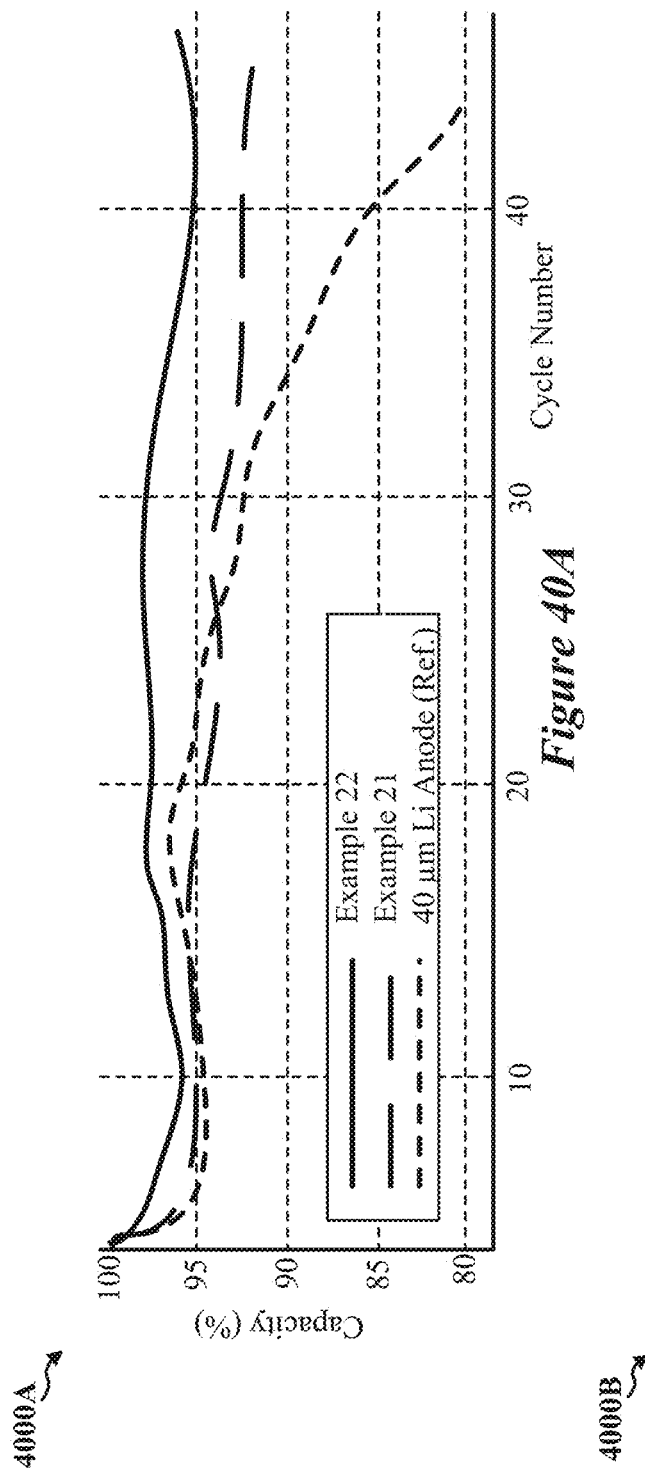
FIG. 40A shows a graph of capacity (% of initial) against cycle number, according to some implementations.

FIG. 40A shows a graph 4000A of capacity (% of initial) against cycle number, according to some implementations. The graph 4000A depicts performance of the battery 2800 when prepared according to Example 22 against Example 21 and an unprotected 40 μm lithium anode (e.g., provided as a reference, "Ref."). Example 22 shows consistently higher capacity retention (e.g., in % of original) per operational discharge-charge cycle number than both Example 21 and the unprotected 40 μm lithium anode.

Figure 40B:
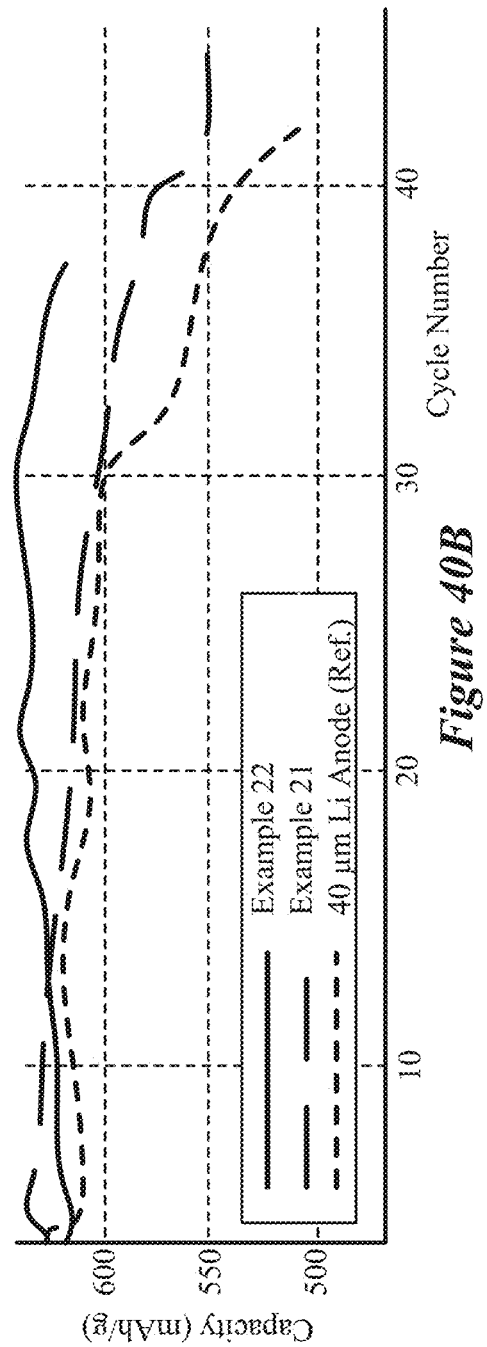
FIG. 40B shows a graph of capacity (mAh/g) against cycle number, according to some implementations.

FIG. 40B shows a graph of capacity (mAh/g) against cycle number, according to some implementations. The graph 4000A depicts performance of the battery 2800 when prepared according to Example 22 against Example 21 and an unprotected 40 μm lithium anode (e.g., provided as a reference, "Ref."). Example 22 shows consistently higher capacity retention (e.g., in milli-amp hours per gram, mAh/g) per operational discharge-charge cycle number than both Example 21 and the unprotected 40 μm lithium anode. The graph 4000A depicts performance of the battery 2800 when prepared according to Example 22 against Example 21 and an unprotected 40 μm lithium anode (e.g., provided as a reference, "Ref."). Example 22 shows consistently higher capacity retention (e.g., in % of original) per operational discharge-charge cycle number than both Example 21 and the unprotected 40 μm lithium anode.

Figure 41A:
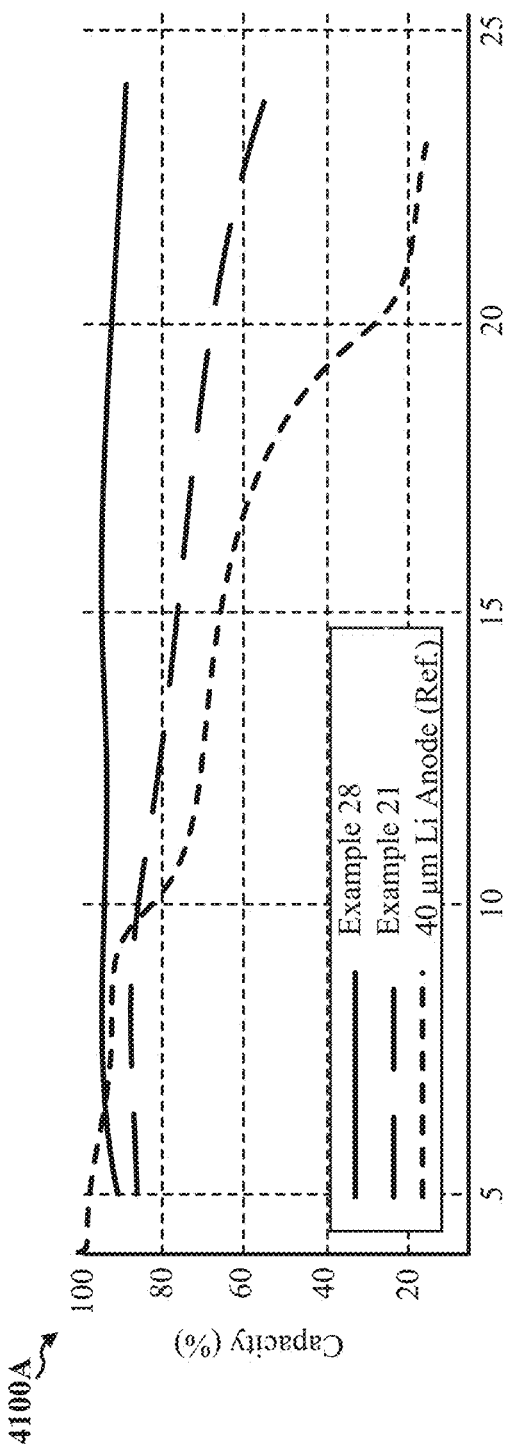
FIG. 41A shows another graph of capacity (% of initial) against cycle number, according to some implementations.

FIG. 41A shows another graph of capacity (% of initial) against cycle number, according to some implementations. The graph 4100A depicts performance of the battery 2800 when prepared according to Example 28 against Example 21 and an unprotected 40 μm lithium anode (e.g., provided as a reference, "Ref."). Example 22 shows consistently higher capacity retention (e.g., in % of original) per operational discharge-charge cycle number than both Example 21 and the unprotected 40 μm lithium anode.

Figure 41B:
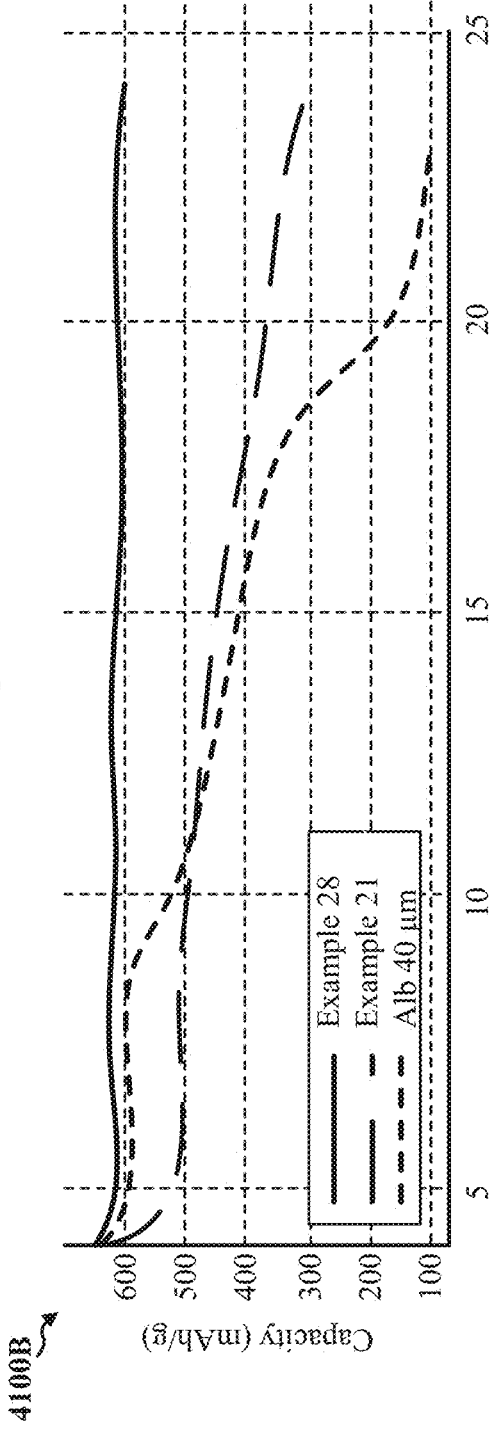
FIG. 41B shows another graph of capacity (mAh/g) against cycle number, according to some implementations.

FIG. 41B shows another graph of capacity (mAh/g) against cycle number, according to some implementations. The graph 4100B depicts performance of the battery 2800 when prepared according to Example 28 against Example 21 and an unprotected 40 μm lithium anode (e.g., provided as a reference, "Ref."). Example 22 shows consistently higher capacity retention (e.g., mAh/g) per operational discharge-charge cycle number than both Example 21 and the unprotected 40 μm lithium anode.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above in combination with one another, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementions described above should not be understood as requiring such separation in all implementations, and it should be understood that the described program components and systems can generally be integrated together in a single product or packaged into multiple products.

What is claimed is:

1. A lithium-sulfur battery comprising:
a cathode;
an anode structure positioned opposite to the cathode, the anode structure comprising:
an anode active material including one or more of a foil of lithium, a coating of lithium, or lithium alloy;
an artificial solid-electrolyte interphase disposed on the anode active material; and
a protective layer disposed at least partially within and on the artificial solid-electrolyte interphase, wherein the protective layer is characterized by a cross-linking density, and includes:
carbonaceous materials including one or more carbon allotropes comprising graphene; and
a first polymeric chain and a second polymeric chain positioned opposite one another and dispersed throughout the carbonaceous materials;
a separator positioned between the anode structure and the cathode; and
an electrolyte dispersed throughout the cathode and in contact with the anode structure, wherein the protective layer is characterized by a glass transition temperature of between 60° C. and 81° C. and forms a cross-linked three-dimensional (3D) polymeric lattice configured to trap at least some TFSI$^-$ anions formed by the dissociation of lithium bis(trifluoromethanesulfonyl)imide (LiTFSI) included in the electrolyte, or included in the protective layer, in response to the operational charge/discharge cycling of the lithium-sulfur battery.

2. The lithium-sulfur battery of claim 1, wherein the first and second polymeric chains are configured to form carbon-carbon bonds by at least partially cross-linking with each other upon exposure to an ultraviolet (UV) energy, the cross-linked first and second polymeric chains forming the protective layer as a three-dimensional (3D) lattice having a cross-linking density defined by a number of cross-link points per-unit volume and configured to at least partially trap at least some of the TFSI$^-$ anions.

3. The lithium-sulfur battery of claim 2, wherein the number of cross-link points per-unit volume are configured to restrict re-dissolution of lithium-containing additives in the protective layer toward the electrolyte.

4. The lithium-sulfur battery of claim 2, wherein the cross-linking density associated with the protective layer is configured to control swelling between 10%-50% of an original volume of the protective layer by controlling absorption of one or more solvents associated with the electrolyte.

5. The lithium-sulfur battery of claim 4, wherein the one or more solvents include dimethoxyethane (DME).

6. The lithium-sulfur battery of claim 1, wherein one or more carbon allotropes includes one or more of flat graphene, wrinkled graphene, a plurality of carbon nano-tubes (CNTs), a plurality of carbon nano-onions (CNOs), or non-hollow carbon spherical particles (NHCS).

7. The lithium-sulfur battery of claim 1, wherein the protective layer is devoid of pinholes.

8. The lithium-sulfur battery of claim 1, wherein the protective layer has a modulus of elasticity between 3 gigapascals (GPa) and 100 GPa.

9. The lithium-sulfur battery of claim 1, wherein the dissociation of LiTFSI further produces lithium cations (Li$^+$), and wherein at least some lithium cations (Li$^+$) are involved in one or more of a dissociation reaction or a combination reaction during operational charge/discharge cycling of the lithium-sulfur battery.

10. The lithium-sulfur battery of claim 9, wherein the combination of fluorine anions (F−) and lithium cations (Li$^+$) is associated with generation of lithium oxide (Li$_2$O), lithium nitrate (LiNO$_3$) or a plurality of nitrogen-oxygen containing compounds.

11. The lithium-sulfur battery of claim 10, wherein the three-dimensional scaffold further comprises a plurality of multi-porous pathways formed between adjacent non-hollow carbon spherical particles and within individual non-hollow carbon spherical particles.

12. The lithium-sulfur battery of claim 10, wherein one or more of the multi-porous pathways are configured to at least temporarily micro-confine elemental sulfur.

13. The lithium-sulfur battery of claim 1, wherein the plurality of fluorinated poly(meth)acrylates comprise a plurality of monomers, one or more monomers including 2,2,3,3,4,4,5,5,6,6,7,7-Dodecafluoroheptyl acrylate (DFHA), 3,3,4,4,5,5,6,6,7,7,8,8,9,9,10,10,10-Heptadecafluorodecyl methacrylate (HDFDMA), 2,2,3,3,4,4,5,5-Octafluoropentyl methacrylate (OFPMA), Tetrafluoropropyl methacrylate (TFPM), 3-[3,3,3-Trifluoro-2-hydroxy-2-(trifluoromethyl)propyl]bicyclo[2.2.1]hept-2-yl methacrylate (HFA monomer), or vinyl-based monomers including 2,3,4,5,6-Pentafluorostyrene (PFSt).

14. The lithium-sulfur battery of claim 1, wherein the protective layer has a thickness approximately between 0.001 μm and 5 μm.

15. The lithium-sulfur battery of claim 1, wherein grafting of at least some of the fluorinated poly(meth)acrylates is initiated by free-radical initiators including one or more of benzoyl peroxide (BPO) or azobisisobutyronitrile (AIBN).

16. The lithium-sulfur battery of claim 1, wherein the protective layer includes between approximately 0.001 wt. % to 2 wt. % of the plurality of fluorinated poly(meth)acrylates.

17. The lithium-sulfur battery of claim 1, wherein the protective layer further comprises:
an interface layer in contact with the anode; and
a cap layer disposed on top of the interface layer.

18. The lithium-sulfur battery of claim 17, wherein the interface layer is formed at contact surfaces between the anode and the protective layer responsive to one or more chemical reactions including a Wurtz reaction.

19. The lithium-sulfur battery of claim 17, wherein the interface layer includes one or more of a plurality of cross-linkable monomers including methacrylate (MA), acrylate, vinyl functional groups, or a combination of epoxy and amine functional groups.

20. The lithium-sulfur battery of claim 17, wherein the cap layer is characterized by a density gradient associated with one or more self-healing properties to the cap layer.

21. The lithium-sulfur battery of claim 20, wherein the density gradient is configured to strengthen the protective layer.

22. The lithium-sulfur battery of claim 1, wherein the protective layer further comprises:
between 5 weight percent (wt. %) and 100 wt. % of carbonaceous materials; and
between 95 wt. % and 0 wt. % of fluorinated poly(meth)acrylates.

23. The lithium-sulfur battery of claim 1, wherein the jelly roll is formed by winding at least the anode and the cathode together.

24. The lithium-sulfur battery of claim 1, wherein the protective layer is associated with a protection of one or more edges of the anode exposed to the electrolyte from lithium erosion.

25. The lithium-sulfur battery of claim 1, further comprising an anode current collector coupled to the anode, wherein the protective layer is configured to prevent delamination of lithium from the anode current collector.

26. The lithium-sulfur battery of claim 1, wherein the protective layer comprises a carbon-containing electrically-conductive adhesive material that comprises:
   a first type of functionalized graphene moiety; and
   a second type of functionalized graphene moiety, wherein the first type of functionalized graphene moiety and second type of functionalized graphene moiety are dissimilar relative to each other.

27. The lithium-sulfur battery of claim 26, wherein the first type of functionalized graphene moiety and the second type of functionalized graphene moiety are configured to cross-link with each other and form a uniform medium.

28. The lithium-sulfur battery of claim 27, wherein the uniform medium is one or more of electrically-conductive or thermally-conductive.

29. The lithium-sulfur battery of claim 26, wherein the first type of functionalized graphene moiety and the second type of functionalized graphene moiety are collectively configured to form one or more complementary functional group pairs comprising:
   an amine group and an epoxy group;
   a thiol group and one or more of a plurality of carbon-carbon double bonds or a plurality of triple bonds;
   an amine group and a carboxyl group; or
   hydrosilane (—Si—H) and one or more of a plurality of carbon-carbon double bonds or a plurality of triple bonds.

30. The lithium-sulfur battery of claim 1, wherein the jelly roll is formed as a cylindrical cell comprising a shell defining an interior volume.

31. The lithium-sulfur battery of claim 30, wherein the shell has a diameter between of 18.4 millimeters (mm) and 18.6 mm and a length between 65.1 mm and 65.3 mm.

32. The lithium-sulfur battery of claim 30, wherein the shell is congruent with an 18560 cell.

33. The lithium-sulfur battery of claim 1, wherein the jelly roll is formed as a prismatic cell comprising a shell defining an interior volume.

34. The lithium-sulfur battery of claim 33, wherein the shell has a height between 56 millimeters (mm) and 58 mm, a length between 34 mm and 36 mm, and a width between 6 mm and 8 mm.

* * * * *